(12) United States Patent  
Stender

(10) Patent No.: US 12,234,945 B2  
(45) Date of Patent: Feb. 25, 2025

(54) ASSEMBLY INCLUDING A MOUNTING PORTION AND AN IMPLEMENT-RETAINING PORTION

(71) Applicant: Levannes, Inc., Portage, MI (US)

(72) Inventor: Timothy P. Stender, Otsego, MI (US)

(73) Assignee: LEVANNES, INC., Portage, MI (US)

( * ) Notice: Subject to any disclaimer, the term of this patent is extended or adjusted under 35 U.S.C. 154(b) by 0 days.

(21) Appl. No.: 17/887,602

(22) Filed: Aug. 15, 2022

(65) Prior Publication Data

US 2022/0390063 A1  Dec. 8, 2022

Related U.S. Application Data

(63) Continuation of application No. 17/565,736, filed on Dec. 30, 2021, now abandoned, which is a continuation of application No. 17/326,595, filed on May 21, 2021, now abandoned, which is a continuation of application No. 17/070,635, filed on Oct. 14, 2020, now abandoned, which is a continuation of application No. 15/679,297, filed on Aug. 17, 2017, now abandoned, which is a continuation-in-part of application No. 15/086,019, filed on Mar. 30, 2016, now abandoned.

(51) Int. Cl.
| | | |
|---|---|---|
| *F16M 13/02* | (2006.01) | |
| *F16M 11/04* | (2006.01) | |
| *F16M 11/22* | (2006.01) | |
| *F16B 5/06* | (2006.01) | |
| *F16B 25/00* | (2006.01) | |
| *F16L 3/13* | (2006.01) | |
| *F16M 11/06* | (2006.01) | |

(52) U.S. Cl.
CPC .......... *F16M 13/02* (2013.01); *F16M 11/041* (2013.01); *F16M 11/22* (2013.01); *F16B 5/0664* (2013.01); *F16B 25/0015* (2013.01); *F16B 25/0026* (2013.01); *F16L 3/13* (2013.01); *F16M 11/06* (2013.01)

(58) Field of Classification Search
CPC ...... F16M 13/02; F16M 11/041; F16M 11/22; F16M 11/06; F16B 5/0664; F16B 25/0015; F16B 25/0026; F16L 3/13
See application file for complete search history.

(56) References Cited

U.S. PATENT DOCUMENTS

| | | | | | |
|---|---|---|---|---|---|
| 2,155,189 | A | * | 4/1939 | Heinrich | H01B 17/20 174/165 |
| 2,528,288 | A | * | 10/1950 | Rublee | F16L 3/04 411/480 |
| 4,340,199 | A | * | 7/1982 | Brock | A47G 1/215 248/490 |

(Continued)

*Primary Examiner* — Kimberly T Wood  
(74) *Attorney, Agent, or Firm* — Gunther J. Evanina; BUTZEL LONG

(57) ABSTRACT

An assembly (100, 200) is disclosed. The assembly (100, 200) includes a mounting portion (112) and an implement-retaining portion (114, 214). The mounting portion (112) includes a body portion (112a) and a substrate-penetrating portion (112b). The body portion (112a) is defined by a substrate-engaging portion ($112a_1$) and an implement retainer interface portion ($112a_2$). The implement-retaining portion (114, 214) is removably-connected to the implement retainer interface portion ($112a_2$).

17 Claims, 32 Drawing Sheets

(56) References Cited

U.S. PATENT DOCUMENTS

| | | | | |
|---|---|---|---|---|
| 4,389,759 A * | 6/1983 | Yuda | ............ | F16B 21/06 24/581.1 |
| 5,311,649 A * | 5/1994 | Suh | ............ | A44B 11/266 24/616 |
| 5,651,522 A * | 7/1997 | Davis | ............ | B42F 1/02 248/221.11 |
| 5,735,024 A * | 4/1998 | Ortiz | ............ | A44B 11/266 24/DIG. 38 |
| 5,957,421 A * | 9/1999 | Barbour | ............ | A45F 5/02 248/314 |
| 6,371,424 B1 * | 4/2002 | Shaw | ............ | F41G 1/54 248/222.12 |
| 7,267,311 B2 * | 9/2007 | Jung | ............ | E06B 9/50 248/266 |
| 7,607,621 B2 * | 10/2009 | Cai | ............ | F16M 11/22 248/221.11 |
| 7,690,607 B2 * | 4/2010 | Garmyn | ............ | E06B 9/58 248/220.21 |
| 8,191,844 B2 * | 6/2012 | Pennino | ............ | B62J 11/04 248/220.21 |
| 8,465,221 B2 * | 6/2013 | Yan | ............ | H05K 7/1489 403/348 |
| 2002/0023323 A1 * | 2/2002 | Meyrat | ............ | A44C 5/2066 24/615 |
| 2006/0186290 A1 * | 8/2006 | Carnevali | ............ | E05B 65/006 248/221.11 |
| 2013/0094127 A1 * | 4/2013 | Lu | ............ | F16M 11/06 361/679.01 |
| 2013/0153723 A1 * | 6/2013 | Nichols | ............ | F16M 13/02 248/292.12 |
| 2014/0150313 A1 * | 6/2014 | Stevens | ............ | A47G 1/1613 248/223.41 |
| 2016/0053478 A1 * | 2/2016 | Porter | ............ | F16B 5/0642 248/222.12 |

\* cited by examiner

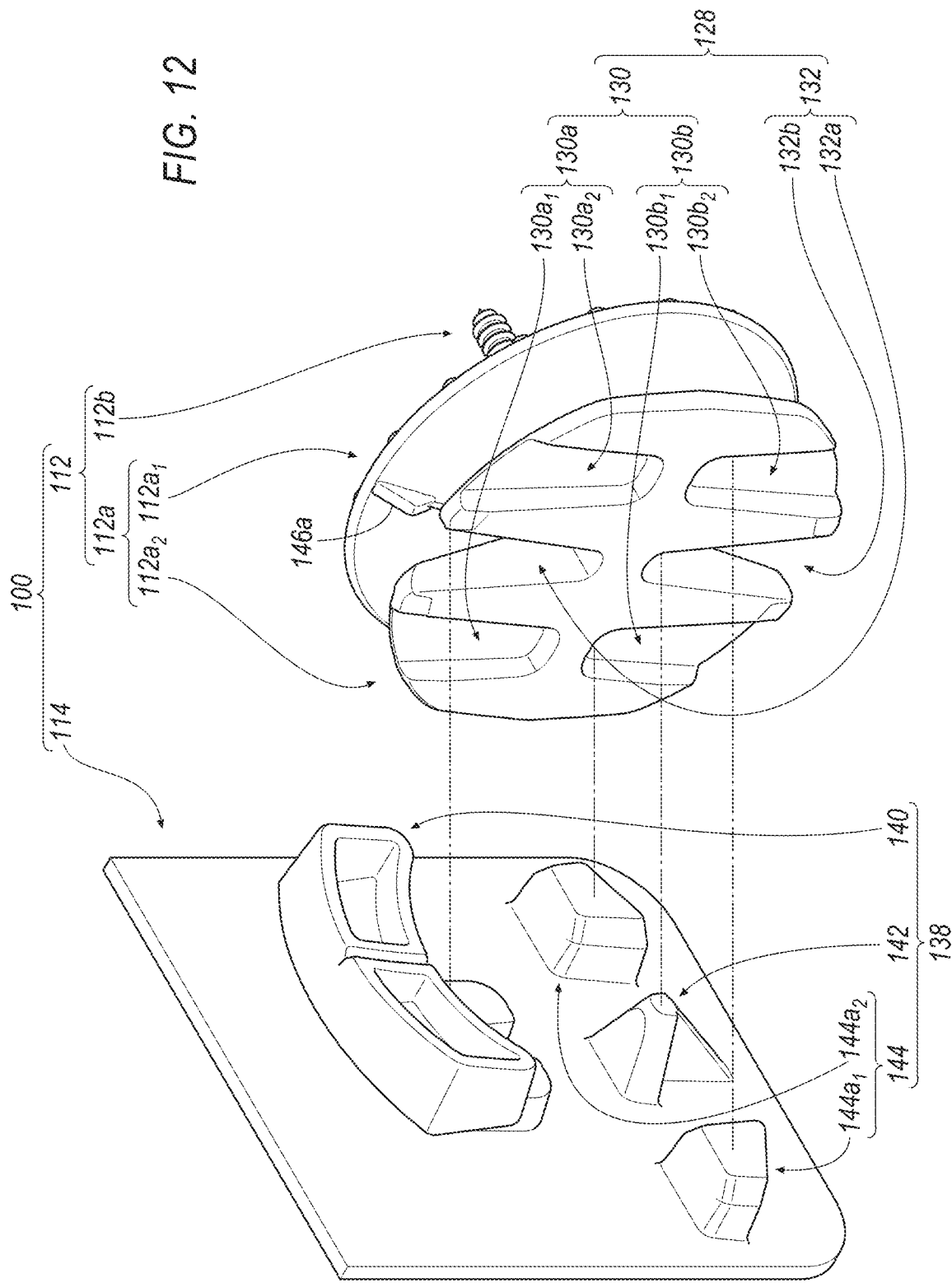

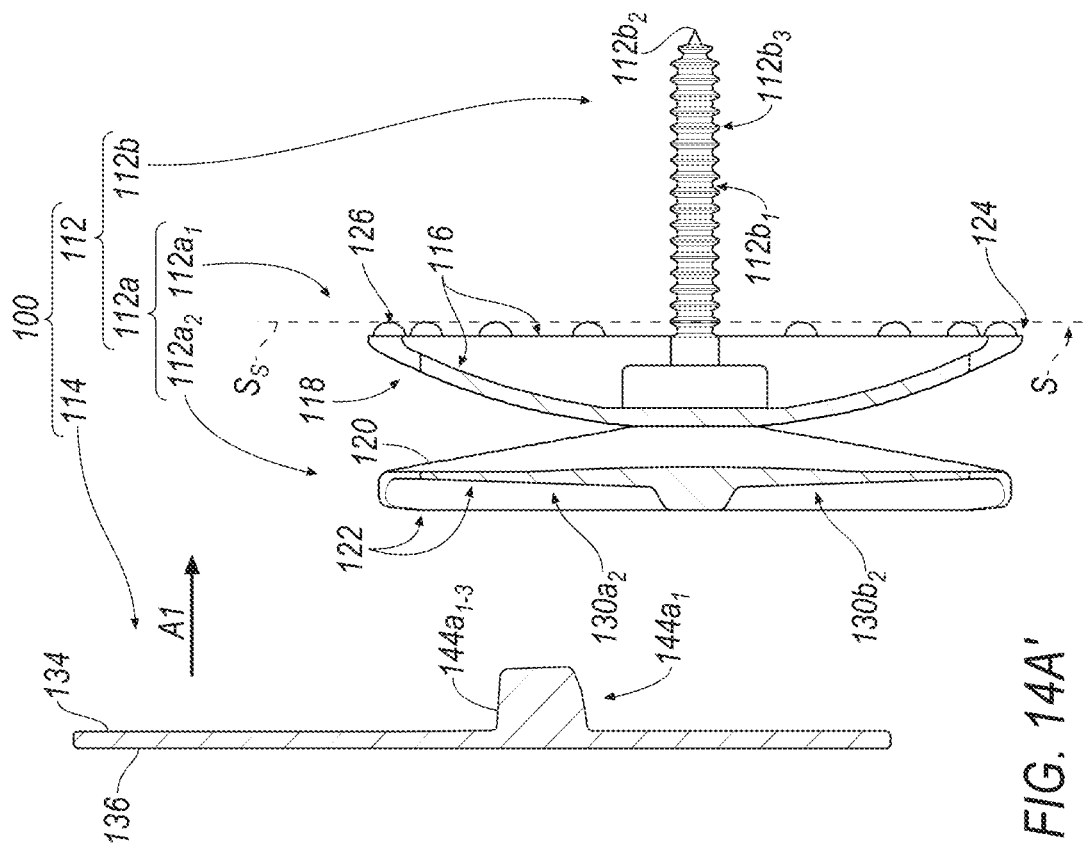
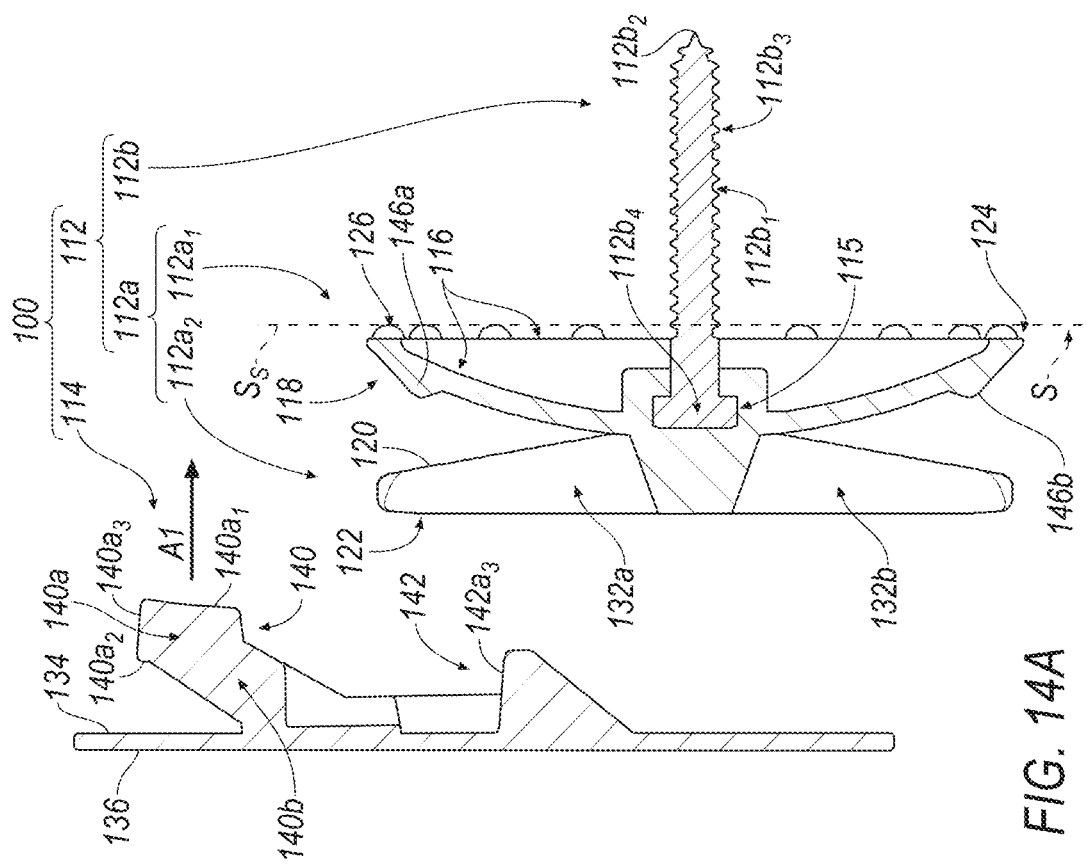
FIG. 14A'
FIG. 14A

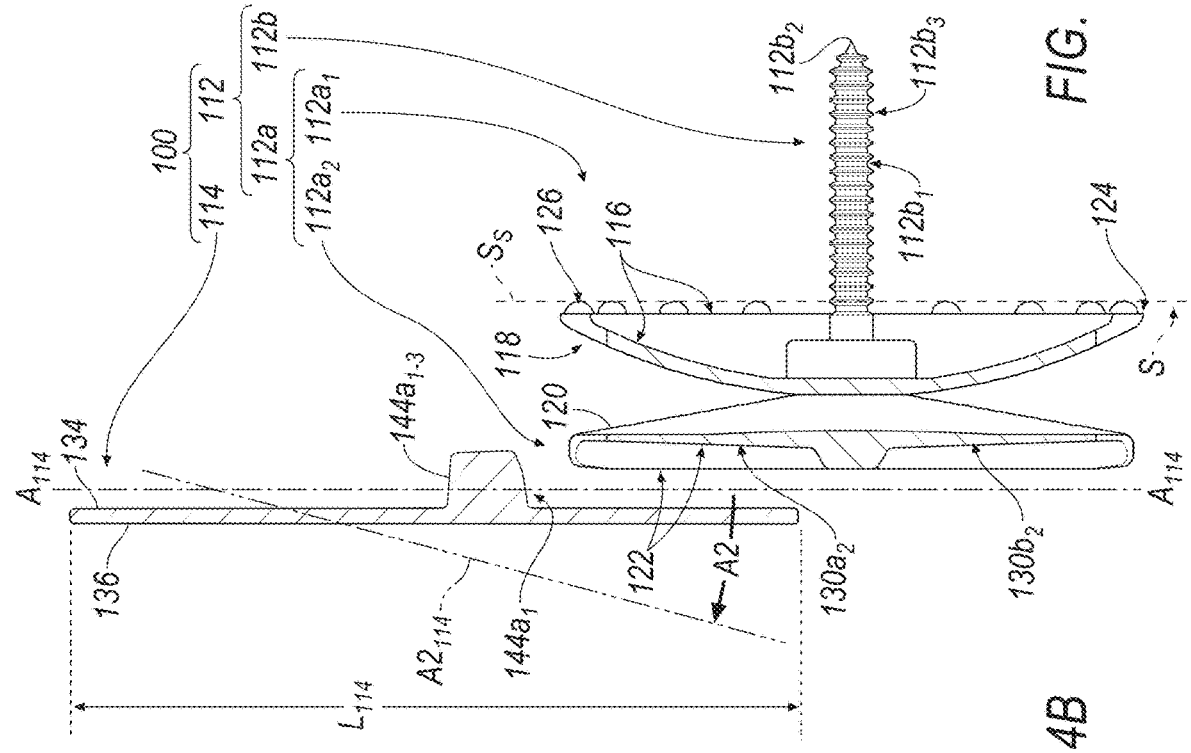
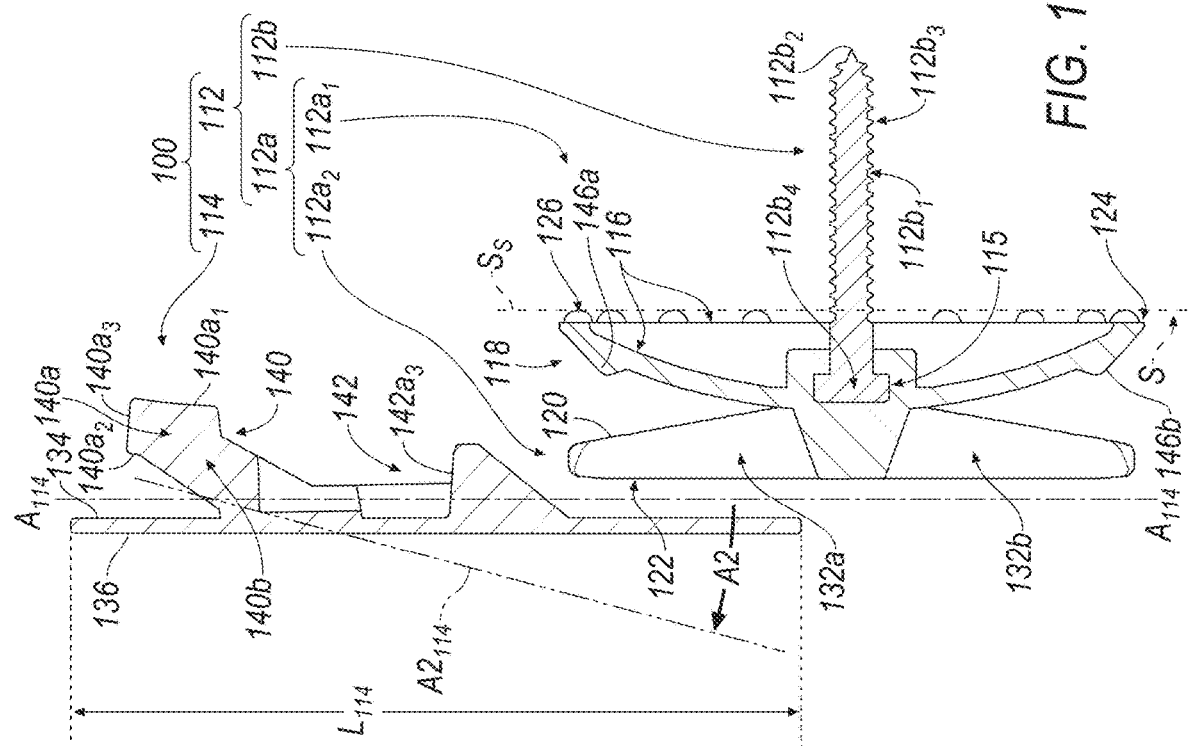
FIG. 14B
FIG. 14B'

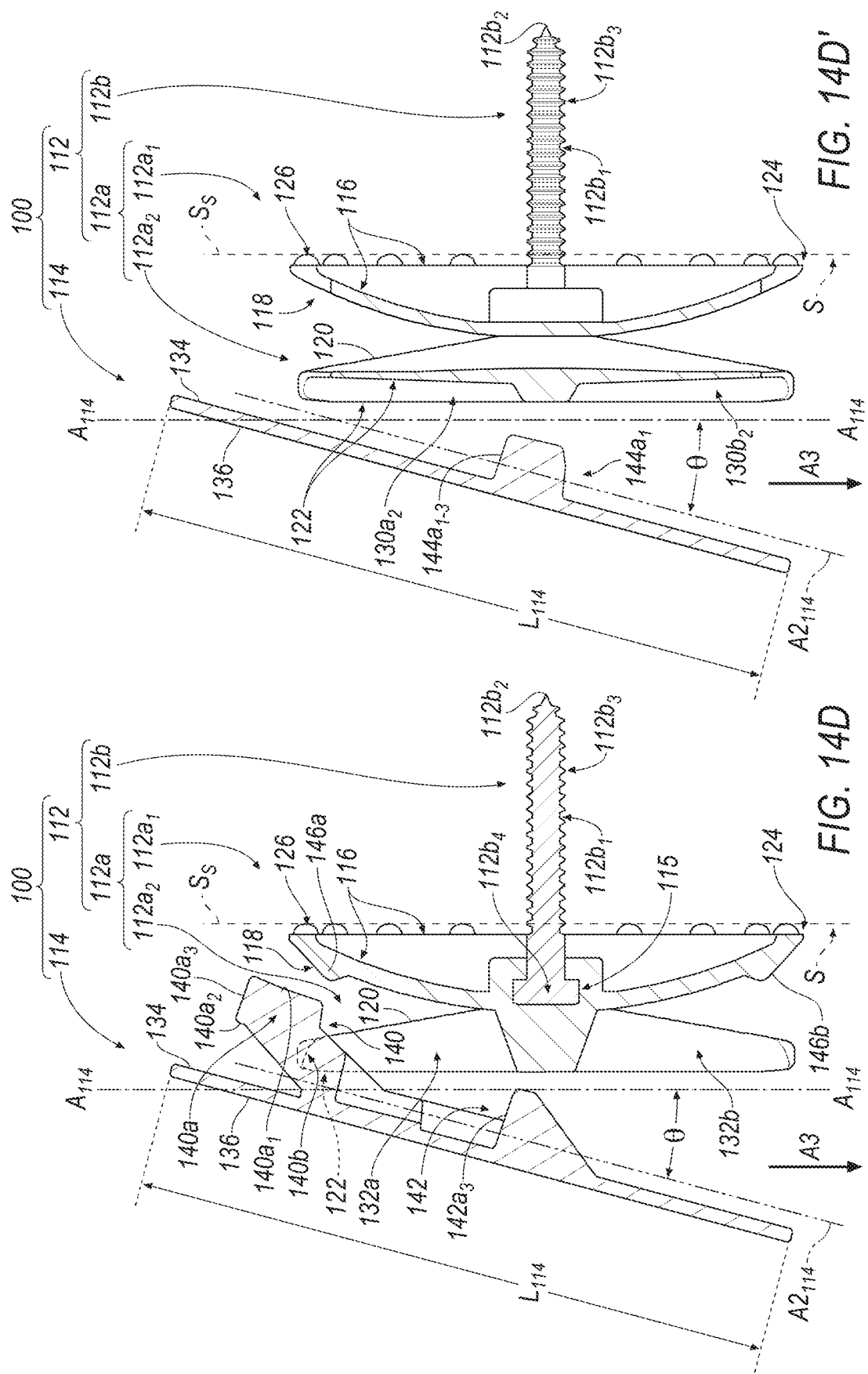

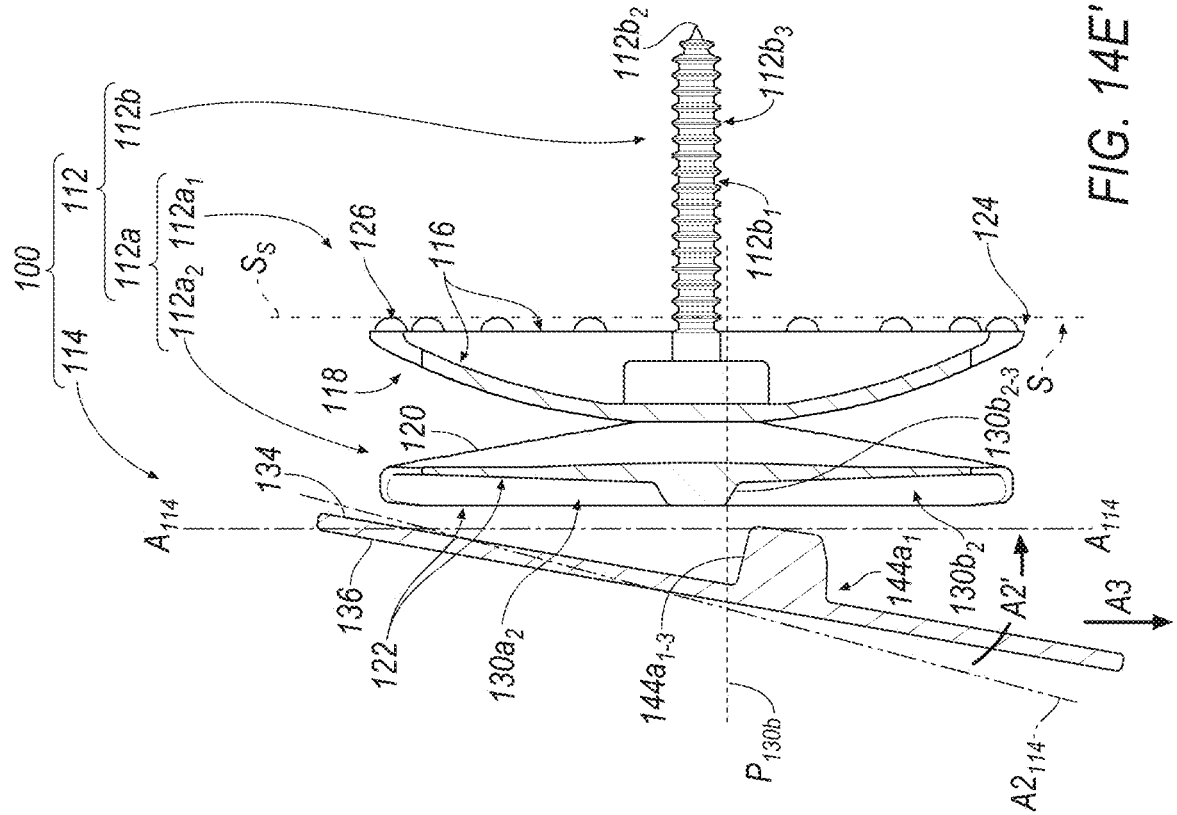
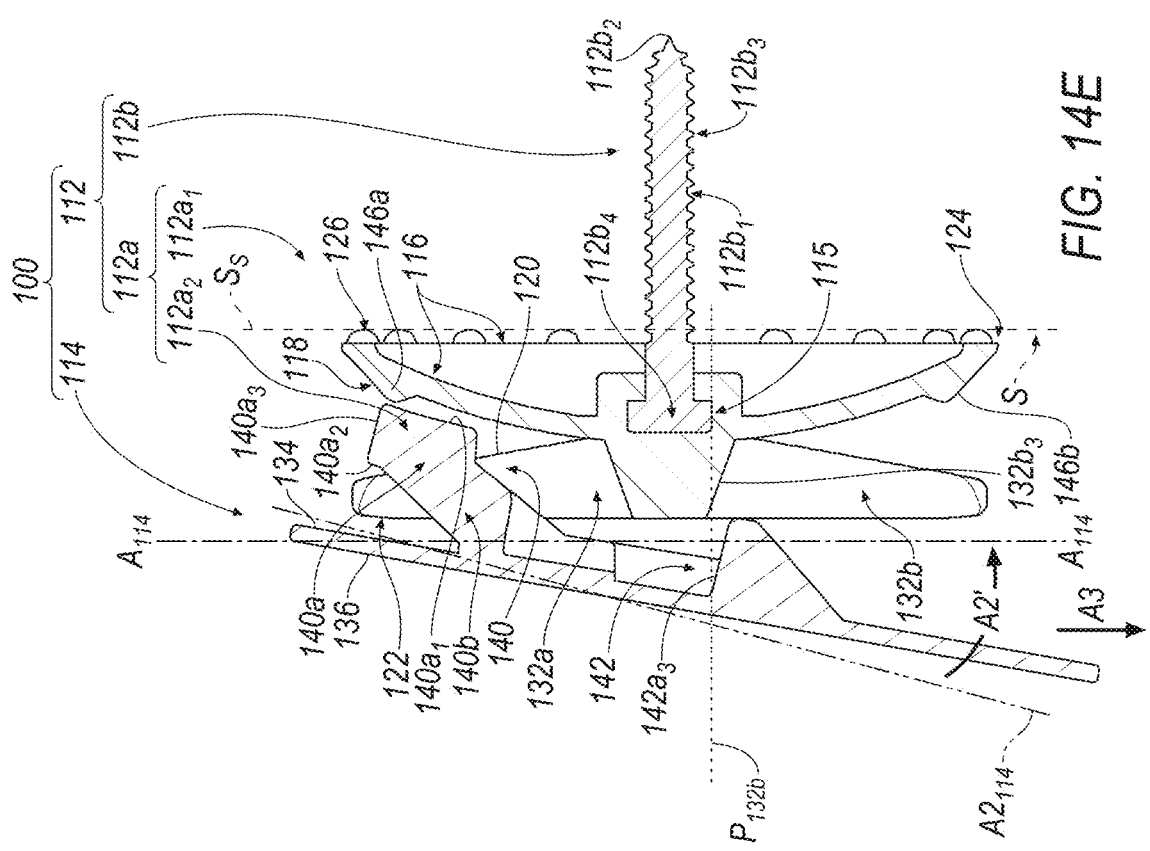
FIG. 14E'
FIG. 14E

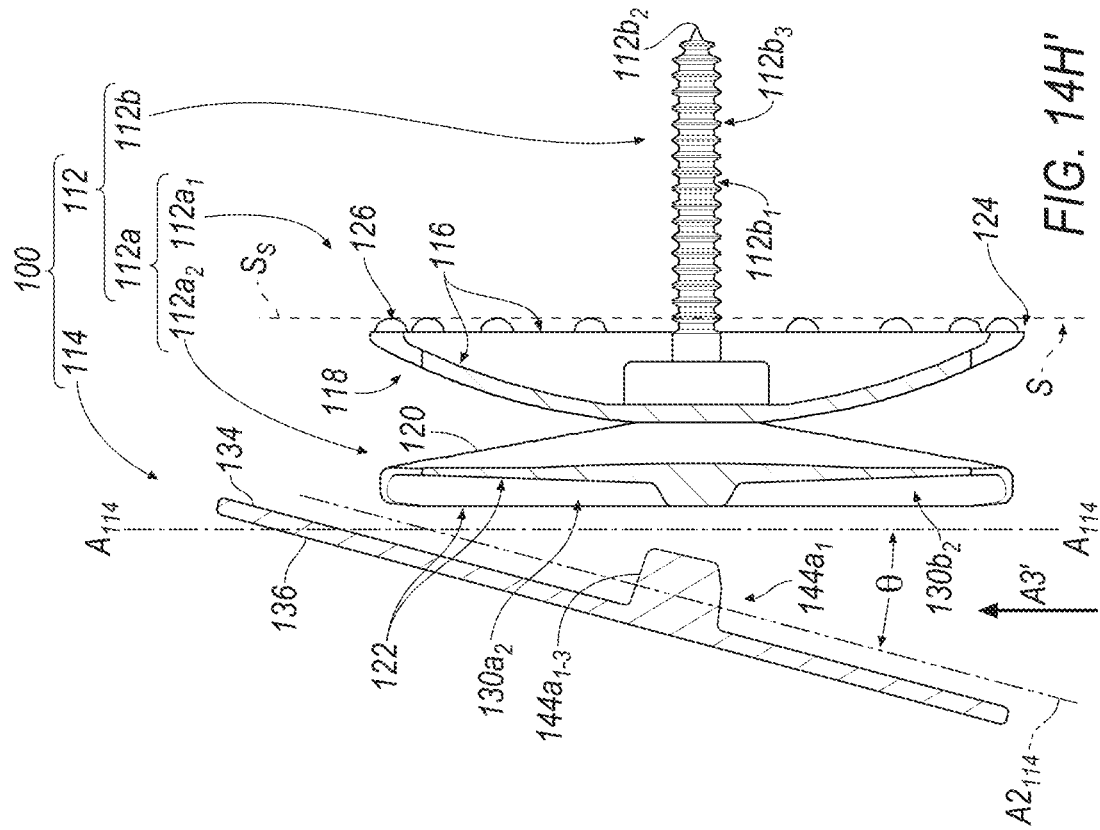

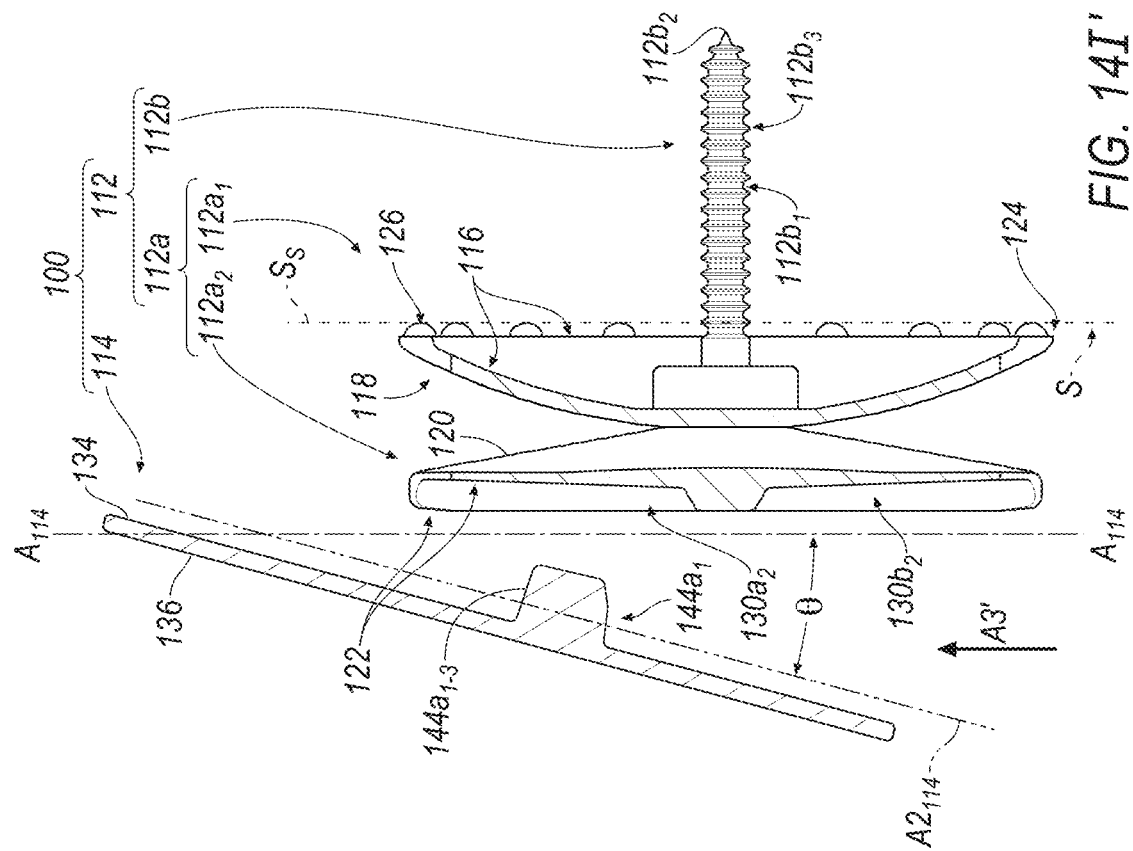

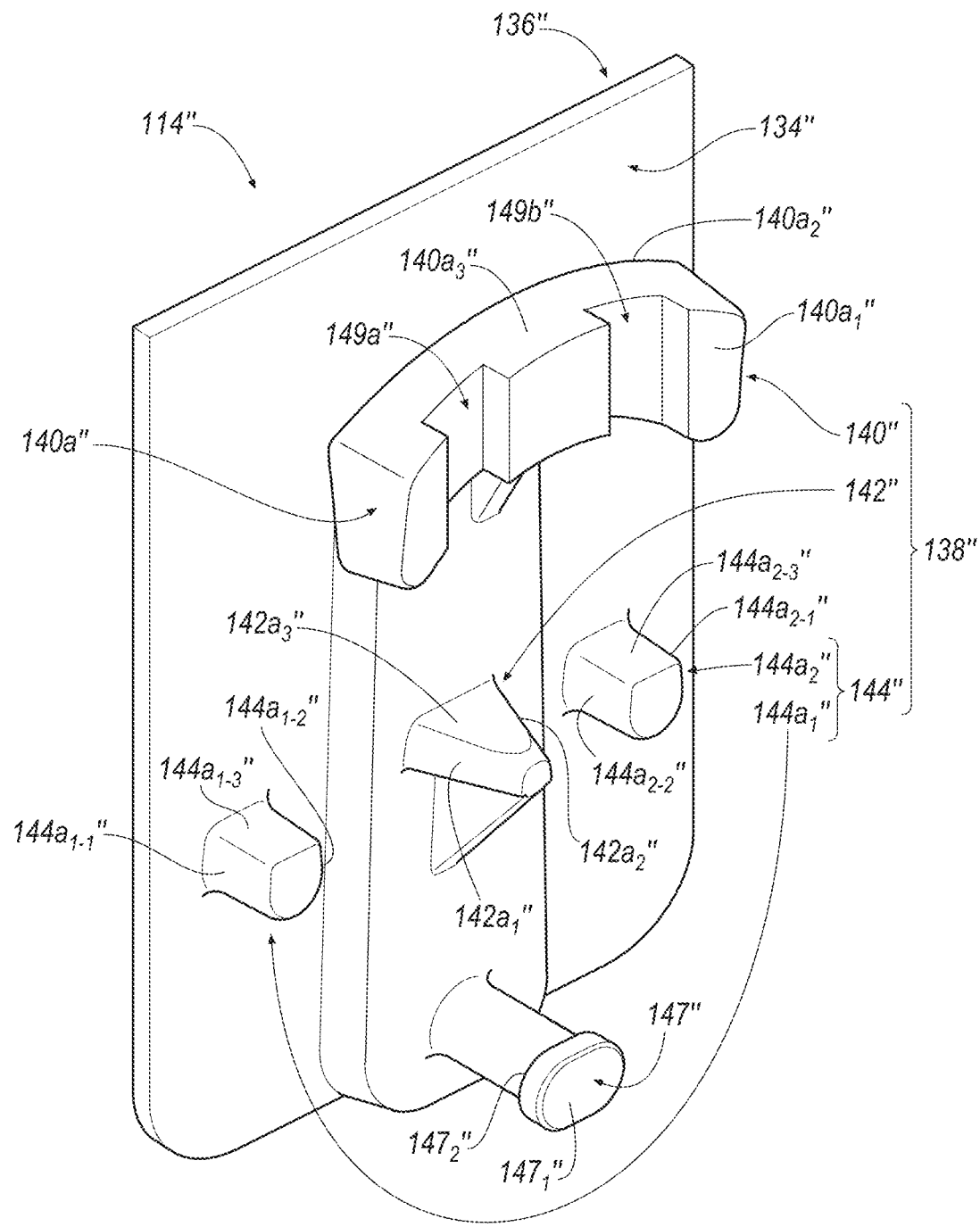
FIG. 18"

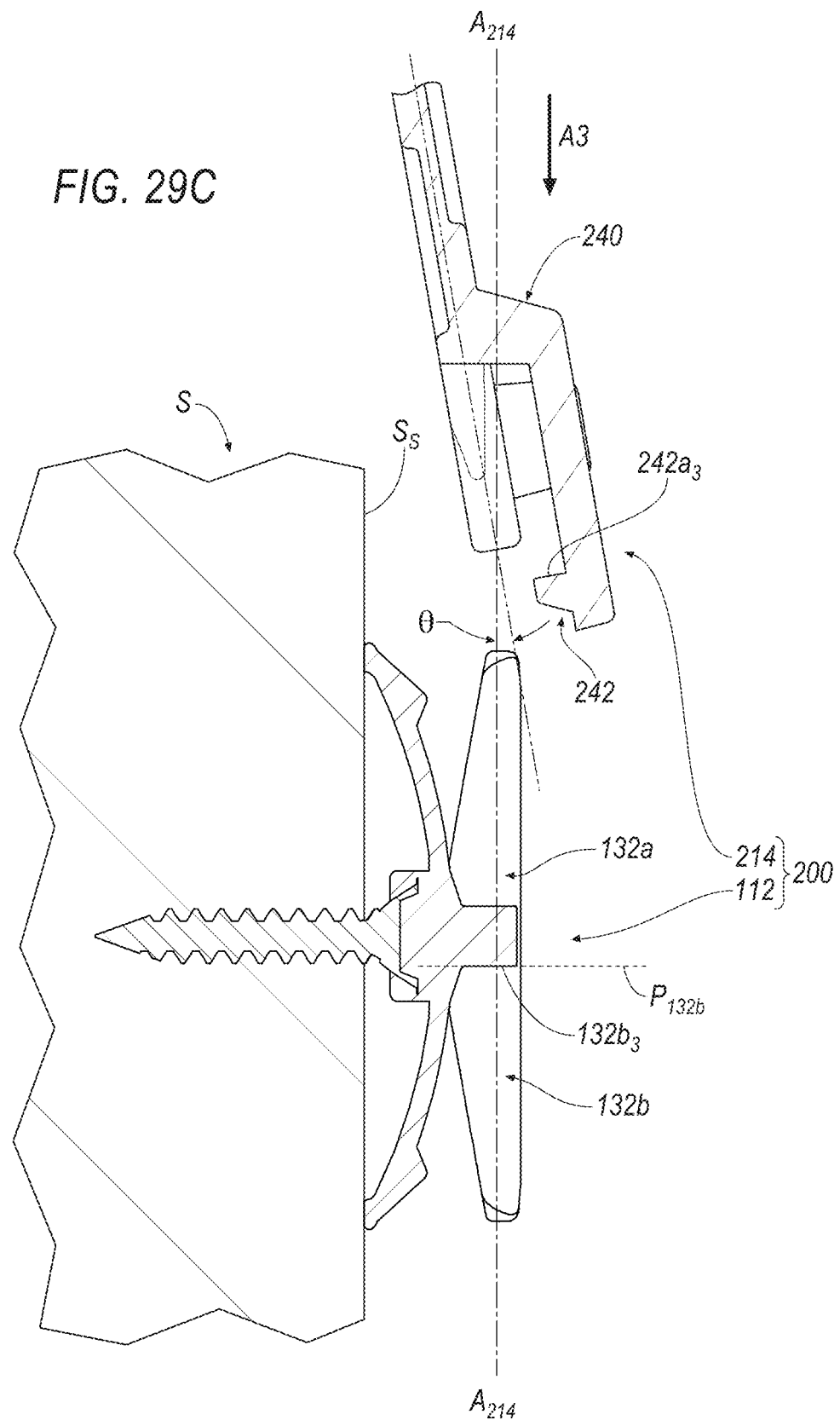

ASSEMBLY INCLUDING A MOUNTING PORTION AND AN IMPLEMENT-RETAINING PORTION

CROSS-REFERENCE TO RELATED APPLICATIONS

This U.S. patent application is a continuation of U.S. patent application Ser. No. 17/565,736 filed Dec. 30, 2021, which is a continuation of U.S. patent application Ser. No. 17/326,595 filed May 21, 2021, which is a continuation of U.S. patent application Ser. No. 17/070,635 filed Oct. 14, 2020, which is a continuation of U.S. patent application Ser. No. 15/679,297 filed Aug. 17, 2017, which is a continuation-in-part of, and claims priority under 35 U.S.C. § 120 to U.S. patent application Ser. No. 15/086,019 filed Mar. 30, 2016, the disclosure of which is considered part of the disclosure of this application and is hereby incorporated by reference in its entirety.

FIELD OF THE INVENTION

The disclosure relates to an assembly including a mounting portion and an implement-retaining portion.

DESCRIPTION OF THE RELATED ART

Implement-retainers are known. While existing implement retainers perform adequately for their intended purpose, improvements to implement retainers are continuously being sought in order to advance the arts.

SUMMARY

One aspect of the disclosure provides an assembly including a mounting portion and an implement-retaining portion. The mounting portion includes a body portion and a substrate-penetrating portion. The body portion is defined by a substrate-engaging portion and an implement retainer interface portion connected to the substrate-engaging portion. The implement-retaining portion is removably-connected to the implement retainer interface portion of the body portion of the mounting portion.

Implementations of the disclosure may include one or more of the following optional features. For example, the implement retainer interface portion of the body portion of the mounting portion includes an implement-retaining-portion-engaging surface. The implement-retaining-portion-engaging surface defines a plurality of male-receiving portions and a plurality of wedging passages. The plurality of male-receiving portions includes a plurality of female portions. The plurality of female portions includes a first pair of female portions defined by a first female portion and a second female portion. The plurality of female portions also includes second pair of female portions defined by a third female portion and a fourth female portion. The plurality of wedging passages includes a first wedging passage and a second wedging passage.

In some implementations, the first wedging passage is arranged between the first female portion of the first pair of female portions and the second female portion first pair of female portions. The second wedging passage is arranged between the third female portion of the second pair of female portions and the fourth female portion of the second pair of female portions.

In some examples, the implement retainer interface portion of the body portion of the mounting portion includes a first half and a second half. The first wedging passage and the first pair of female portions are defined by the first half of the implement retainer interface portion of the body portion of the mounting portion. The second wedging passage and the second pair of female portions are defined by the second half of the implement retainer interface portion of the body portion of the mounting portion.

In some implementations, the implement-retaining portion includes a mounting-portion-engaging surface. The implement-retaining portion includes a plurality of male portions extending away from the mounting-portion-engaging surface. The plurality of male portions are defined by a first wedging portion, a second wedging portion and a pair of registration portions including a first registration portion and a second registration portion.

In some examples, the plurality of male portions of the implement-retaining portion are removably-interfaced with the plurality of male-receiving portions of the mounting portion. The pair of registration portions is removably-interfaced with one of the first pair of female portions and the second pair of female portions. The first wedging portion is removably-interfaced with one of the first wedging passage and the second wedging passage. The second wedging portion is removably-interfaced with the other of the first wedging passage and the second wedging passage.

In some implementations, the implement retainer interface portion of the body portion of the mounting portion is defined by a neck-portion-engaging surface and an implement-retaining-portion-engaging surface. The neck-portion-engaging surface is shaped for contacting the first wedging portion of the plurality of male portions of the implement-retaining portion. The implement-retaining-portion-engaging surface that is shaped to contact or be arranged opposite the mounting-portion-engaging surface of the implement-retaining portion.

In some examples, the first wedging portion is defined by a head portion and a neck portion. The neck portion is connected to the head portion. The neck portion extends away from the mounting-portion-engaging surface.

In some implementations, the neck portion includes a first side surface and an opposite second side surface that are joined by an intermediate surface. The first side surface and the second side surface are arranged in a non-parallel, converging relationship.

In some examples, the second wedging portion includes a first side surface and an opposite second side surface that are joined by an intermediate surface. The first side surface and the second side surface are arranged in a non-parallel, converging relationship.

In some implementations, the implement-retaining portion includes a mounting-portion-engaging surface. The implement-retaining portion includes a plurality of male portions extending away from the mounting-portion-engaging surface. The plurality of male portions are defined by a first wedging portion, a second wedging portion and a pair of clamping portions including a first clamping portion and a second clamping portion.

In some instances, the plurality of male portions of the implement-retaining portion are removably-interfaced with the plurality of male-receiving portions of the mounting portion. The first wedging portion is removably-interfaced with one of the first wedging passage and the second wedging passage, and the second wedging portion is removably-interfaced with the other of the first wedging passage and the second wedging passage.

In some examples, a first mounting-portion-engaging-surface of each of the first clamping portion and the second clamping portion is sized for engaging the implement-retaining-portion-engaging surface. A second mounting-portion-engaging surface of each of the first clamping portion and the second clamping portion is sized for engaging a side surface of the body portion of the mounting portion that connects the neck-portion-engaging surface to the implement-retaining-portion-engaging surface.

In some implementations, at least the substrate-engaging portion of the body portion of the mounting portion is bendably or flexibly connected to the implement retainer interface portion of the body portion of the mounting portion.

In some examples, the substrate-penetrating portion may be formed from a rigid, non-flexible material. The substrate-penetrating portion is threaded fastener having a shaft portion and a threaded portion extending away from the shaft portion.

In some implementations, a head portion of the substrate-penetrating portion is arranged within a passage formed by the substrate-engaging portion of the body portion of the mounting portion.

In some examples, the substrate-engaging portion of the body portion of the mounting portion defines a substrate-mounting surface having a circumferential engagement lip including a plurality of protuberances.

Another aspect of the disclosure provides a portion of an assembly including a mounting portion. The mounting portion includes a body portion and a substrate-penetrating portion. The body portion is defined by a substrate-engaging portion and an implement retainer interface portion connected to the substrate-engaging portion.

Implementations of the disclosure may include one or more of the following optional features. For example, the implement retainer interface portion of the body portion of the mounting portion includes an implement-retaining-portion-engaging surface. The implement-retaining-portion-engaging surface defines a plurality of male-receiving portions and a plurality of wedging passages. The plurality of male-receiving portions includes a plurality of female portions. The plurality of female portions includes a first pair of female portions defined by a first female portion and a second female portion. The plurality of female portions also includes second pair of female portions defined by a third female portion and a fourth female portion. The plurality of wedging passages includes a first wedging passage and a second wedging passage.

In some implementations, the first wedging passage is arranged between the first female portion of the first pair of female portions and the second female portion first pair of female portions. The second wedging passage is arranged between the third female portion of the second pair of female portions and the fourth female portion of the second pair of female portions.

In some examples, the implement retainer interface portion of the body portion of the mounting portion includes a first half and a second half. The first wedging passage and the first pair of female portions are defined by the first half of the implement retainer interface portion of the body portion of the mounting portion. The second wedging passage and the second pair of female portions are defined by the second half of the implement retainer interface portion of the body portion of the mounting portion.

In some implementations, the implement retainer interface portion of the body portion of the mounting portion is defined by a neck-portion-engaging surface and an implement-retaining-portion-engaging surface.

In some examples, at least the substrate-engaging portion of the body portion of the mounting portion is bendably or flexibly connected to the implement retainer interface portion of the body portion of the mounting portion.

In some implementations, the substrate-penetrating portion may be formed from a rigid, non-flexible material. The substrate-penetrating portion is threaded fastener having a shaft portion and a threaded portion extending away from the shaft portion.

In some examples, a head portion of the substrate-penetrating portion is arranged within a passage formed by the substrate-engaging portion of the body portion of the mounting portion.

In some implementations, the substrate-engaging portion of the body portion of the mounting portion defines a substrate-mounting surface having a circumferential engagement lip including a plurality of protuberances.

In yet another aspect of the disclosure provides a portion of an assembly including an implement-retaining portion. The implement-retaining portion includes a mounting-portion-engaging surface and an opposite implement-engaging surface. The implement-retaining portion includes a plurality of male portions extending away from the mounting-portion-engaging surface. The plurality of male portions are defined by a first wedging portion, a second wedging portion and a pair of registration portions including a first registration portion and a second registration portion.

Implementations of the disclosure may include one or more of the following optional features. For example, the first wedging portion is defined by a head portion and a neck portion. The neck portion is connected to the head portion. The neck portion extends away from the mounting-portion-engaging surface.

In some examples, the second wedging portion includes a first side surface and an opposite second side surface that are joined by an intermediate surface. The first side surface and the second side surface are arranged in a non-parallel, converging relationship.

In some implementations, the second wedging portion includes a first side surface and an opposite second side surface that are joined by an intermediate surface. The first side surface and the second side surface are arranged in a non-parallel, converging relationship.

In some examples, the implement-engaging surface is defined by a substantially flat surface.

In some implementations, the implement-engaging surface is defined by a storage pocket.

In some examples, the implement-engaging surface is defined by a storage pocket a hook.

In some implementations, the implement-engaging surface is defined by a storage pocket a frictional surface including a plurality of bumps.

In some examples, the implement-engaging surface includes an adhesive.

In yet another aspect of the disclosure provides a portion of an assembly including an implement-retaining portion. The implement-retaining portion includes an implement-retaining portion including a mounting-portion-engaging surface and an opposite implement-engaging surface. The implement-retaining portion includes a plurality of male portions extending away from the mounting-portion-engaging surface. The plurality of male portions are defined by a first wedging portion, a second wedging portion and a pair of clamping portions including a first clamping portion and a second clamping portion.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The disclosure will now be described, by way of example, with reference to the accompanying drawings, in which:

FIG. 12 is an exploded perspective view of an exemplary assembly including a mounting portion and an implement-retaining portion.

FIGS. 14A-14I are cross-sectional views of the assembly of FIG. 12 referenced from line 14-14 of FIG. 11B.

FIGS. 14A'-14I' are cross-sectional views of the assembly of FIG. 12 referenced from line 14'-14' of FIG. 11B.

FIGS. 29A-29E are cross-sectional views of the assembly of FIG. 25 referenced from line 29 of FIG. 28.

DETAILED DESCRIPTION OF THE INVENTION

Figure 1:
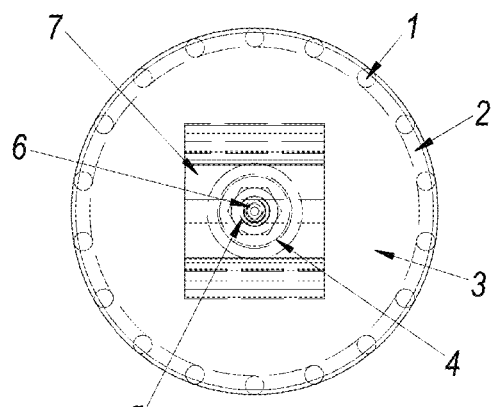
FIG. 1 is a top view of an exemplary assembly including a mounting portion and an implement-retaining portion.
Figure 3:
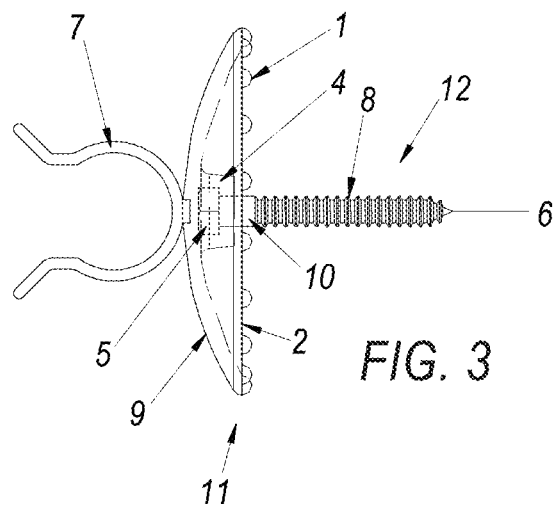
FIG. 3 is a front side view of the assembly of FIG. 1.
Figure 2:
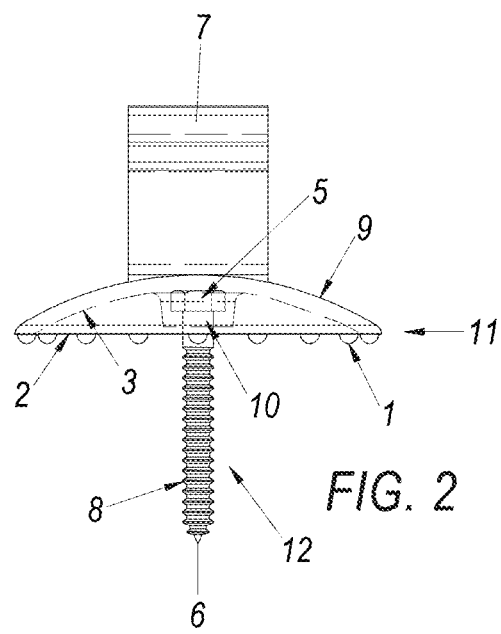
FIG. 2 is a lateral side view of the assembly of FIG. 1.
Figure 5:
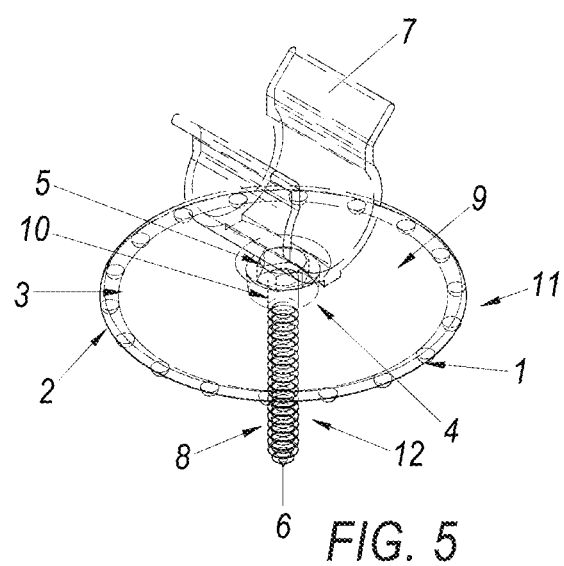
FIG. 5 is a perspective view of the assembly of FIG. 1.
Figure 4:
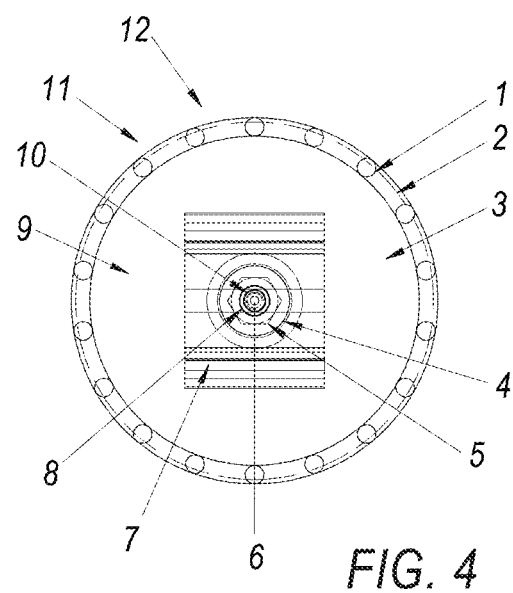
FIG. 4 is a bottom view of the assembly of FIG. 1.
Figure 6:
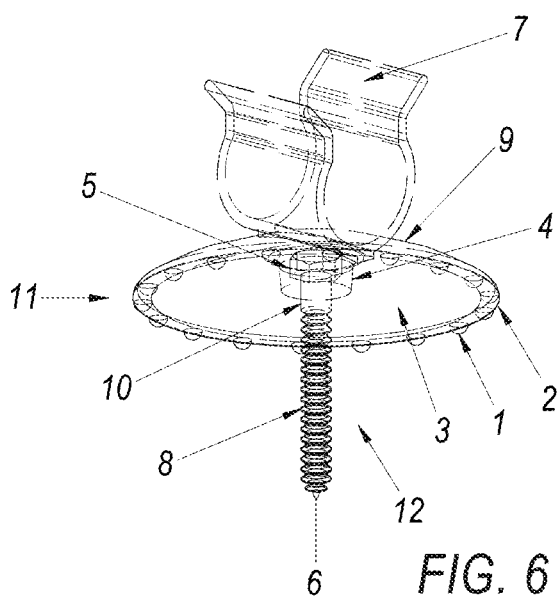
FIG. 6 is another perspective view of the assembly of FIG. 1.
Figure 7:
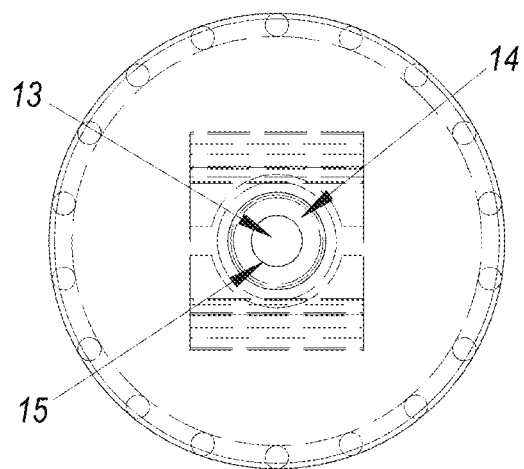
FIG. 7 is a top view of an exemplary assembly including a mounting portion and an implement-retaining portion.
Figure 8:
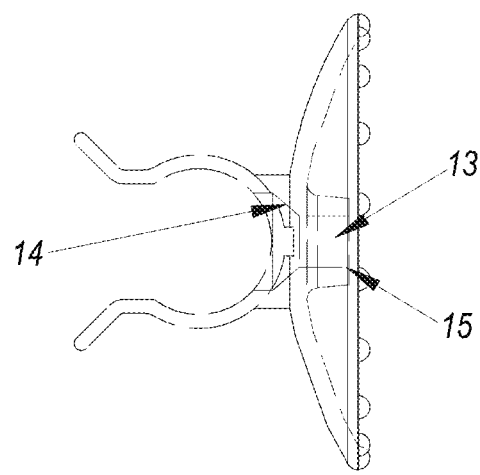
FIG. 8 is a front side view of the assembly of FIG. 7.
Figure 9:
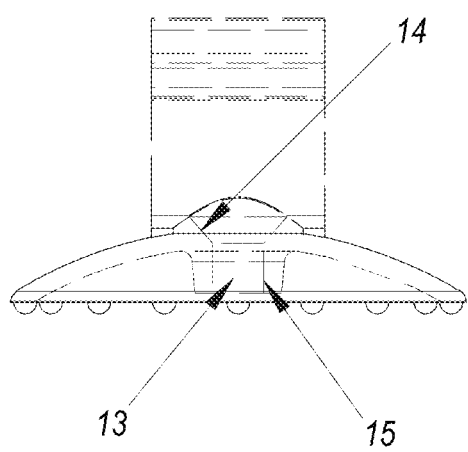
FIG. 9 is a lateral side view of the assembly of FIG. 7.
Figure 10:
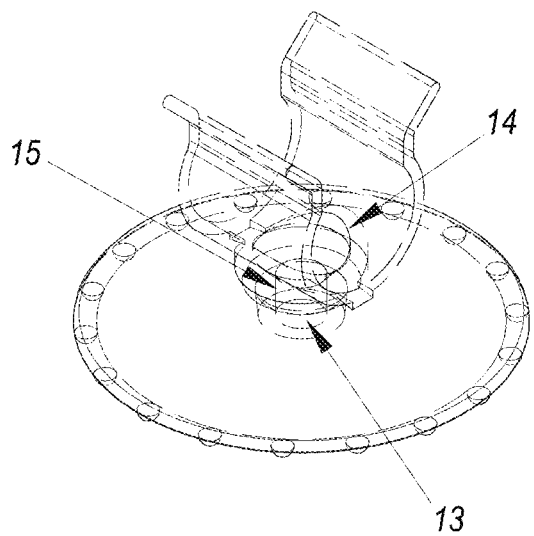
FIG. 10 is a perspective view of the assembly of FIG. 7.

The figures illustrate an exemplary implementation of an assembly including a mounting portion and an implement-retaining portion. Based on the foregoing, it is to be generally understood that the nomenclature used herein is simply for convenience and the terms used to describe the invention should be given the broadest meaning by one of ordinary skill in the art.

Referring to FIGS. 1-6, an assembly including a rotatably-adjustable, self-boring mount for fixtures may include a hollow, deformable, dome-shaped base element 11 made of a thermoplastic material. In some examples, the base element 11 may be defined by a ratio in which the ratio of the width of the base element 11 to the height of the base element 11 can be between 4 inches and 8 inches. In another example, a diameter of the base element 11 may be between 1.5 inches and 2.5 inches. A self-boring, screw element 12 may be attached to the underside of the base element 11. In some implementations, the base element 11 includes a convex, fixture-supporting topside portion 9, a concave, substrate-facing, underside portion 3 opposite the topside portion 9, a generally cylindrical or frustoconical hub 4 extending perpendicularly away from a center of the underside portion 3, and a substrate-engaging portion defined by a circumferential edge 2 of the base element 11. A plurality of protuberances 1 (which may alternatively be referred to as a "detents" or "nubs") extends away from the circumferential edge 2. Each detent 1 may be defined by a hemispherical shape and a base diameter that is less than or equal to a width of the circumferential edge 2. The protuberances 1 may be uniformly spaced-apart along the circumferential edge 2. The detents 1 provide additional friction between the circumferential edge 2 and an underlying substrate in order to prevent unintentional rotation of the base element 11. The generally cylindrical or frustoconical hub 4 may be defined by a flat lower surface. When arranged adjacent an underlying substrate, the lower surface of the generally cylindrical or frustoconical hub 4 prevent the screw element 12 to further penetration of the underlying substrate, which, in turn, prevents an excessive deformation of base element 11. The screw element 12 may include a non-circular head portion 5 (e.g., a hex head, a thumb-screw head or the like) that resists twisting when embedded in the base element 11, a shaft with a threaded portion 8, an optional non-threaded portion 10, and a pointed substrate-engaging tip 6 with sharp threads to facilitate self-boring penetration of the underlying substrate and fixation to the underlying substrate with sufficient grip to compress the circumferential edge 2 against the underlying substrate in order to effectuate a counteracting elastic deformation of the dome-shaped base element 11. The non-circular head portion 5 is rigidly embedded in the generally cylindrical or frustoconical hub 4. The threaded portion 8 may have a thread density between approximately about 10-to-16 threads per inch. The treaded portion 8 and the non-threaded portion 10 (which may be collectively referred to as the "shank" of the screw element) may be optionally tapered. The top 6 of the screw element 12 may be optionally defined as a self-tapping tip and/or a self-drilling tip. The length of the screw element 12 may be any desirable length between about, for example, 0.5 inches and 1.5 inches. A fixture such as a conduit holder 7 may be attached to the topside portion 9 of the base element 11.

Because the base element 11 may be rigidly attached to the screw element 12, a force applied to the fixture 7 in a plane substantially perpendicular to an axis extending along the length of the screw element 12 is counteracted by a force exerted upon the underlying substrate by the circumferential edge 2 of the elastically deformable, spring-like base element 11; this spring-like quality imparts additional strength to the overall assembly while: (1) the screw element 12 still permits quick and easy installation, and (2) the spring-like quality of base element 11 permits 360° rotation of the assembly while maintaining uniform pressure against the underlying substrate, thereby preserving strength regardless of the rotational positioning of the assembly.

Another assembly including a rotatably-adjustable, self-boring mount for fixtures is shown at FIGS. 7-10. The assembly illustrated at FIGS. 7-10 is substantially similar to the assembly illustrated at FIGS. 1-6 with the exception that a self-boring, single screw (see e.g., screw element 12 of FIGS. 1-6) is not insert-molded into the base element (see e.g., screw element 11 of FIGS. 1-6). Rather, a countersunk hole 13 is provided into which a separate, self-boring, single screw may be inserted and seated. In some instances, the hole 13 may be bored through an axial center of the base element 11 and the generally cylindrical or frustoconical hub 4. The hole 13 may be defined by a wider, optionally conical and tapered upper portion 14 and a narrower lower portion 15 such that a screw (not shown and supplied separately) including a head portion and a narrower shaft portion can be inserted into the hole with the bottom of said head portion seated against the surface formed by the junction of the wider upper portion 14 and the narrower lower portion 15 of the hole 13. In some examples, the head portion may be narrower than the diameter of the wider upper portion 14 of the hole 13, but wider than the diameter of the narrower lower portion 15 of the hole 13. In other examples, the upper portion of the hole 13 is conical and tapered. The assembly may be affixed to an underlying substrate with a separately-supplied screw (not shown).

The assembly depicted in FIGS. 1-6 and the assembly depicted in FIGS. 7-10 may be interfaced with a conduit holder that is attached to the top portion 9 of the rotatable base element 11. However, the implementations of the assemblies disclosed respectively at FIGS. 1-6 and FIGS. 7-10 are exemplary uses. Accordingly, other assemblies may include different holders, fixtures, hooks, anchors, or cleats (rather than a conduit holder).

In some examples, the screw element 12 may be defined by a 1.5" steel screw element that is insert-molded with a 2" diameter base element 11 formed from polypropylene in an injection-molding machine. Typically, the wall thickness of base element 11 (i.e. the distance between the convex, fixture-supporting topside portion 9 and the concave, substrate-facing, underside portion 3) is uniform. An exemplary wall thickness (when, for example, the base element 11 is defined by a 2" diameter and formed from polypropylene) may be 0.093 inches. In other examples, the base element 11 may be made of any elastic material so long as the wall thickness of the base element 11 is adjusted correlatively to produce a similar modulus of flexibility. In the embodiment described above at FIGS. 1-6, the generally cylindrical or frustoconical hub 4 extends from the center of the underside portion 3 of the base element 11 in the direction of the underlying substrate along the axis of the screw element 12 at a distance less than the furthest extent of the nubs 1 on the circumferential edge 2 by 150% of the thread pitch of the screw element 12; this relationship between the lower extent of the base element 11 and the lower extent of the generally cylindrical or frustoconical hub 4 permits the base element 11 to rotate 360° while maintaining contact between the nubs 1 and the underlying substrate, yet avoids excessive deformation of the base element 11 by over-penetration of the screw element 12 into the underlying substrate.

FIGS. 11A-13, 14F and 14F' illustrate an exemplary assembly shown generally at 100. The assembly 100 includes a mounting portion 112 and an implement-retaining portion 114. The mounting portion 112 removably-secures the assembly 100 to an underlying substrate S (see, e.g., FIGS. 11A-11B), such as, for example, a tree, drywall, a wall stud or the like. The implement-retaining portion 114 removably-secures an implement (e.g., an article of clothing such as a hat, a smart phone, a camera, or the like—not shown) to the assembly 100. As will become apparent in the following disclosure, the mounting portion 112 provides mating structure (e.g., a plurality of male-receiving portions 128 as seen in FIG. 12) that acts as a universal interface that permits attachment of a variety of different implement-retaining portions 114 (see e.g., FIGS. 21-24) each having a mating structure (e.g., a plurality of male portions 138 as seen in FIG. 12) that corresponds to the mating structure of the mounting portion 112.

Figure 11A:
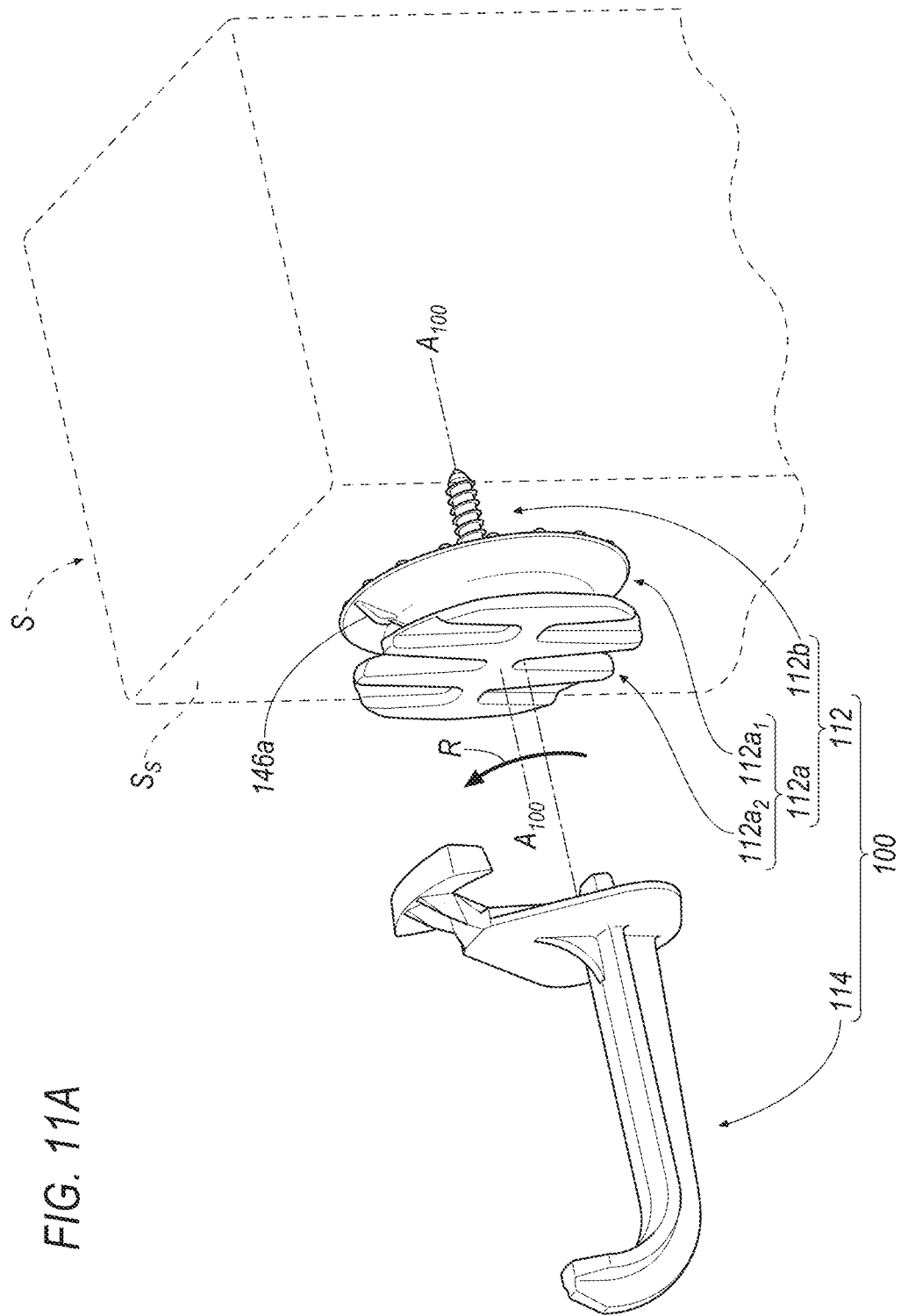
FIG. 11A is an exploded perspective view of an exemplary assembly including a mounting portion and an implement-retaining portion.

As seen in FIG. 11A, the mounting portion 112 includes a body portion 112a and a substrate-penetrating portion 112b. The body portion 112a may be further defined by a substrate-engaging portion $112a_1$ and an implement retainer interface portion $112a_2$.

Figure 11B:
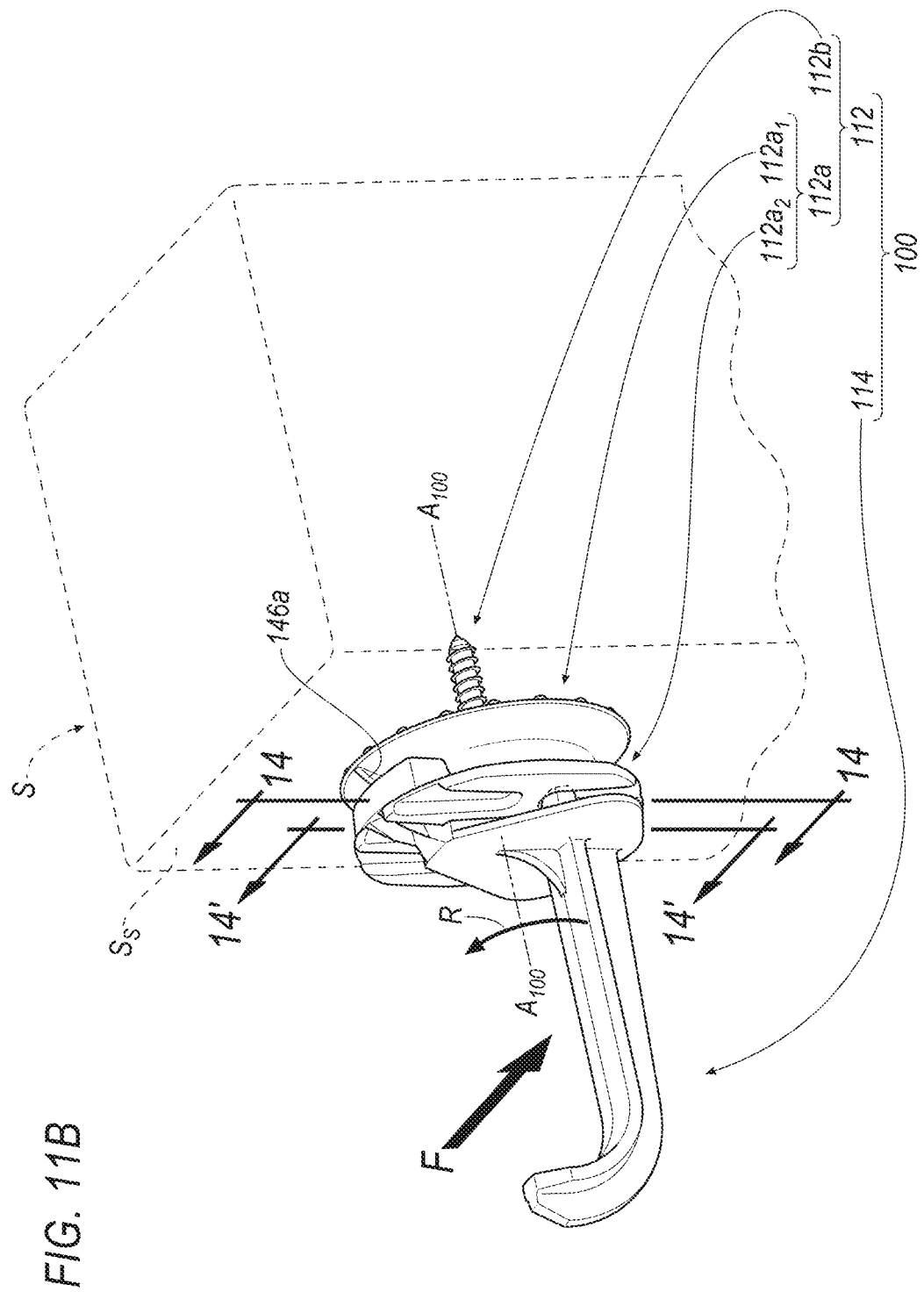
FIG. 11B is an assembled perspective view of the assembly of FIG. 11
Figure 13:
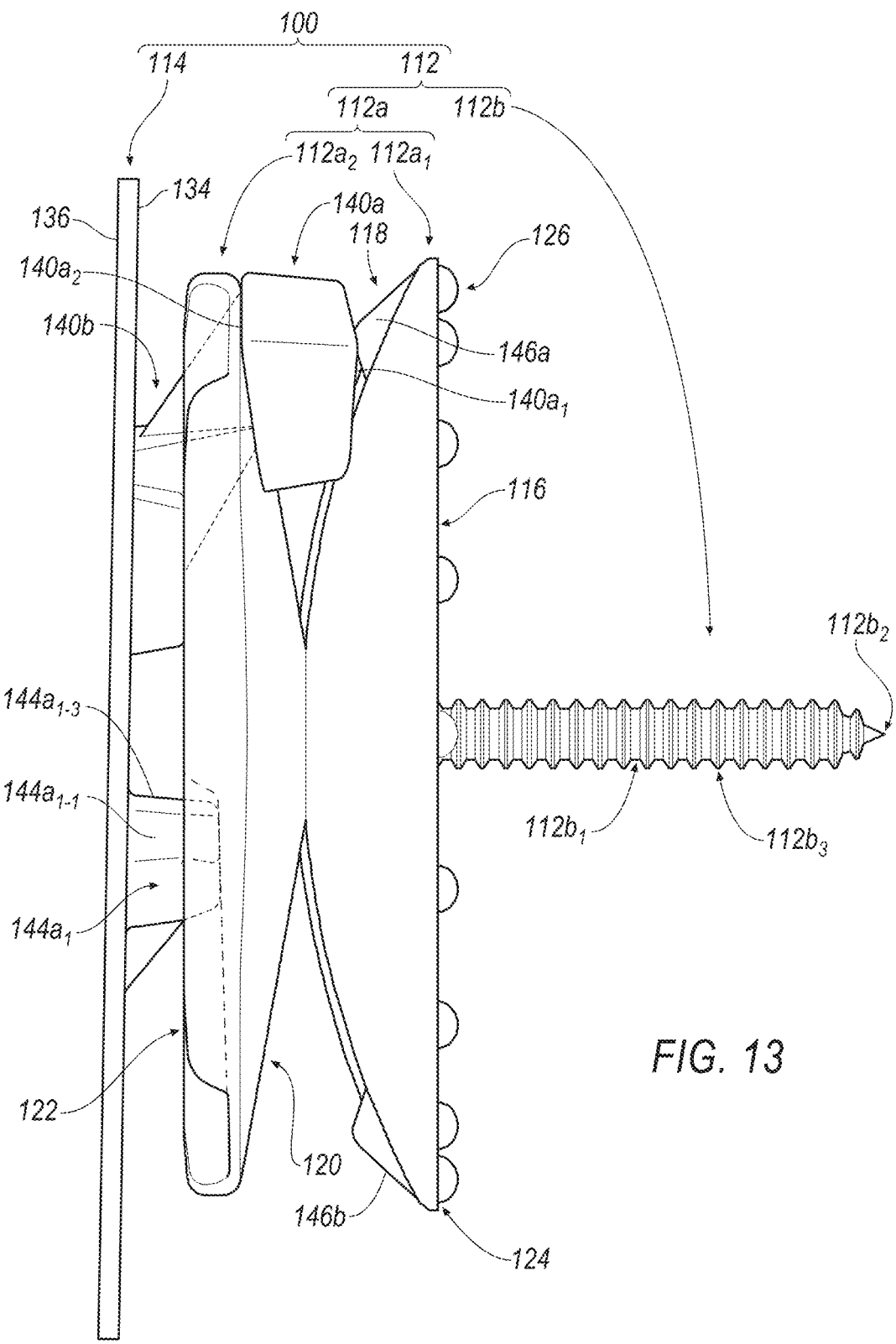
FIG. 13 is a side view of the assembly of FIG. 12 arranged in an assembled state.

Referring to FIGS. 11A-11B, when the mounting portion 112 of the assembly 100 is removably-secured to the underlying substrate S, the substrate-engaging portion $112a_1$ of the body portion 112a may be disposed adjacent an exterior surface $S_S$ of the underlying substrate S. Furthermore, when the mounting portion 112 of the assembly 100 is removably-secured to the underlying substrate S, the substrate-penetrating portion 112b may be at least partially extended into at least a portion of a thickness of the underlying substrate S.

In some implementations, at least the substrate-engaging portion $112a_1$ of the body portion 112a of the mounting portion 112 may be permitted to bend or flex relative to the implement retainer interface portion $112a_2$ of the body portion 112a of the mounting portion 112. The bending or flexibility of the substrate-engaging portion $112a_1$ may result from one or both of, for example, a reduction in a thickness of the substrate-engaging portion $112a_1$ and a selection of a non-rigid, flexible material (e.g., polypropylene) utilized for forming the substrate-engaging portion $112a_1$. Accordingly, in some examples, the implement retainer interface portion $112a_2$ may be defined by the same material (e.g., polypropylene) as the substrate-engaging portion $112a_1$ but formed to be defined by a comparatively greater thickness than that of the substrate-engaging portion $112a_1$ (in order to inhibit or resist bending or flexing of the implement retainer interface portion $112a_2$); alternatively, the implement retainer interface portion $112a_2$ may be formed from a rigid, non-flexible material such that the mounting portion 112 is formed in a multi-shot or two-shot injection molding process whereby the substrate-engaging portion $112a_1$ is formed from a first, flexible material and the implement retainer interface portion $112a_2$ is formed from a second, non-flexible material.

In some examples, the substrate-penetrating portion 112b may be formed from a rigid, non-flexible material (e.g., a metal such as, for example, steel). Furthermore, as seen, for example, in FIGS. 13 and 14A-14I', the substrate-penetrating portion 112b may be, for example, a self-boring threaded fastener (e.g., a screw) defined by a shaft portion $112b_1$ having a sharp distal tip $112b_2$ and a threaded portion $112b_3$ extending away from the shaft portion $112b_1$.

While the rigidity of the implement retainer interface portion $112a_2$ of the body portion $112a$ of the mounting portion $112$ and the substrate-penetrating portion $112b$ may result in a more robust assembly $100$ that permits heavier implements to be supported by the assembly $100$ and be secured to the underlying substrate S, the relative flexibility of the substrate-engaging portion $112a_1$ of the body portion $112a$ of the mounting portion $112$ provides a beneficial functionality of the assembly $100$. For example, when an external force (see, e.g., arrow F in FIG. 11B) is directed to one or both of the implement-retaining portion $114$ and the body portion $112a$ of the mounting portion $112$, the substrate-engaging portion $112a_1$ of the body portion $112a$ of the mounting portion $112$ may flex and partially distribute the externally-applied force F to the exterior surface $S_S$ of the underlying substrate S such that all of the externally-applied force F is not translated to and concentrated upon a head portion $112b4$ (see, e.g., FIGS. 14A-14I) of the substrate-penetrating portion $112b$. As a result of the partial distribution of the externally-applied force F by the substrate-engaging portion $112a_1$ of the body portion $112a$ of the mounting portion $112$, the mounting portion $112$ is less likely to be sheared off from the head portion $112b4$ of the substrate-penetrating portion $112b$ of the assembly $100$ thereby mitigating damage to one or more of the assembly $100$ and the underlying substrate S.

In some instances, the substrate-penetrating portion $112b$ may be joined to the substrate-engaging portion $112a_1$ of the body portion $112a$ of the mounting portion $112$ by, for example, arranging the head portion $112b4$ of the substrate-penetrating portion $112b$ within a passage, recess or cavity $115$ (see, e.g., FIGS. 14A-14I) formed by the substrate-engaging portion $112a_1$ of the body portion $112a$ of the mounting portion $112$. In some examples, the substrate-penetrating portion $112b$ may be arranged within a mold tool (not shown) such that when the substrate-engaging portion $112a_1$ of the body portion $112a$ of the mounting portion $112$ is formed by material injected into the mold tool, the injected material defining the substrate-engaging portion $112a_1$ of the body portion $112a$ of the mounting portion $112$ may be molded over the head portion $112b4$ of the substrate-penetrating portion $112b$ such that the head portion $112b4$ forms the recess or cavity $115$ of the substrate-engaging portion $112a_1$ of the body portion $112a$ of the mounting portion $112$. In other examples, the recess or cavity $115$ of the substrate-engaging portion $112a_1$ of the body portion $112a$ of the mounting portion $112$ may be pre-formed by a mold tool and the head portion $112b4$ of the substrate-penetrating portion $112b$ may be subsequently inserted into the pre-formed recess or cavity $115$ of the substrate-engaging portion $112a_1$ of the body portion $112a$ of the mounting portion $112$.

Referring to FIG. 12, the implement retainer interface portion $112a_2$ of the body portion $112a$ of the mounting portion $112$ is shown including a plurality of male-receiving portions $128$ defined by a plurality of female portions $130$ and a plurality of wedging passages $132$. Furthermore, the implement-retaining portion $114$ is shown including a plurality of male portions $138$ defined by a first wedging portion $140$, a second wedging portion $142$ and a pair of registration portions $144$. As seen in FIG. 12, a plurality of dashed lines are shown for the purpose of providing an exemplary illustration of the correspondence between the plurality of male-receiving portions $128$ of the mounting portion $112$ and the plurality of male portions $138$ of the implement-retaining portion $114$. When the plurality of male portions $138$ of the implement-retaining portion $114$ are interfaced with (some but not all of) the male-receiving portions $128$ of the mounting portion $112$, the assembly $100$ is formed as seen, for example in FIGS. 11B, 13, 14F and 14F'. Exemplary steps for assembling the assembly $100$ is shown and described at FIGS. 14A-14F; furthermore, steps for disassembling the assembly $100$ is shown and described at FIGS. 14G-14I'.

Figure 15:
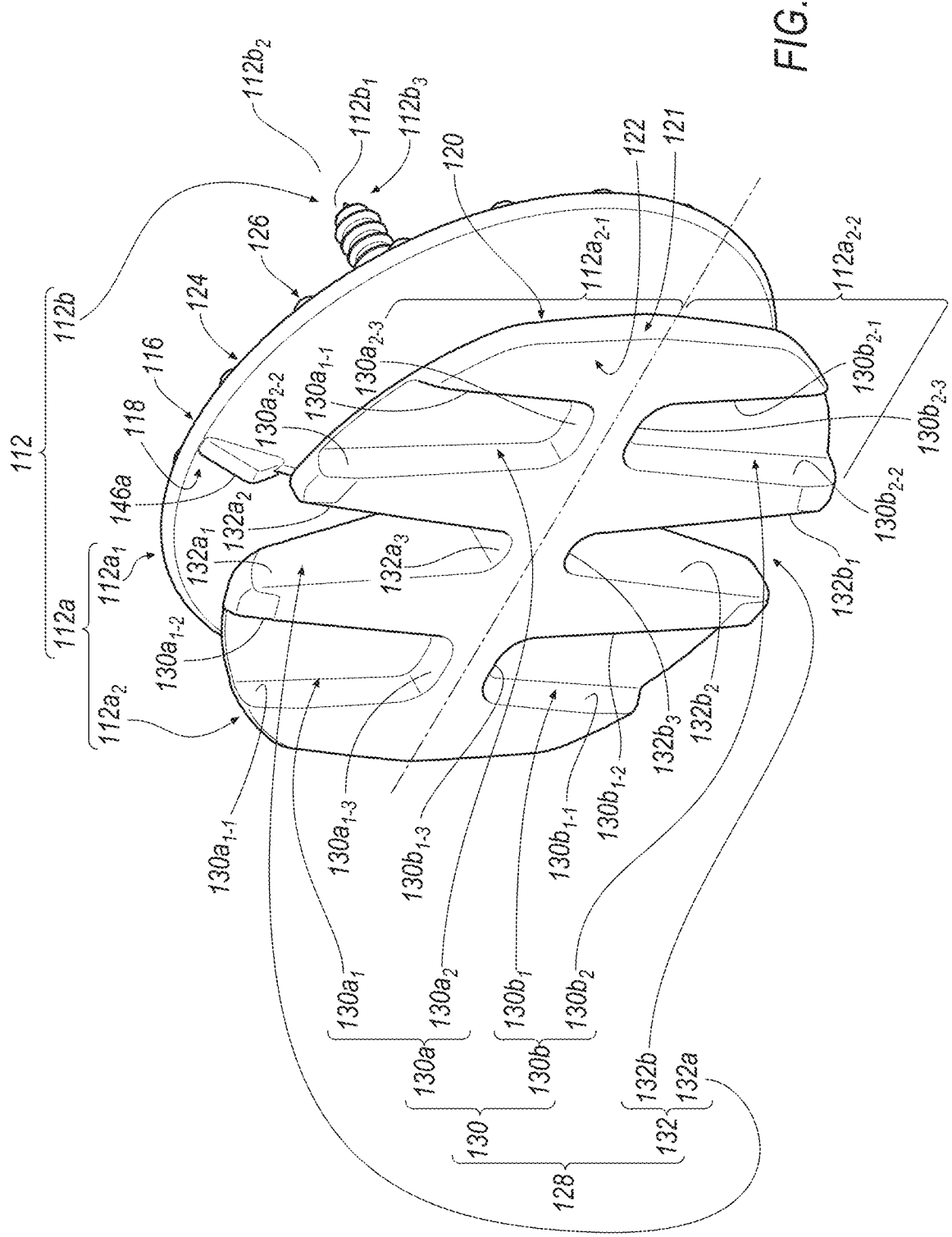
FIG. 15 is a perspective view of an exemplary mounting portion.
Figure 17:
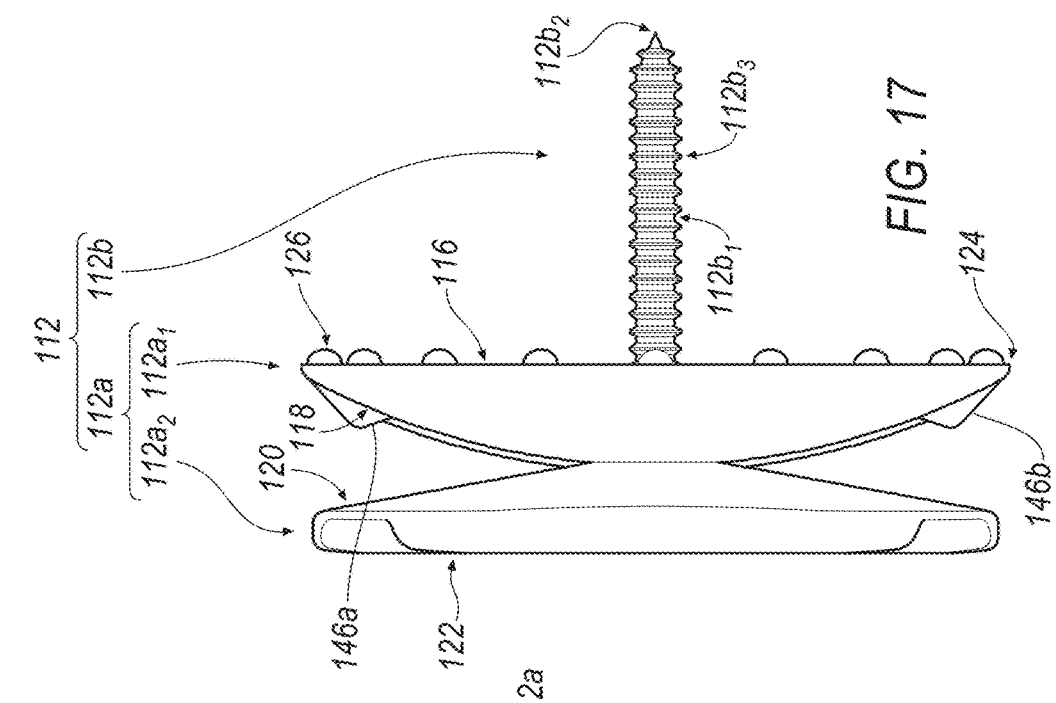
FIG. 17 is a side view of the mounting portion of FIG. 15.
Figure 16:
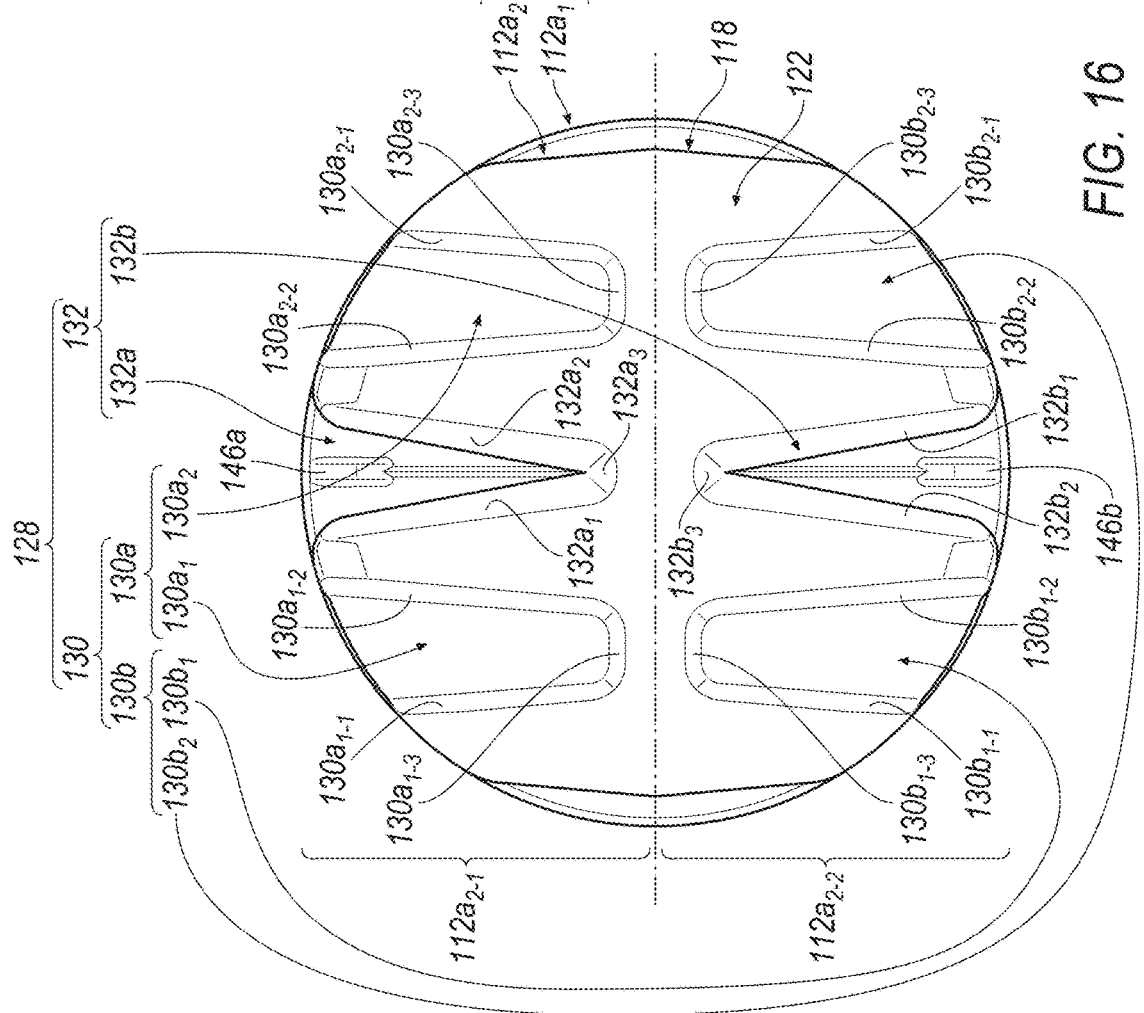
FIG. 16 is a front view of the mounting portion of FIG. 15.

Referring to FIGS. 15-17, an implementation of the mounting portion $112$ is described. With reference to FIG. 17, the substrate-engaging portion $112a_1$ of the body portion $112a$ of the mounting portion $112$ may be defined by: (1) a substrate-mounting surface $116$ that is shaped for contacting the exterior surface $S_S$ of the underlying substrate S and (2) an opposite, non-mounting surface $118$ that is shaped to not contact the exterior surface $S_S$ of the underlying substrate S.

With reference to FIG. 17, the implement retainer interface portion $112a_2$ of the body portion $112a$ of the mounting portion $112$ may be defined by a neck-portion-engaging surface $120$ that is shaped for contacting a surface (see, e.g., $140a_2$ in FIG. 20) of at least one male portion (see, e.g., $140$ in FIG. 20) of the plurality of male portions $138$ of the implement-retaining portion $114$. Furthermore, the implement retainer interface portion $112a_2$ of the body portion $112a$ of the mounting portion $112$ may be further defined by an opposite, implement-retaining-portion-engaging surface $122$ that is shaped to contact and/or be arranged opposite a mounting-portion-engaging surface $134$ (see, e.g., FIGS. 18-20) of the implement-retaining portion $114$.

As seen in FIG. 17, each of the non-mounting surface $118$ of the substrate-engaging portion $112a_1$ of the body portion $112a$ of the mounting portion $112$ and the neck-portion-engaging surface $120$ of the implement retainer interface portion $112a_2$ of the body portion $112a$ of the mounting portion $112$ may be defined by a dome shape. A peak or summit of the dome shape of each of the non-mounting surface $118$ and the neck-portion-engaging surface $120$ are disposed adjacent one another for joining the substrate-engaging portion $112a_1$ of the body portion $112a$ of the mounting portion $112$ to the implement retainer interface portion $112a_2$ of the body portion $112a$ of the mounting portion $112$.

Furthermore, as seen in FIGS. 15 and 17, the substrate-mounting surface $116$ of the substrate-engaging portion $112a_1$ of the body portion $112a$ of the mounting portion $112$ may be defined by a circumferential engagement lip $124$ that is shaped for contacting the exterior surface $S_S$ of the underlying substrate S. In some instances, the circumferential engagement lip $124$ may be further defined to include a plurality of detents, nubs or protuberances $126$. When arranged adjacent the exterior surface $S_S$ of the underlying substrate S, the plurality of protuberances $126$ may frictionally engage the exterior surface $S_S$ of the underlying substrate S, thereby resisting an over-rotation R (see, e.g., FIG. 11B) of the substrate-engaging portion $112a_1$ of the body portion $112a$ of the mounting portion $112$ relative the underlying substrate S when the mounting portion $112$ is joined to the underlying substrate S.

With reference to FIG. 15, the implement-retaining-portion-engaging surface $122$ of the implement retainer interface portion $112a_2$ of the body portion $112a$ of the mounting portion $112$ defines a plurality of male-receiving portions $128$ that are respectively sized for being interfaced with the plurality of male portions $138$ extending from the mounting-portion-engaging surface $134$ of the implement-retaining portion $114$. In an example, the plurality of male-receiving portions 128 may be defined by a plurality of female portions 130 and a plurality of wedging passages 132.

The plurality of female portions 130 may be defined by a first pair of female portions 130a (including a first female portion $130a_1$ of the plurality of female portions 130 and a second female portion $130a_2$ of the plurality of female portions 130) and a second pair of female portions 130b (including a third female portion $130b_1$ of the plurality of female portions 130 and a fourth female portion $130b_2$ of the plurality of female portions 130). The plurality of wedging passages 132 may be defined by a first wedging passage 132a and a second wedging passage 132b.

The first wedging passage 132a is associated with the first pair of female portions 130a and is arranged between the first female portion $130a_1$ and the second female portion $130a_2$. The second wedging passage 132b is associated with the second pair of female portions 130b and is arranged between the third female portion $130b_1$ and the fourth female portion $130b_2$.

As seen in FIGS. 15-16, the implement retainer interface portion $112a_2$ of the body portion 112a of the mounting portion 112 may be divided into a first (upper) half $112a_{2-1}$ and a second (lower) half $112a_{2-2}$. The first wedging passage 132a and the first pair of female portions 130a are defined by the implement-retaining-portion-engaging surface 122 and provided by the first half $112a_{2-1}$ of the implement retainer interface portion $112a_2$ of the body portion 112a of the mounting portion 112. The second wedging passage 132b and the second pair of female portions 130b are defined by the implement-retaining-portion-engaging surface 122 and provided by the second half $112a_{2-2}$ of the implement retainer interface portion $112a_2$ of the body portion 112a of the mounting portion 112.

Figure 18:
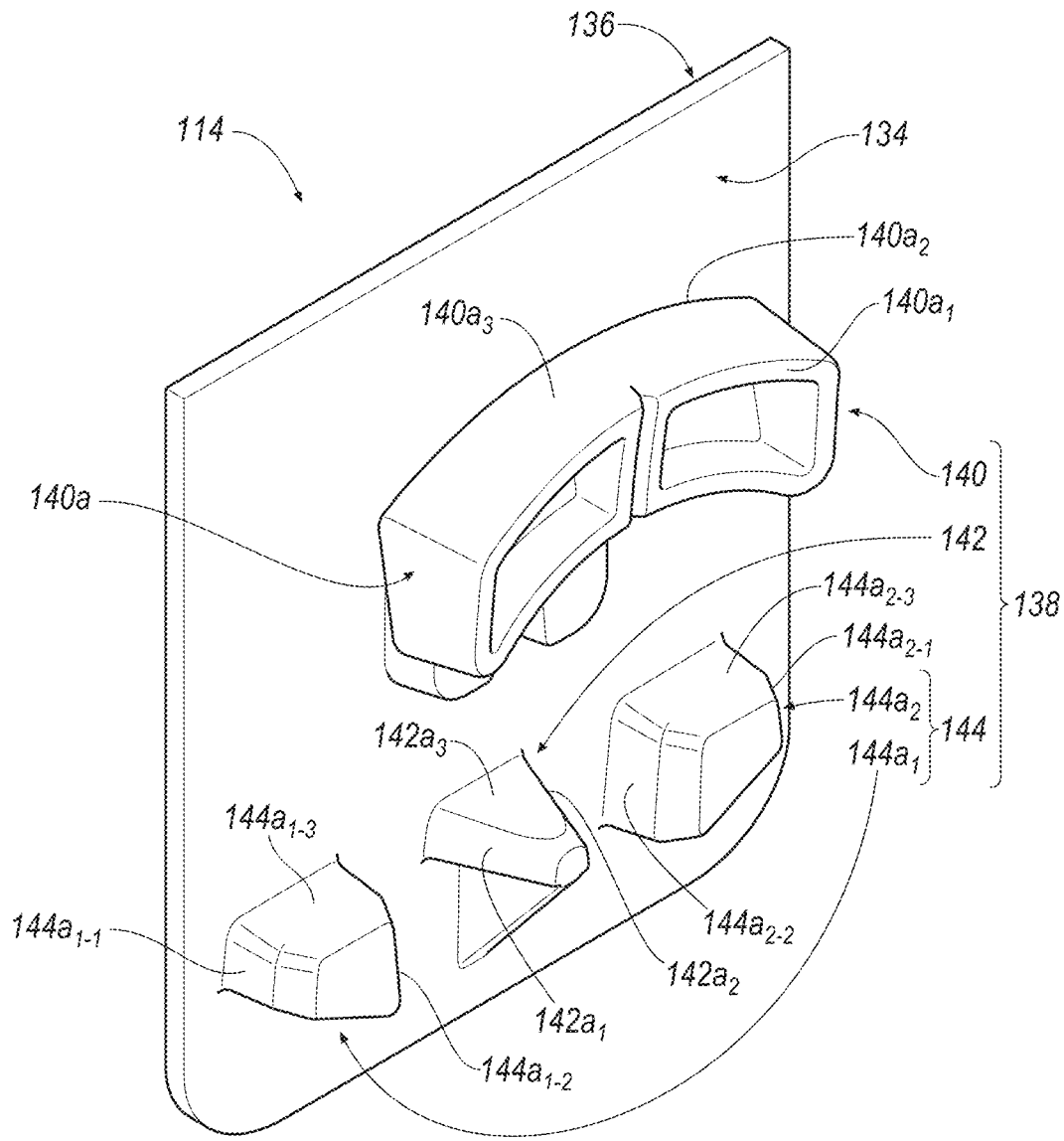
FIG. 18 is a perspective view of an exemplary implement-retaining portion.
Figure 18:
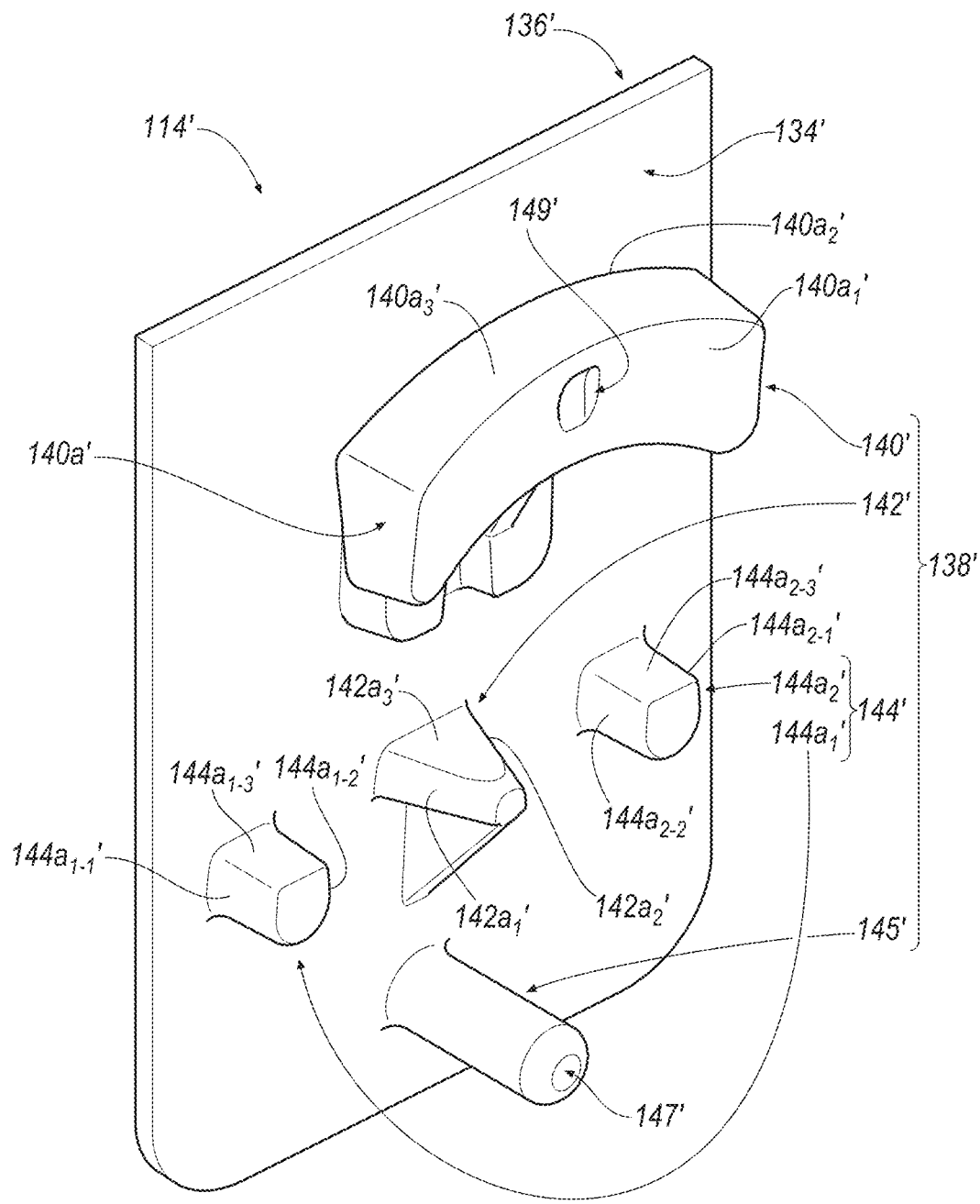
Figures 19, 20:
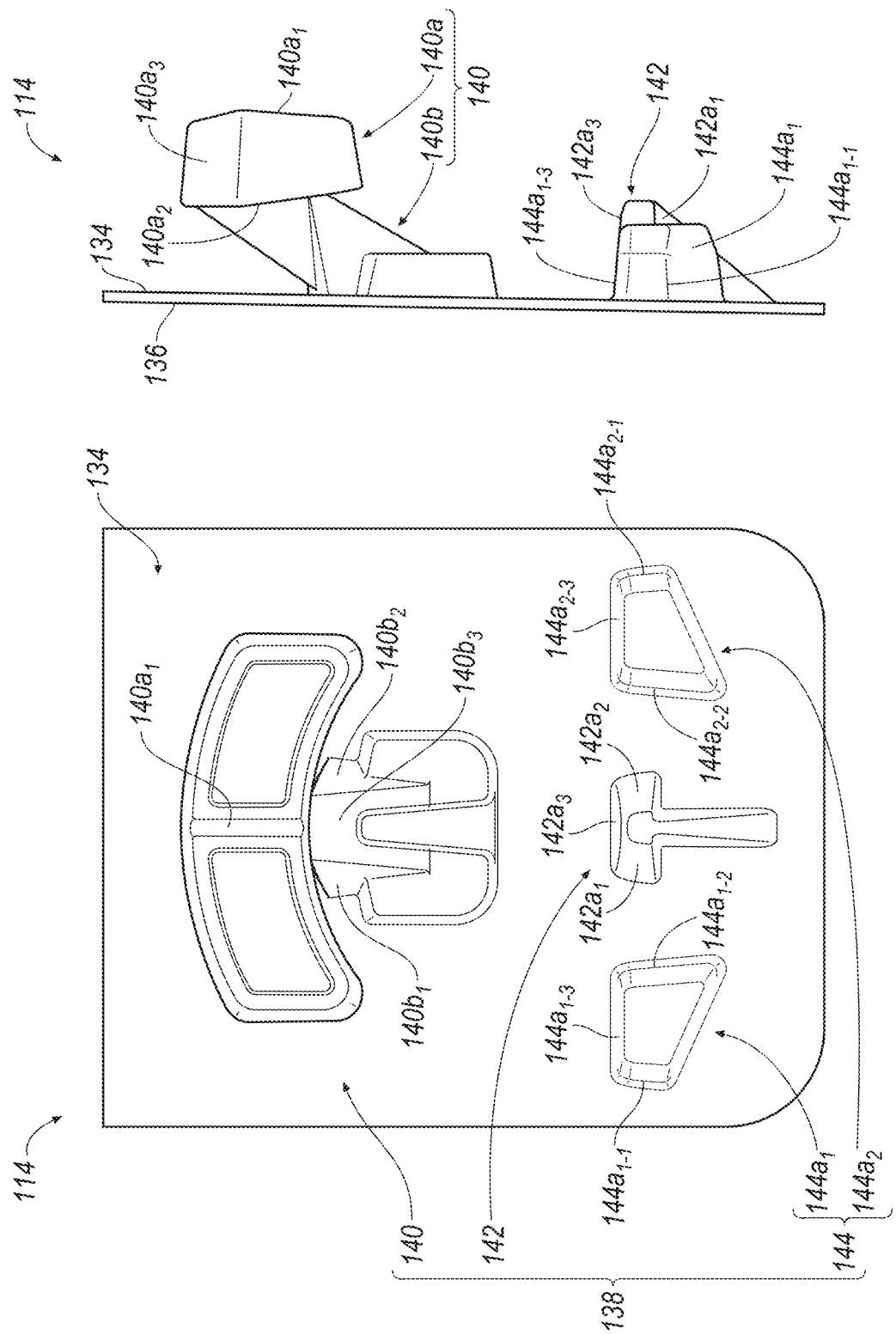
FIG. 19 is a front view of the implement-retaining portion of FIG. 18.
FIG. 20 is a side view of the implement-retaining portion of FIG. 18.
Figure 21:
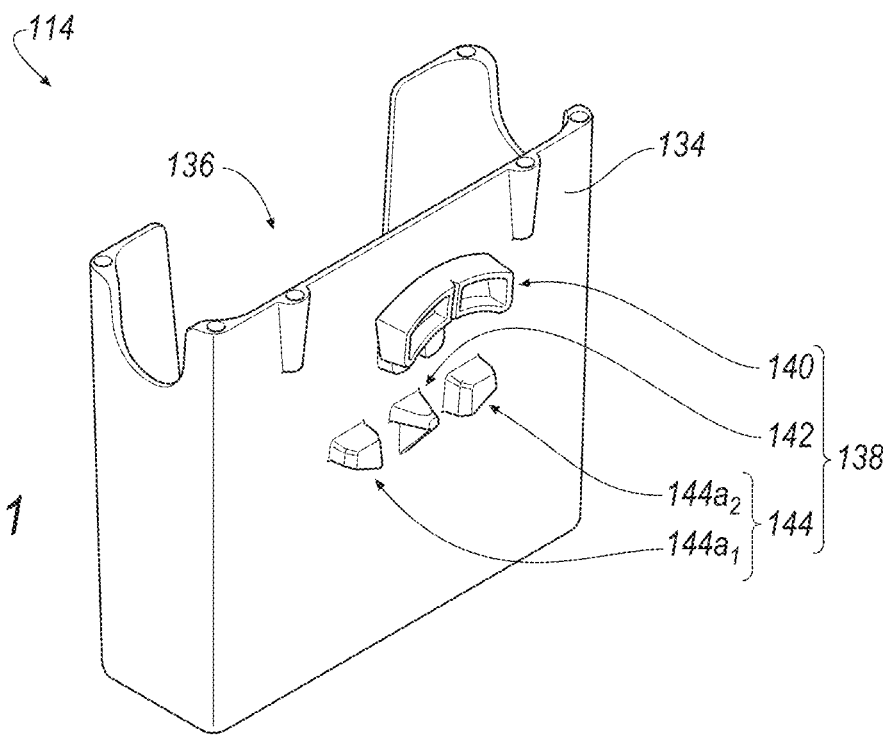
FIG. 21 is a rear perspective view of an exemplary implement-retaining portion.
Figure 22:
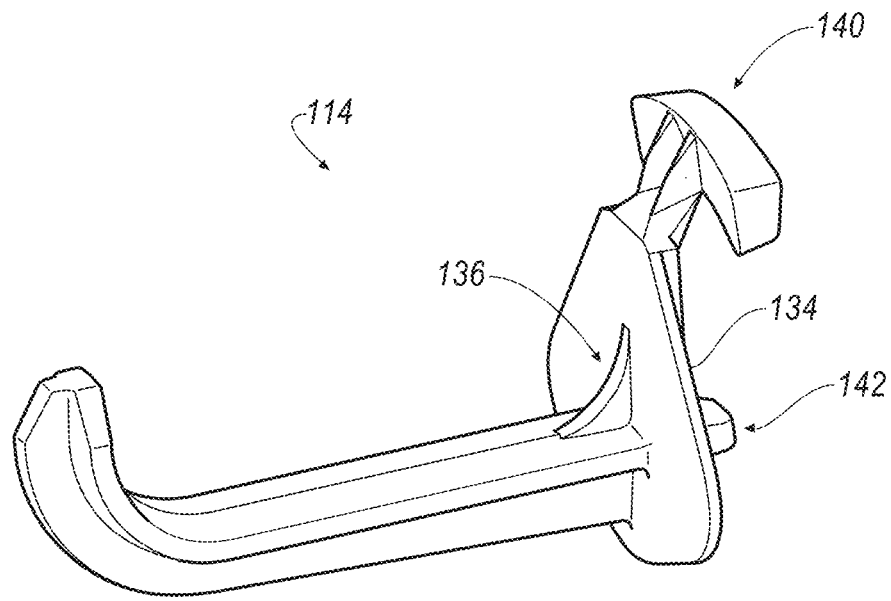
FIG. 22 is a front perspective view of an exemplary implement-retaining portion.
Figure 23:
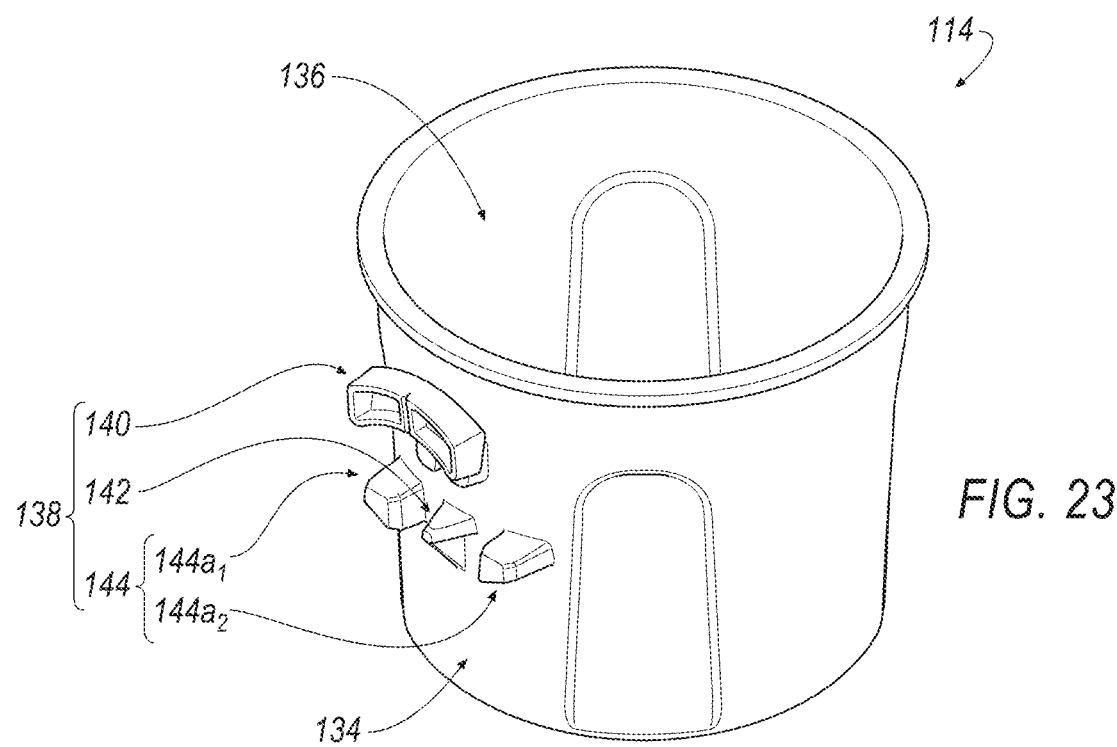
FIG. 23 is a rear perspective view of an exemplary implement-retaining portion.
Figure 24:
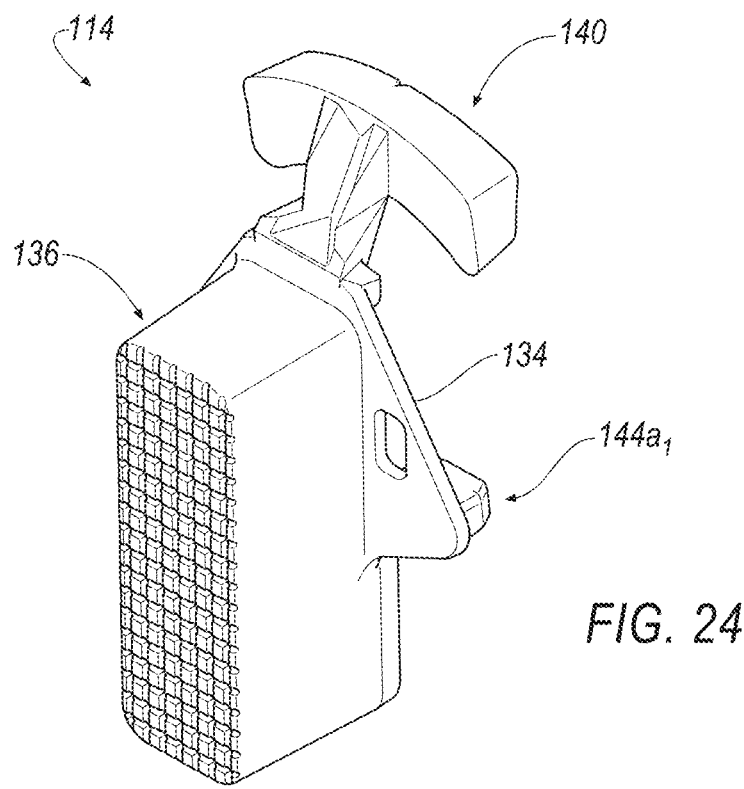
FIG. 24 is a front perspective view of an exemplary implement-retaining portion.

Referring to FIGS. 18-20, an implementation of the implement-retaining portion 114 is described. With reference to FIG. 20, the implement-retaining portion 114 may be defined by: (1) a mounting-portion-engaging surface 134 that is shaped for being arranged opposite the implement-retaining-portion-engaging surface 122 of the implement retainer interface portion $112a_2$ of the body portion 112a of the mounting portion 112 and (2) an opposite, implement-engaging surface 136 that is shaped for being interfaceable with an implement (e.g., an article of clothing such as a hat, a smart phone, a camera, or the like). As will be described below in the following disclosure at FIGS. 21-24, the implement-engaging surface 136 may include any desirable geometry such as, for example, a flat surface (as seen in FIG. 20) with, for example, an adhesive, a storage pocket (see, e.g., FIGS. 21, 23), a hook (see e.g., FIGS. 11A-11B, 22), a frictional surface defined by bumps (see, e.g., FIG. 24) or the like for retaining an implement (e.g., an article of clothing such as a hat, a smart phone, a camera, or the like) thereto.

With reference to FIGS. 18-20, the plurality of male portions 138 extend away from the mounting-portion-engaging surface 134. The plurality of male portions 138 may include a first wedging portion 140, a second wedging portion 142 and a pair of registration portions 144 (defined by a first registration portion $144a_1$ and a second registration portion $144a_2$).

With reference to FIG. 20, the first wedging portion 140 may be defined by a head portion 140a and a neck portion 140b. The neck portion 140b is connected to the head portion 140a. The neck portion 140b extends away from the mounting-portion-engaging surface 134.

As seen in FIG. 19, the neck portion 140b includes a first side surface $140b_1$ and an opposite second side surface $140b_2$ that are joined by an intermediate surface $140b_3$. The first side surface $140b_1$ and the second side surface $140b_2$ may be arranged in a non-parallel, converging relationship. With reference to FIGS. 15 and 16, the first side surface $140b_1$ of the neck portion 140b is sized for being disposed adjacent a first wall surface $132a_1$ defined by the first wedging passage 132a or a first wall surface $132b_1$ defined by the second wedging passage 132b. With continued reference to FIGS. 15 and 16, the second side surface $140b_2$ of the neck portion 140b is sized for being disposed adjacent a second wall surface $132a_2$ defined by the first wedging passage 132a or a second wall surface $132b_2$ defined by the second wedging passage 132b.

Referring to FIG. 20, the head portion 140a includes a first surface $140a_1$ and an opposite second surface $140a_2$ that are joined by an intermediate surface $140a_3$. As seen in FIG. 14F, the first surface $140a_1$ of the head portion 140a is arranged in an opposing relationship with respect to the non-mounting surface 118 of the substrate-engaging portion $112a_1$ of the body portion 112a of the mounting portion 112 when the assembly 100 is arranged in an un-biased state; conversely, when an externally-applied force F is applied to the assembly 100 as described above, the first surface $140a_1$ of the head portion 140a is sized for being disposed adjacent the non-mounting surface 118 of the substrate-engaging portion $112a_1$ of the body portion 112a of the mounting portion 112 when an external force F is applied to the assembly 100. Furthermore, as seen in FIG. 14F, the second surface $140a_2$ of the head portion 140a is sized for being arranged adjacent the neck-portion-engaging surface 120 of the implement retainer interface portion $112a_2$ of the body portion 112a of the mounting portion 112.

With reference to FIGS. 18-20, the second wedging portion 142 is shown extending away from the mounting-portion-engaging surface 134. As seen in FIG. 19, second wedging portion 142 includes a first side surface $142a_1$ and an opposite second side surface $142a_2$ that are joined by an intermediate surface $142a_3$. The first side surface $142a_1$ and the second side surface $142a_2$ may be arranged in a non-parallel, converging relationship. With reference to FIGS. 15 and 16, the first side surface $142a_1$ of the second wedging portion 142 is sized for being disposed adjacent the first wall surface $132b_1$ defined by the second wedging passage 132b or the first wall surface $132a_1$ defined by the first wedging passage 132a. With continued reference to FIGS. 15 and 16, the second side surface $142a_2$ of the second wedging portion 142 is sized for being disposed adjacent the second wall surface $132b_2$ defined by the second wedging passage 132b or the second wall surface $132a_2$ defined by the first wedging passage 132a. Furthermore, the intermediate surface $142a_3$ of the second wedging portion 142 is sized for being disposed adjacent an intermediate wall surface $132b_3$ defined by the second wedging passage 132b or an intermediate wall surface $132a_3$ defined by the first wedging passage 132a.

With reference to FIGS. 18-20, the first registration portion $144a_1$ of the pair of registration portions 144 is shown extending away from the mounting-portion-engaging surface 134. As seen in FIG. 19, first registration portion $144a_1$ includes a first side surface $144a_{1-1}$ and an opposite second side surface $144a_{1-2}$ that are joined by an intermediate surface $144a_{1-3}$. The first side surface $144a_{1-1}$ and the second side surface $144a_{1-2}$ may be arranged in a non-parallel, converging relationship.

With reference to FIGS. 15 and 16, the first side surface $144a_{1-1}$ of the first registration portion $144a_1$ is sized for being disposed adjacent a first wall surface $13ba_{2-1}$ defined by the fourth female portion $130b_2$ of the plurality of female portions 130 or a first wall surface $130a_{1\text{-}1}$ defined by the first female portion $130a_1$ of the plurality of female portions 130. With continued reference to FIGS. 15 and 16, the second side surface $144a_{1\text{-}2}$ of the first registration portion $144a_1$ is sized for being disposed adjacent a second wall surface $130b_{2\text{-}2}$ defined by the fourth female portion $130b_2$ of the plurality of female portions 130 or a second wall surface $130a_{1\text{-}2}$ defined by the first female portion $130a_1$ of the plurality of female portions 130. Furthermore, the intermediate surface $144a_{1\text{-}3}$ of the first registration portion $144a_1$ is sized for being disposed adjacent an intermediate wall surface $130b_{2\text{-}3}$ defined by the fourth female portion $130b_2$ of the plurality of female portions 130 or an intermediate wall surface $130a_{1\text{-}3}$ defined by the first female portion $130a_1$ of the plurality of female portions 130.

With reference to FIGS. 18-20, the second registration portion $144a_2$ of the pair of registration portions 144 is shown extending away from the mounting-portion-engaging surface 134. As seen in FIG. 19, second registration portion $144a_2$ includes a first side surface $144a_{2\text{-}1}$ and an opposite second side surface $144a_{2\text{-}2}$ that are joined by an intermediate surface $144a_{2\text{-}3}$. The first side surface $144a_{2\text{-}1}$ and the second side surface $144a_{2\text{-}2}$ may be arranged in a non-parallel, converging relationship.

With reference to FIGS. 15 and 16, the first side surface $144a_{2\text{-}1}$ of the second registration portion $144a_2$ is sized for being disposed adjacent a first wall surface $130b_{1\text{-}1}$ defined by the third female portion $130b_1$ of the plurality of female portions 130 or a first wall surface $130a_{2\text{-}1}$ defined by the second female portion $130a_2$ of the plurality of female portions 130. With continued reference to FIGS. 15 and 16, the second side surface $144a_{2\text{-}2}$ of the second registration portion $144a_2$ is sized for being disposed adjacent a second wall surface $130b_{1\text{-}2}$ defined by the third female portion $130b_1$ of the plurality of female portions 130 or a second wall surface $130a_{2\text{-}2}$ defined by the second female portion $130a_2$ of the plurality of female portions 130. Furthermore, the intermediate surface $144a_{2\text{-}3}$ of the second registration portion $144a_2$ is sized for being disposed adjacent an intermediate wall surface $130b_{1\text{-}3}$ defined by the third female portion $130b_1$ of the plurality of female portions 130 or an intermediate wall surface $130a_{2\text{-}3}$ defined by the second female portion $130a_2$ of the plurality of female portions 130.

Another exemplary implementation of a plurality of male portions is shown generally at 138' in FIG. 18'. The plurality of male portions 138' extend away from the mounting-portion-engaging surface 134'. The plurality of male portions 138' may include a first wedging portion 140', a second wedging portion 142' and a pair of registration portions 144' (defined by a first registration portion $144a_1$' and a second registration portion $144a_2$').

The plurality of male portions 138' may also include a third wedging portion 145' that is aligned with the first wedging portion 140' and the second wedging portion 142'. Furthermore, the second wedging portion 142' is located between the first wedging portion 140' and the third wedging portion 145'. The third wedging portion 145' may be defined by a substantially cylindrical post that is located within one of the first wedging passage 132a and the second wedging passage 132b of the plurality of wedging passages 132. Furthermore, a distal tip 147' of the third wedging portion 145' may be disposed adjacent the non-mounting surface 118 of the substrate-engaging portion $112a_1$ of the body portion 112a of the mounting portion 112 in order to provide further stability to the implement-retaining portion 114' when the implement-retaining portion 114' is joined to the mounting portion 112.

Furthermore, a head portion 140a' of the first wedging portion 140' includes a first surface $140a_1$' that may define a recess or groove 149'. The recess or groove 149' may be sized for receiving a projection 146a, 146b (see, e.g., FIGS. 16-17) extending from the non-mounting surface 118 of the substrate-engaging portion $112a_1$ of the body portion 112a of the mounting portion 112. Each projection 146a, 146b may be respectively aligned with the first wedging passage 132a and the second wedging passage 132b of the plurality of wedging passages 132 formed by the implement retainer interface portion $112a_2$ of the body portion 112a of the mounting portion 112. Registration of one of the projections 146a, 146b within the recess or groove 149' provides further stability to the implement-retaining portion 114' when the implement-retaining portion 114' is joined to the mounting portion 112.

Another exemplary implementation of a plurality of male portions is shown generally at 138" in FIG. 18". The plurality of male portions 138" extend away from the mounting-portion-engaging surface 134". The plurality of male portions 138" may include a first wedging portion 140", a second wedging portion 142" and a pair of registration portions 144" (defined by a first registration portion $144a_1$" and a second registration portion $144a_2$").

The plurality of male portions 138" may also include a third wedging portion 145" that is aligned with the first wedging portion 140" and the second wedging portion 142". Furthermore, the second wedging portion 142" is located between the first wedging portion 140" and the third wedging portion 145". The third wedging portion 145" may be defined by a substantially cylindrical post that is located within one of the first wedging passage 132a and the second wedging passage 132b of the plurality of wedging passages 132. Furthermore, a distal tip 147" of the third wedging portion 145" may be defined by a substantially oval-shaped member having a front surface $147_1$" and a rear surface $147_2$". The front surface $147_1$" is disposed adjacent the non-mounting surface 118 of the substrate-engaging portion $112a_1$ of the body portion 112a of the mounting portion 112 in order to provide further stability to the implement-retaining portion 114" when the implement-retaining portion 114" is joined to the mounting portion 112. The rear surface $147_2$" is disposed adjacent and/or "hooked behind" the surface 120 of the of the implement retainer interface portion $112a_2$ of the body portion 112a of the mounting portion 112.

Furthermore, a head portion 140a" of the first wedging portion 140" includes a first surface $140a_1$" that may define a first recess, groove or channel 149a" and a second recess, groove or channel 149b". The recess or groove 149' may be sized for receiving first and second projections defined by the implement-retaining-portion-engaging surface 122 of the mounting portion 112. Registration of the projections within the first and second recess, groove or channels 149a", 149b" provides further stability to the implement-retaining portion 114" when the implement-retaining portion 114" is joined to the mounting portion 112.

Referring to FIGS. 14A-14F, exemplary steps for assembling the assembly 100 are shown. Furthermore, as seen in FIGS. 14G-14I', steps for disassembling the assembly 100 are also shown.

With reference to FIGS. 14A-14A', the mounting portion 112 and the implement-retaining portion 114 are shown in a separated, spaced-apart relationship. Assuming the mounting portion 112 is removably-secured to an underlying substrate S, the assembly 100 is firstly formed by moving the implement-retaining portion 114 toward the mounting portion 112 in the direction of the arrow A1. Although the mounting portion 112 may be removably-secured to the underlying substrate S, the mounting portion 112 does not have to be removably-secured to the underlying substrate S for connecting the implement-retaining portion 114 toward the mounting portion 112. As seen in FIG. 14B (which also corresponds to another cross-section view shown in FIG. 14B'), after the implement-retaining portion 114 is moved toward the mounting portion 112 in the direction of the arrow A1, the first wedging portion 140 is axially aligned with the first wedging passage 132a of the plurality of wedging passages 132 of the plurality of female portions 130.

Figure 14C:
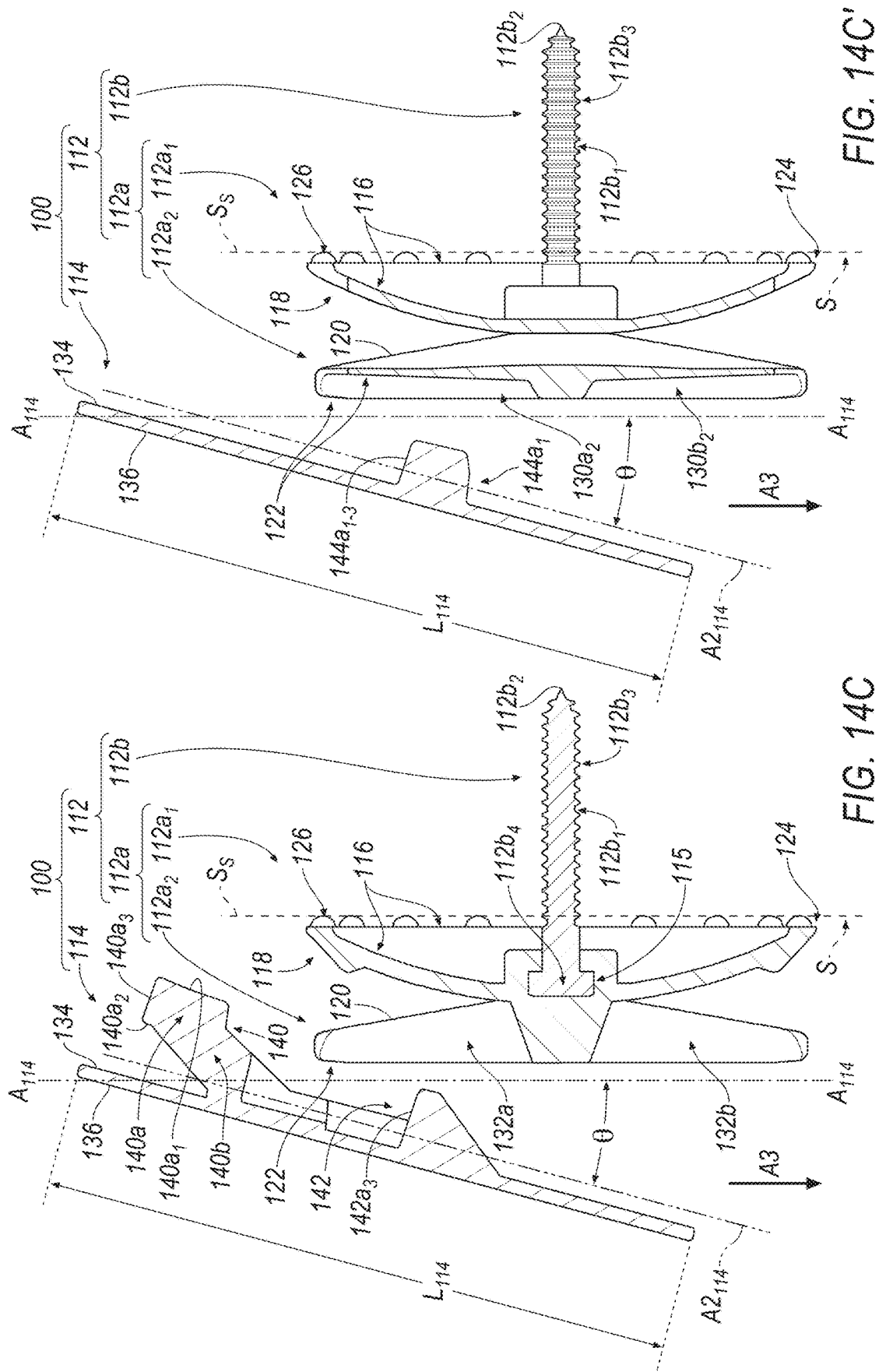
Figure 14F:
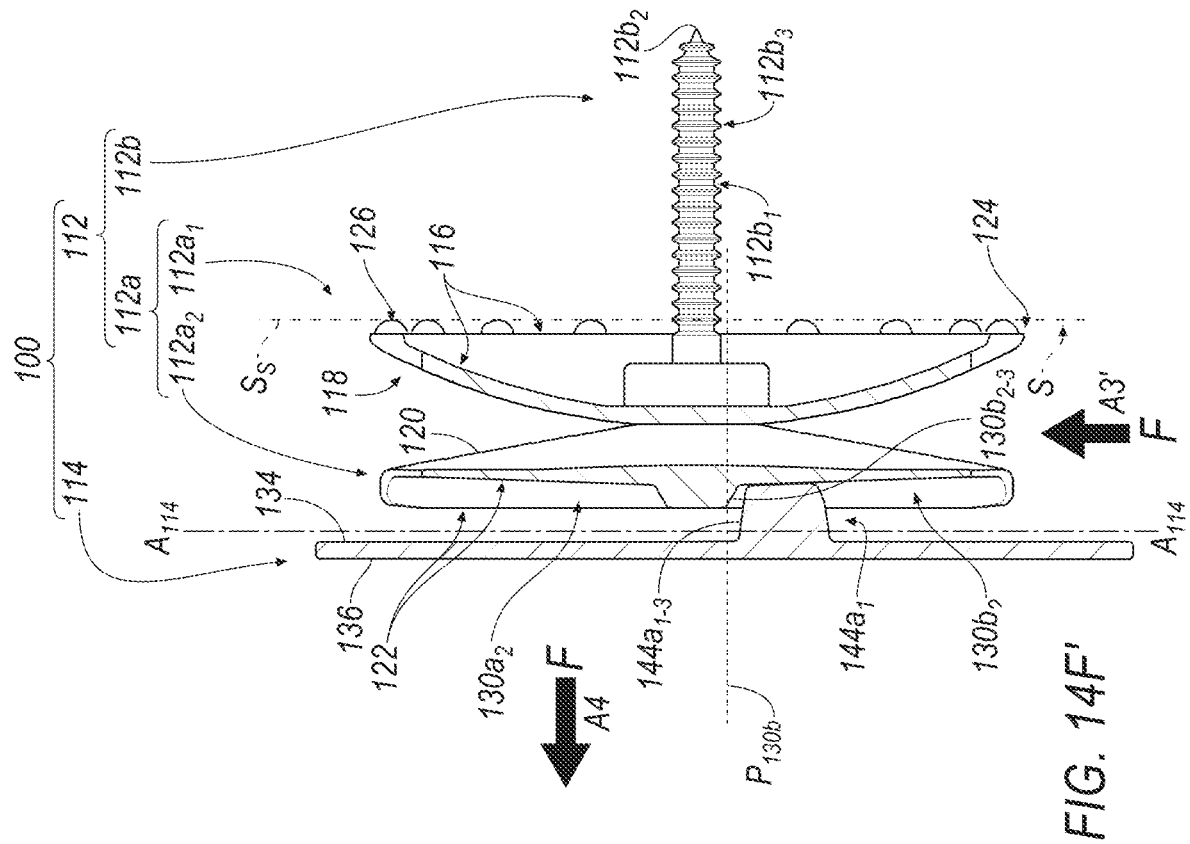
Figure 14F:
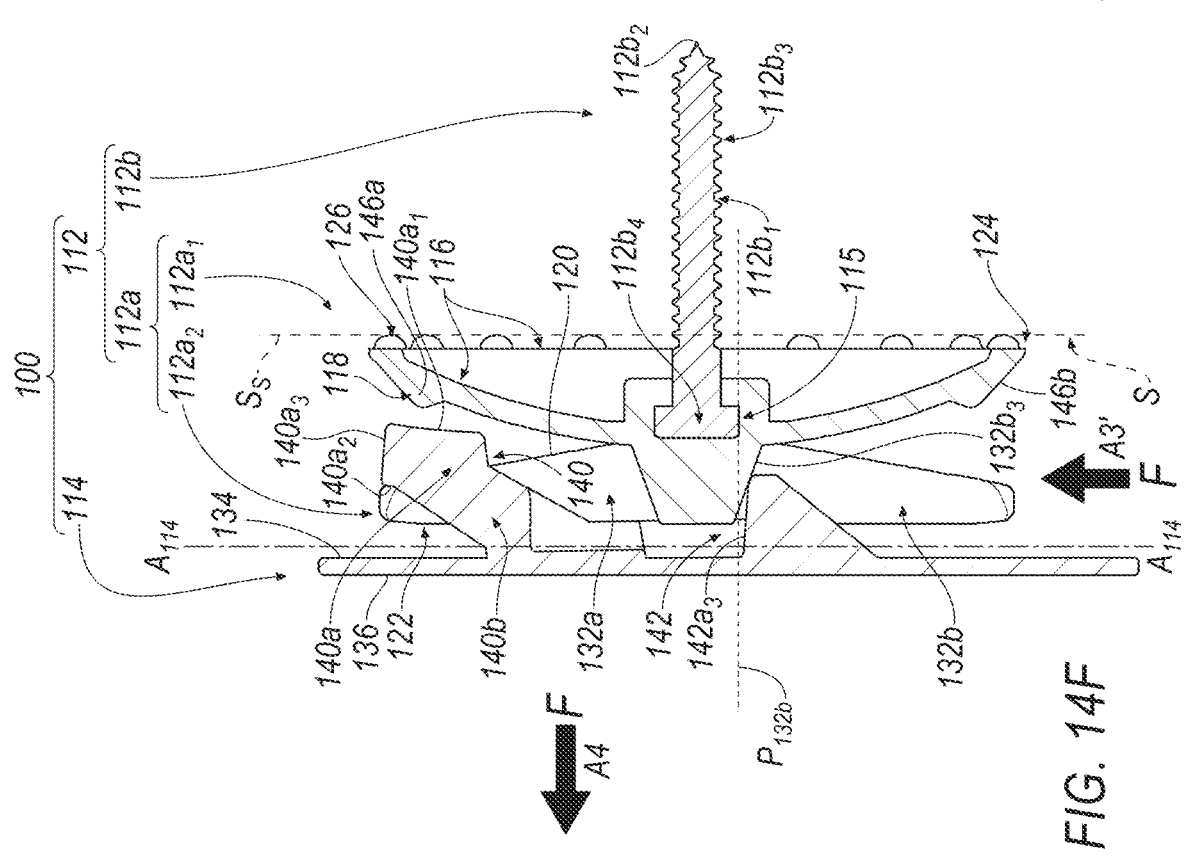
Figure 14G:
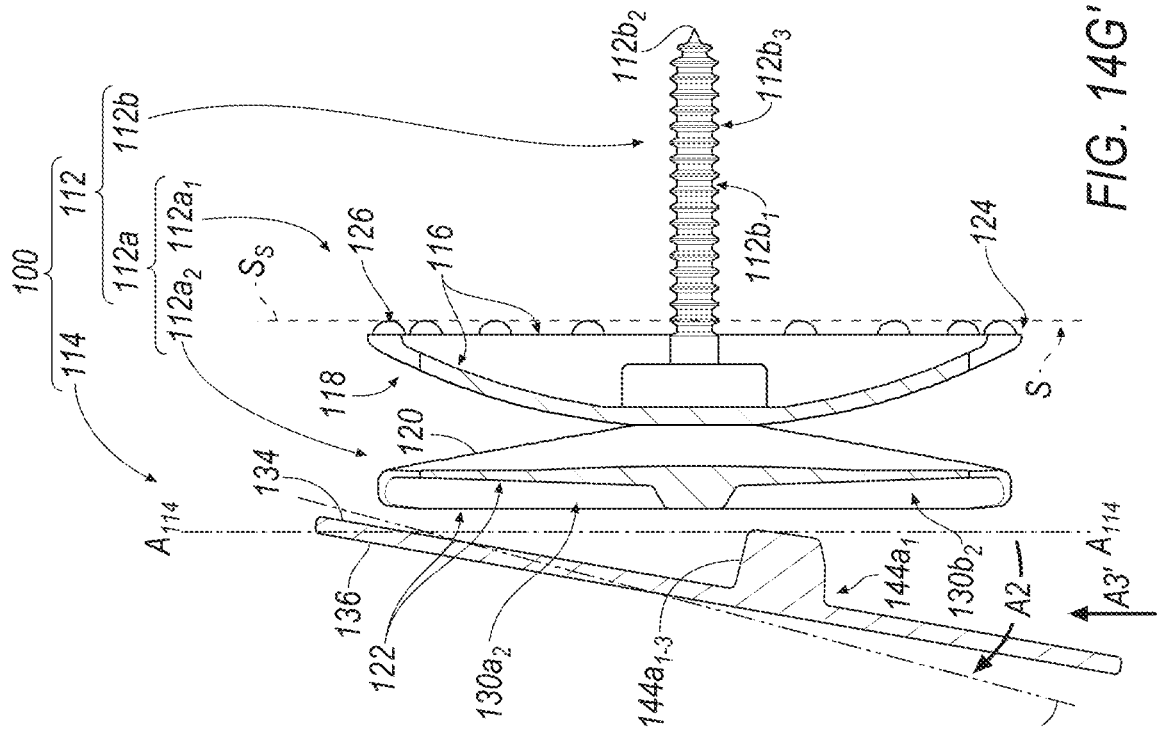
Figure 14G:
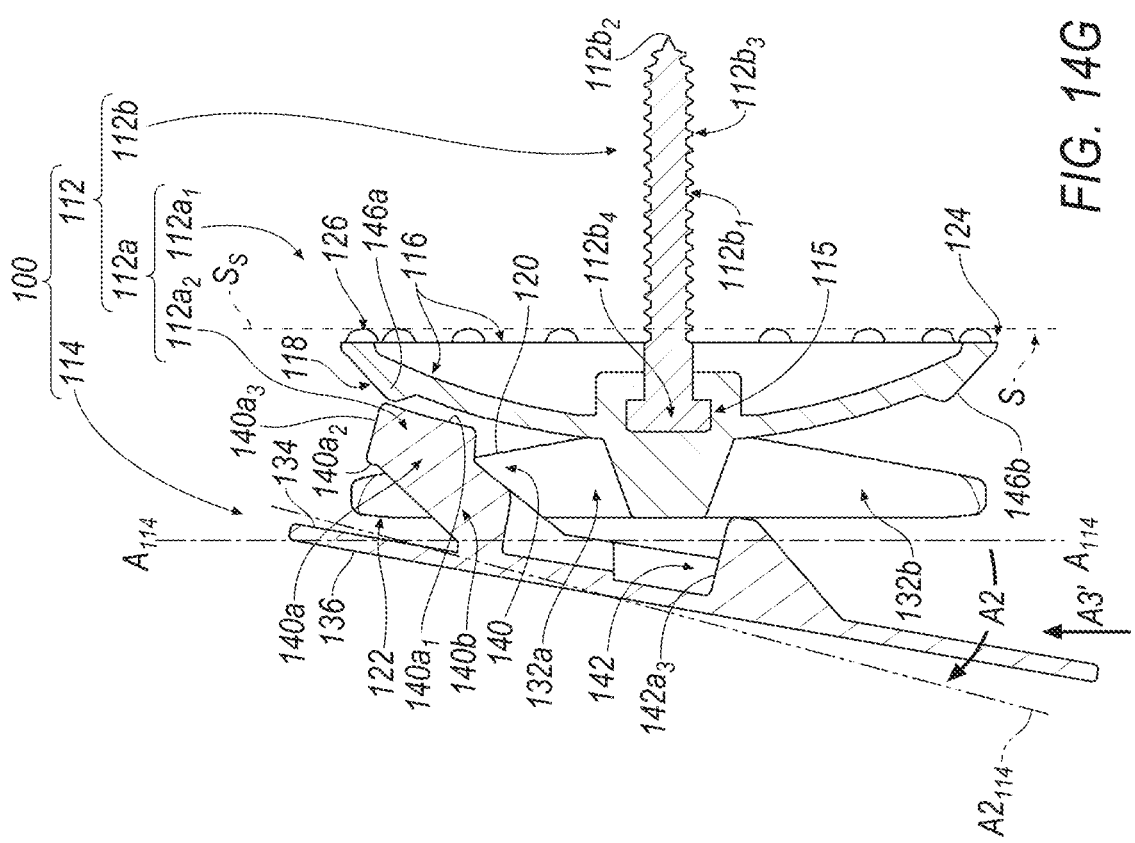

Referring to FIGS. 14B-14B', a reference axis extending along a length $L_{114}$ of the implement-retaining portion 114 is shown generally at $A_{114}$-$A_{114}$. Although not required, for purposes of establishing an exemplary frame of reference, the reference axis $A_{114}$-$A_{114}$ may be substantially parallel to the exterior surface $S_S$ of the underlying substrate S. As comparatively seen in FIGS. 14B-14B' and 14C-14C', the implement-retaining portion 114 may then be pivoted away from the mounting portion 112 (and away from the reference axis $A_{114}$-$A_{114}$) in the direction of the arrow A2 at an angle θ (see, e.g., FIGS. 14C-14C').

As seen in FIG. 14C, while tilted at the angle θ away from the reference axis $A_{114}$-$A_{114}$ and while the implement-retaining portion 114 is still separated from the mounting portion 112, the neck portion 140b of the first wedging portion 140 is aligned with the first wedging passage 132a of the plurality of wedging passages 132 of the plurality of female portions 130. As seen in FIGS. 14C-14C' through 14E-14E', the implement-retaining portion 114 is then moved (with respect to, for example, a spatially fixed orientation of the mounting portion 112 as a result of, for example, the mounting portion 112 being removably-secured to the underlying substrate S) according to the direction of arrow A3. Movement of the implement-retaining portion 114 according to the direction of the arrow A3 results in the neck portion 140b of the first wedging portion 140 of the implement-retaining portion 114 being progressively wedged within the first wedging passage 132a as a result of: (1) the first side surface $140b_1$ of the neck portion 140b progressively coming into contact with and being disposed adjacent the first wall surface $132a_1$ defined by the first wedging passage 132a and (2) the second side surface $140b_2$ of the neck portion 140b progressively coming into contact with and being disposed adjacent the second wall surface $132a_2$ defined by the first wedging passage 132a.

Referring to FIGS. 14E-14E', as a result of the neck portion 140b of the first wedging portion 140 of the implement-retaining portion 114 being progressively wedged within the first wedging passage 132a, the implement-retaining portion 114 may be said to be partially secured-to or "hooked" about the mounting portion 112. Furthermore, with reference to FIGS. 14E-14E', (1) at least a portion of the intermediate surface $142a_3$ of the second wedging portion 142 is spatially arranged below a plane $P_{132b}$ (extending across at least an upper-most portion of the intermediate wall surface $132b_3$ defined by the second wedging passage 132b; furthermore, the plane $P_{132b}$ may be substantially perpendicular with respect to the exterior surface $S_S$ of the underlying substrate S), (2) at least a portion of the intermediate surface $144a_{1-3}$ of the first registration portion $144a_1$ is spatially arranged below a plane $P_{130b}$ (extending across at least an upper-most portion of the intermediate wall surface $130b_{1-3}$ defined by the fourth female portion $130b_2$ of the plurality of female portions 130; furthermore, the plane $P_{130b}$ may be substantially perpendicular with respect to the exterior surface $S_S$ of the underlying substrate S) and (3) at least a portion of the intermediate surface $144a_{2-3}$ of the second registration portion $144a_2$ is spatially arranged below the plane $P_{130b}$ that also extends across at least an upper-most portion of the intermediate wall surface $130b_{1-3}$ defined by the third female portion $130b_1$ of the plurality of female portions 130.

As seen in FIGS. 14E-14E', once the implement-retaining portion 114 is arranged relative the mounting portion 112 as described above, the implement-retaining portion 114 is moved toward the mounting portion 112 (and toward the reference axis $A_{114}$-$A_{114}$) in the direction of the arrow A2', which is opposite the direction of the arrow A2. Movement of the implement-retaining portion 114 relative the mounting portion 112 in the direction of the arrow A2', results in at least a portion of the intermediate surface $142a_3$ of the second wedging portion 142 being arranged below the plane $P_{132b}$ and thereby progressively coming into contact with and being disposed adjacent at least a portion of the intermediate wall surface $132b_3$ defined by the second wedging passage 132b. Additionally, movement of the implement-retaining portion 114 relative the mounting portion 112 in the direction of the arrow A2', may also result in: the neck portion 140b of the first wedging portion 140 of the implement-retaining portion 114 being further progressively wedged within the first wedging passage 132a as a result of: (1) the first side surface $140b_1$ of the neck portion 140b being further progressively brought into contact with and being disposed adjacent the first wall surface $132a_1$ defined by the first wedging passage 132a and (2) the second side surface $140b_2$ of the neck portion 140b being further progressively brought into contact with and being disposed adjacent the second wall surface $132a_2$ defined by the first wedging passage 132a.

Furthermore, in some instances, movement of the implement-retaining portion 114 relative the mounting portion 112 in the direction of the arrow A2', may also result in: (1) at least a portion of the intermediate surface $144a_{1-3}$ of the first registration portion $144a_1$ being arranged below the plane $P_{130b}$ and thereby progressively coming into contact with and being disposed adjacent at least a portion of the intermediate wall surface $130b_{2-3}$ defined by the fourth female portion $130b_1$ of the plurality of female portions 130 and (2) at least a portion of the intermediate surface $144a_{2-3}$ of the second registration portion $144a_2$ being arranged below the plane $P_{130b}$ and thereby progressively coming into contact with and being disposed adjacent at least a portion of the intermediate wall surface $130b_{1-3}$ defined by the third female portion $130b_2$ of the plurality of female portions 130. Yet even further, movement of the implement-retaining portion 114 relative the mounting portion 112 in the direction of the arrow A2', may also result in: (1) at least a portion of the first side surface $144a_{1-1}$ and at least a portion of the second side surface $144a_{1-2}$ of the first registration portion $144a_1$ progressively coming into contact with and being disposed adjacent, respectively, at least a portion of the first wall surface $130b_{2-1}$ and at least a portion of the second wall surface $130b_{2-2}$ defined by the fourth female portion $130b_2$ and (2) at least a portion of the first side surface $144a_{2-1}$ and at least a portion of the second side surface $144a_{2-2}$ of the second registration portion $144a_2$ progressively coming into contact with and being disposed adjacent, respectively, at least a portion of the first wall surface $130b_{1-1}$ and at least a portion of the second wall surface $130b_{1-2}$ defined by the third female portion $130b_1$.

With reference to FIGS. 14F-14F', as a result of the implement-retaining portion 114 being moved relative the mounting portion 112 in the direction of the arrow A2', the implement-retaining portion 114 is said to be connected to the mounting portion 112 for defining the assembly 100 being arranged in an assembled form. In an example, the assembled assembly 100 may result from, for example, the arrangement of: (1) the first wedging portion 140 within the first wedging passage 132a and (2) the second wedging portion 142 within the second wedging passage 132b. Such an arrangement of the first wedging portion 140 and the second wedging portion 142 within the first wedging passage 132a and the second wedging passage 132b results in the implement-retaining portion 114 being connected to the mounting portion 112 in a wedged, friction-fit configuration that resists the implement-retaining portion 114 from being disconnected from the mounting portion 112. In an example, as seen in FIGS. 14F-14F', if an external force F in the direction of arrow A3', which is opposite the direction of the arrow A3, were to be applied to the implement-retaining portion 114, the intermediate surface $142a_3$ of the second wedging portion 142 would be urged toward the intermediate wall surface $132b_3$ defined by the second wedging passage 132b thereby preventing the implement-retaining portion 114 from disconnected from the mounting portion 112 in an upwardly direction. Further, if a pulling force F in the direction of arrow A4 is applied to the implement-retaining portion 114, (for pulling the implement-retaining portion 114 away from the exterior surface $S_S$ of the underlying substrate S), the head portion 140a of the first wedging portion 140 is arranged behind and "hooked" about the first wedging passage 132 such that the second surface $140a_2$ of the head portion 140a is urged into and disposed adjacent the neck-portion-engaging surface 120 of the implement retainer interface portion $112a_2$ of the body portion 112a of the mounting portion 112. Yet even further, the arrangement of the first registration portion $144a_1$ and the second registration portion $144a_2$ within, respectively, the fourth female portion $130b_2$ and third female portion $130b_1$, provides a four-point-connection (taking into account the arrangement of the first wedging portion 140 within the first wedging passage 132a and the second wedging portion 142 within the second wedging passage 132b as described above) that further resists rotation R (see, e.g., FIG. 11B) of the implement-retaining portion 114 about an axis $A_{100}$-$A_{100}$ (see, e.g., FIG. 11B) extending the mounting portion 112.

Referring to FIGS. 14F-14F' and 14G-14G', when it may be desired to arrange the assembly 100 back to a disassembled orientation (i.e., arranging the implement-retaining portion 114 in spatially separated orientation with respect to the mounting portion 112 as seen in, for example, FIGS. 14A-14A'), the implement-retaining portion 114 may then be pivoted away from the mounting portion 112 (and away from the reference axis $A_{114}$-$A_{114}$) in the direction of the arrow A2 at the angle θ (see, e.g., FIGS. 14G-14G'). With the implement-retaining portion 114 may then be pivoted away from the mounting portion 112 as seen in FIGS. 14G-14G': (1) the second wedging portion 142 is removed from the second wedging passage 132b, (2) the first registration portion $144a_1$ is removed from the fourth female portion $130b_2$ of the plurality of female portions 130 and (3) the second registration portion $144a_2$ is removed from the third female portion $130b_1$ of the plurality of female portions 130. Thereafter, as seen in FIGS. 14H-14H' and 14I-14I', the implement-retaining portion 114 is moved away from the mounting portion 112 according to the direction of the arrow A3', which is opposite the direction of the arrow A3 for removing the first wedging portion 140 from the first wedging passage 132a (as seen in FIGS. 14H-14H') and then subsequently arranging the implement-retaining portion 114 in a spatially separated state with respect to the mounting portion 112 (as seen in FIGS. 14I-14I').

As described above at FIGS. 15-16, the implement retainer interface portion $112a_2$ of the body portion 112a of the mounting portion 112 may be defined as having a first (upper) half $112a_{2\text{-}1}$ and a second (lower) half $112a_{2\text{-}2}$. In the above-described exemplary assembling and disassembling of the assembly 100 at FIGS. 14A-14I', the fourth female portion $130b_2$ and the third female portion $130b_1$ of the second (lower) half $112a_{2\text{-}2}$ of the mounting portion 112 are respectively interfaced with the first registration portion $144a_1$ and the second registration portion $144a_2$ while the first female portion $130a_1$ and the second female portion $130a_2$ of the first (upper) half $112a_{2\text{-}1}$ of the mounting portion 112 are not interfaced with any of the a plurality of male portions 138 of the implement-retaining portion 114. Although the first female portion $130a_1$ and the second female portion $130a_2$ of the first (upper) half $112a_{2\text{-}1}$ of the mounting portion 112 are not interfaced with any of the a plurality of male portions 138 of the implement-retaining portion 114, the provision of the first female portion $130a_1$ and the second female portion $130a_2$ of the first (upper) half $112a_{2\text{-}1}$ of the mounting portion 112 still serves a purpose, as follows.

In an example, the mounting portion 112 may be connected to the underlying substrate S by directing the substrate-penetrating portion 112b (which may be, for example, a self-boring threaded fastener) into the underlying substrate S by rotating R the mounting portion 112 about the axis $A_{100}$-$A_{100}$ (see, e.g., FIG. 11A) extending through the substrate-penetrating portion 112b. In order to prevent an undesirable over-rotation R of the mounting portion 112b, the first (upper) half $112a_{2\text{-}1}$ and the second (lower) half $112a_{2\text{-}2}$ are designed with symmetry such that either of the first pair of female portions 130a (including the first female portion $130a_1$ and the second female portion $130a_2$) and the second pair of female portions 130b (including the third female portion $130b_1$ and the fourth female portion $130b_2$) may be arranged for being interfaced with the first registration portion $144a_1$ and the second registration portion $144a_2$. Therefore, although the above-described steps for assembling and disassembling the assembly 100 discloses the first registration portion $144a_1$ and the second registration portion $144a_2$ being interfaced with the fourth female portion $130b_2$ and the third female portion $130b_1$, the mounting portion 112 may be alternatively secured to the underlying substrate S such that the first registration portion $144a_1$ and the second registration portion $144a_2$ are interfaced, respectively, with the second female portion $130a_2$ and the first female portion $130a_1$ and not the fourth female portion $130b_2$ and the third female portion $130b_1$, respectively; furthermore, if arranged in such an alternative orientation, the first wedging portion 140 is arranged within the second wedging passage 132b and the second wedging portion 142 is arranged within the first wedging passage 132a.

Referring to FIGS. 21-24, a plurality of implement-retaining portions 114 are shown. Each of the implement-retaining portions 114 include the plurality of male portions 138 extending from the mounting-portion-engaging surface 134 as described above at FIGS. 12, 14A-14I' and 18-20; although the implement-engaging surface 136 of the implement-retaining portion 114 of FIGS. 12, 14A-14I' and 18-20 are shown being defined by a substantially flat surface, the implement-engaging surface 136 of the implement-retaining portion 114 may shaped or sized to include any desirable surface configuration such as, for example, a storage pocket (see, e.g., FIGS. 21, 23), a hook (see e.g., FIGS. 11A-11B, 22), a frictional surface defined by bumps (see, e.g., FIG. 24) or the like for retaining an implement (e.g., an article of clothing such as a hat, a smart phone, a camera, or the like) to the implement-engaging surface 136 of the implement-retaining portion 114. Because each of the implement-retaining portions 114 of FIGS. 12 and 21-24 include a similar configuration of the plurality of male portions 138 extending from the mounting-portion-engaging surface 134, the mounting portion 112 may function as a universal mounting portion 112 that may permit any of the implement-retaining portions 114 of FIGS. 12 and 21-24 to be removably-secured to the mounting portion 112. Furthermore, even if the implement-engaging surface 136 of the implement-retaining portion 114 is defined to be a substantially flat surface as seen, for example at FIGS. 12, 14A-14I' and 18-20, the substantially flat surface may include, for example, an adhesive that permits, for example, an implement to be adhesively bonded in a permanent or selectively-removable fashion thereto.

Figure 25:
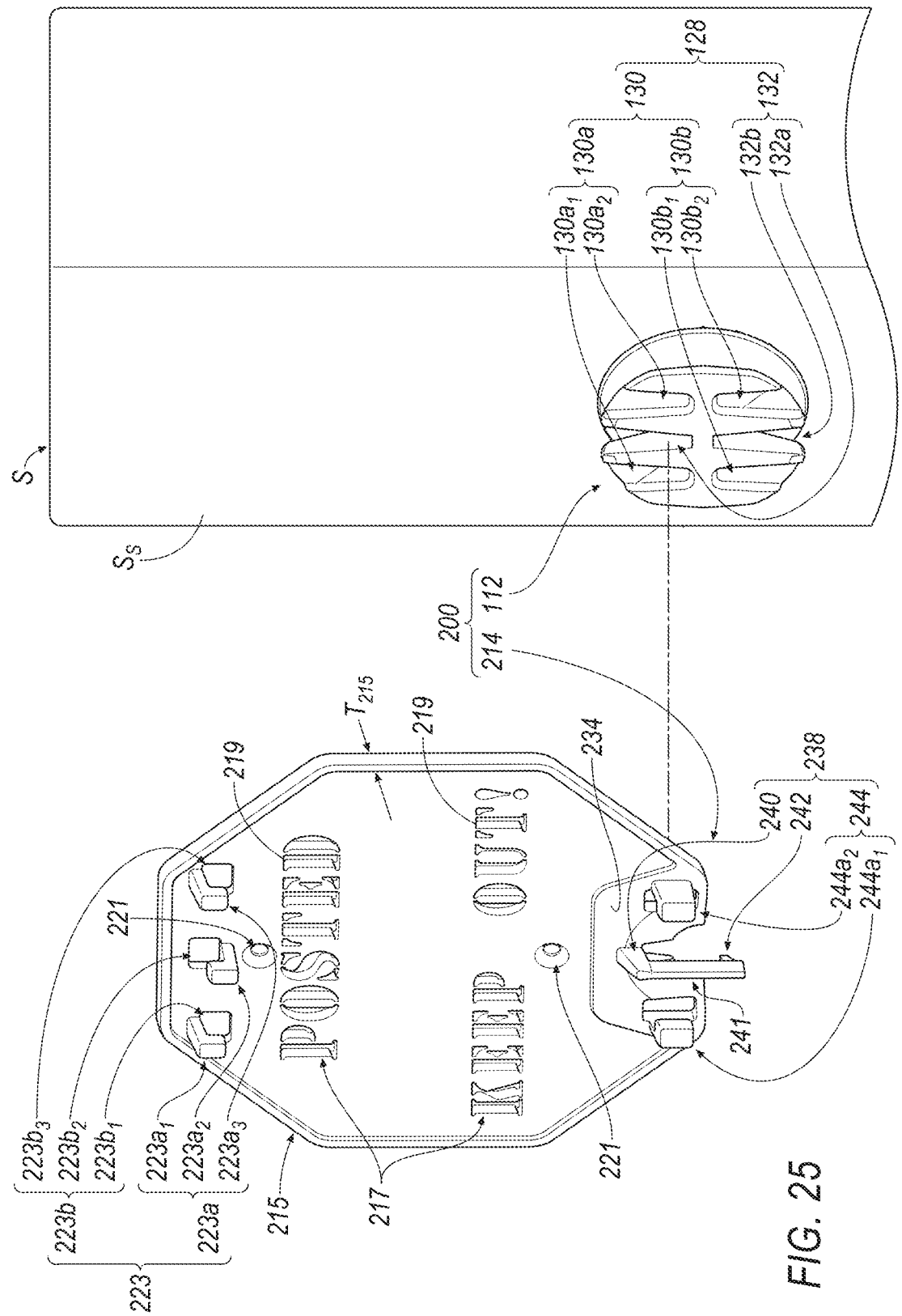
FIG. 25 is an exploded perspective view of an exemplary assembly including a mounting portion and an implement-retaining portion.

With reference to FIGS. 25-26, 28 and 29A-29E, an exemplary assembly shown generally at 200. The assembly 200 includes the mounting portion 112 and an implement-retaining portion 214 (see also, e.g., FIG. 27). As seen in FIG. 25, the mounting portion 112 removably-secures the assembly 200 to an underlying substrate S, such as, for example, a post, a tree, drywall, a wall stud or the like. As described above, the mounting portion 112 provides mating structure (e.g., a plurality of male-receiving portions 128) that act as a universal interface that permits the potential for attachment of a variety of different implement-retaining portions (see, e.g., 114 in FIGS. 21-24) each having a mating structure (see, e.g., 138 in FIG. 12) that corresponds to the mating structure of the mounting portion 112.

Figure 27:
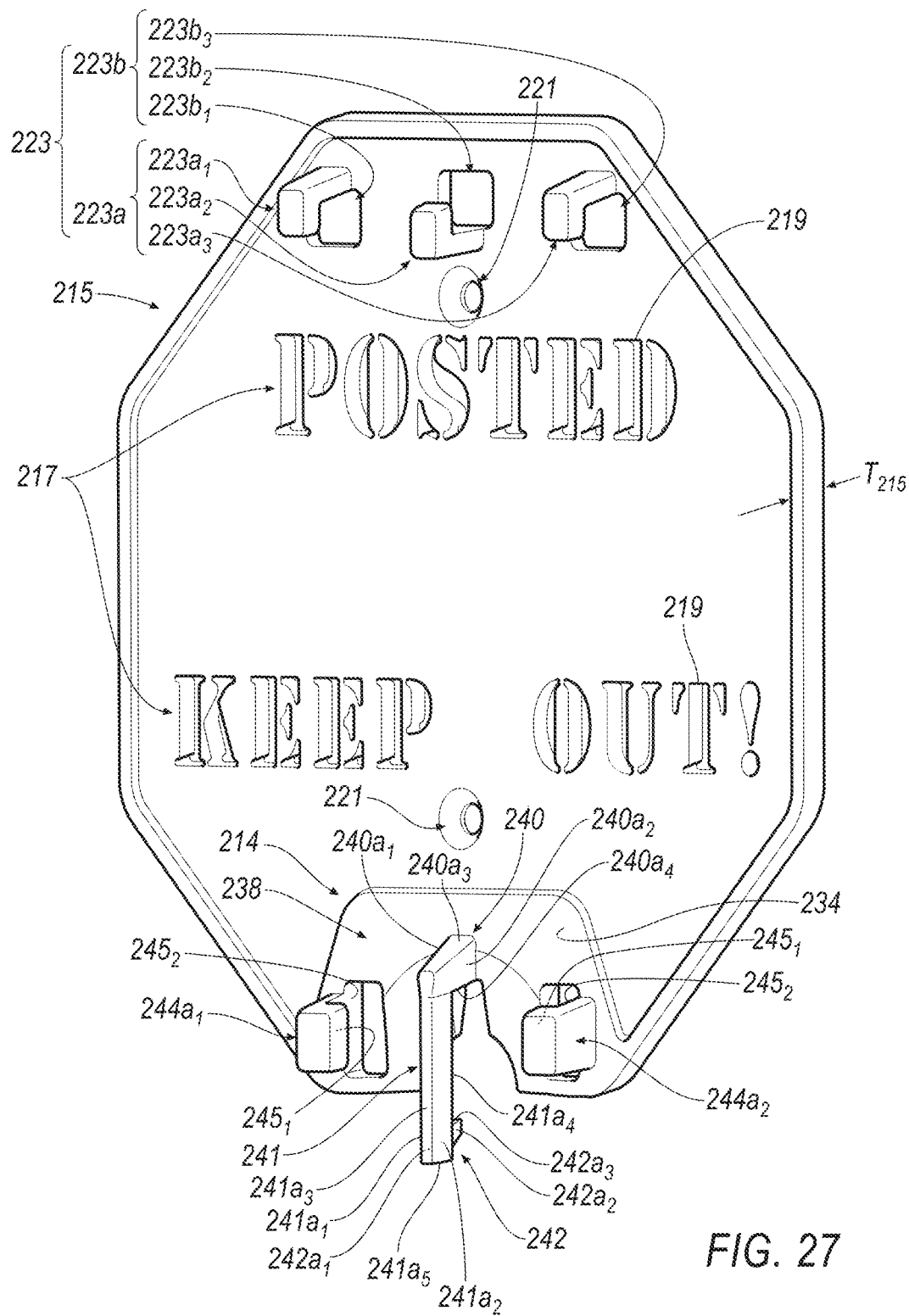
FIG. 27 is a perspective view of the mounting portion of the assembly of FIG. 25.

In an example, as seen in FIG. 27, the implement-retaining portion 214 includes an implement portion 215 (e.g., a substantially planar member defining a sign having an octagonal shape that includes or defines alphanumeric text 217 saying "POSTED KEEP OUT!"). In an example, the implement portion 215 may define the alphanumeric text 217 as a result the implement portion 215 being die-cut, punched, molded or otherwise formed with passages 219 that extend through a thickness $T_{215}$ of the implement portion 215.

The implement portion 215 may also define one or more fastener-receiving passages 221 that are sized for receiving a fastener (not shown, such as, e.g., a screw). The one or more fastener-receiving passages 221 extend through the thickness $T_{215}$ of the implement portion 215; accordingly, if optionally included, the fastener may assist in securing the implement portion 215 to the underlying substrate S.

The implement portion 215 may also define one or more attachment portions 223. The one or more attachment portions 223 may include one or more attachment flanges 223a and one or more attachment passages 223b that extend through the thickness $T_{215}$ of the implement portion 215. In an example, each attachment flange (see, e.g., $223a_1$, $223a_2$, $223a_3$) of the one or more attachment flanges 223a is arranged near each attachment passage (see, e.g., $223b_1$, $223b_2$, $223b_3$) of the one or more attachment passages 223b. In an example, the implement portion 215 may define three attachment flanges 223a (see, e.g., $223a_1$, $223a_2$, $223a_3$) and three attachment passages 223b (see, e.g., $223b_1$, $223b_2$, $223b_3$). In an example, each attachment flange $223a_1$, $223a_2$, $223a_3$ includes an "L shape" body, and, in some instances, a first L-shaped attachment flange $223a_1$ and a third L-shaped attachment flange $223a_3$ are arranged in a "down" orientation while an intermediate/second L-shaped attachment flange $223a_2$ is arranged in an "up" orientation for cooperating to form a lateral attachment passage 225 (see, e.g., FIG. 28).

Referring to FIG. 25, a plurality of male portions 238 extend away from a mounting-portion-engaging surface 234. The plurality of male portions 238 may be defined by a first wedging portion 240 and a second wedging portion 242 that is connected to the first wedging portion 240 by a bridge portion 241. The plurality of male portions 238 may also be defined by a pair of clamping portions 244 including a first clamping portion $244a_1$ and a second clamping portion $244a_2$.

Referring to FIG. 27, the first wedging portion 240 extends away from the mounting-portion-engaging surface 234 and includes a first side surface $240a_1$ and an opposite second side surface $240a_2$ that are joined by an upper intermediate surface $240a_3$. The first side surface $240a_1$ and the second side surface $240a_2$ may be arranged in a non-parallel, converging relationship. In an example, with reference to FIG. 15, the first side surface $240a_1$ of the first wedging portion 240 is sized for being disposed adjacent the first wall surface $132b_1$ defined by the second wedging passage 132b of the mounting portion 112 or the first wall surface $132a_1$ defined by the first wedging passage 132a of the mounting portion 112. With continued reference to FIG. 15, the second side surface $240a_2$ of the first wedging portion 240 is sized for being disposed adjacent the second wall surface $132b_2$ defined by the second wedging passage 132b of the mounting portion 112 or the second wall surface $132a_2$ defined by the first wedging passage 132a of the mounting portion 112. Furthermore, the upper intermediate surface $240a_3$ of the first wedging portion 240 is sized for being disposed adjacent the intermediate wall surface $132b_3$ defined by the second wedging passage 132b of the mounting portion 112 or the intermediate wall surface $132a_3$ defined by the first wedging passage 132a of the mounting portion 112.

The bridge portion 241 extends from a lower intermediate surface $240a4$ of the first wedging portion 240. The bridge portion 241 includes a first side surface $241a_1$, a second side surface $241a_2$, a front surface $241a_3$, a rear surface $241a4$ and a lower surface $241a_5$.

The second wedging portion 242 extends away from the rear surface $240a4$ of the bridge portion 241. The second wedging portion 242 includes a first side surface $242a_1$ and an opposite second side surface $242a_2$ that are joined by an upper intermediate surface $242a_3$. The first side surface $242a_1$ and the second side surface $242a_2$ may be arranged in a non-parallel, converging relationship. In an example, with reference to FIG. 15, the first side surface $242a_1$ of the second wedging portion 242 is sized for being disposed adjacent the first wall surface $132a_1$ defined by the second wedging passage 132b of the mounting portion 112 or the first wall surface $132b_1$ defined by the first wedging passage 132a of the mounting portion 112. With continued reference to FIG. 15, the second side surface $242a_2$ of the second wedging portion 242 is sized for being disposed adjacent the second wall surface $132a_2$ defined by the second wedging passage 132b of the mounting portion 112 or the second wall surface $132b_2$ defined by the first wedging passage 132a of the mounting portion 112. Furthermore, the upper intermediate surface $242a_3$ of the second wedging portion 243 is sized for being disposed adjacent the intermediate wall surface $132a_3$ defined by the second wedging passage 132b of the mounting portion 112 or the intermediate wall surface $132b_3$ defined by the first wedging passage 132a of the mounting portion 112.

As seen in FIG. 27, each of the first clamping portion $244a_1$ and the second clamping portion $244a_2$ is generally defined by an "L shape" body having at least a first mounting-portion-engaging-surface $245_1$ and a second mounting-portion-engaging surface $245_2$. Each of the first clamping portion $244a_1$ and the second clamping portion $244a_2$ extend away from the mounting-portion-engaging surface 234 and are sized and spaced apart from one another for clamping opposite sides of the implement retainer interface portion $112a_2$ of the body portion 112a of the mounting portion 112. In an example, with reference to FIGS. 15 and 27, the first mounting-portion-engaging-surface $245_1$ is sized for engaging the implement-retaining-portion-engaging surface 122, and the second mounting-portion-engaging surface $245_2$ is sized for engaging a side surface 121 of the body portion 112a of the mounting portion 112 that connects the neck-portion-engaging surface 120 to the implement-retaining-portion-engaging surface 122.

Figure 29A:
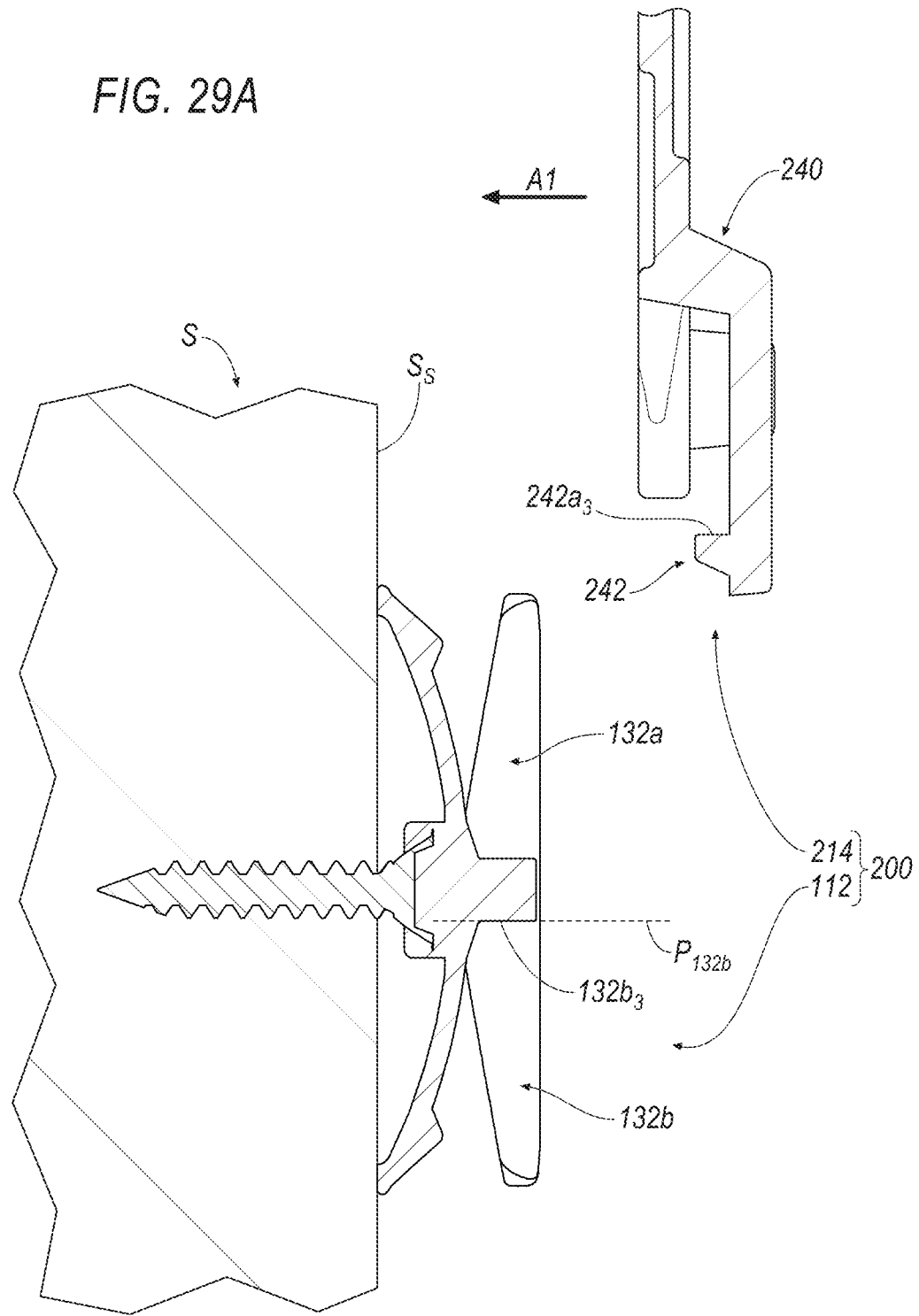

Referring to FIGS. 29A-29E, exemplary steps for assembling the assembly 200 are shown. As seen in FIG. 29A, the mounting portion 112 and the implement-retaining portion 214 are shown in a separated, spaced-apart relationship. Assuming the mounting portion 112 is removably-secured to an underlying substrate S, the assembly 200 is firstly formed by moving the implement-retaining portion 214 toward the mounting portion 112 in the direction of the arrow A1. Although the mounting portion 112 may be removably-secured to the underlying substrate S, the mounting portion 112 does not have to be removably-secured to the underlying substrate S for connecting the implement-retaining portion 214 toward the mounting portion 112.

Figure 29B:
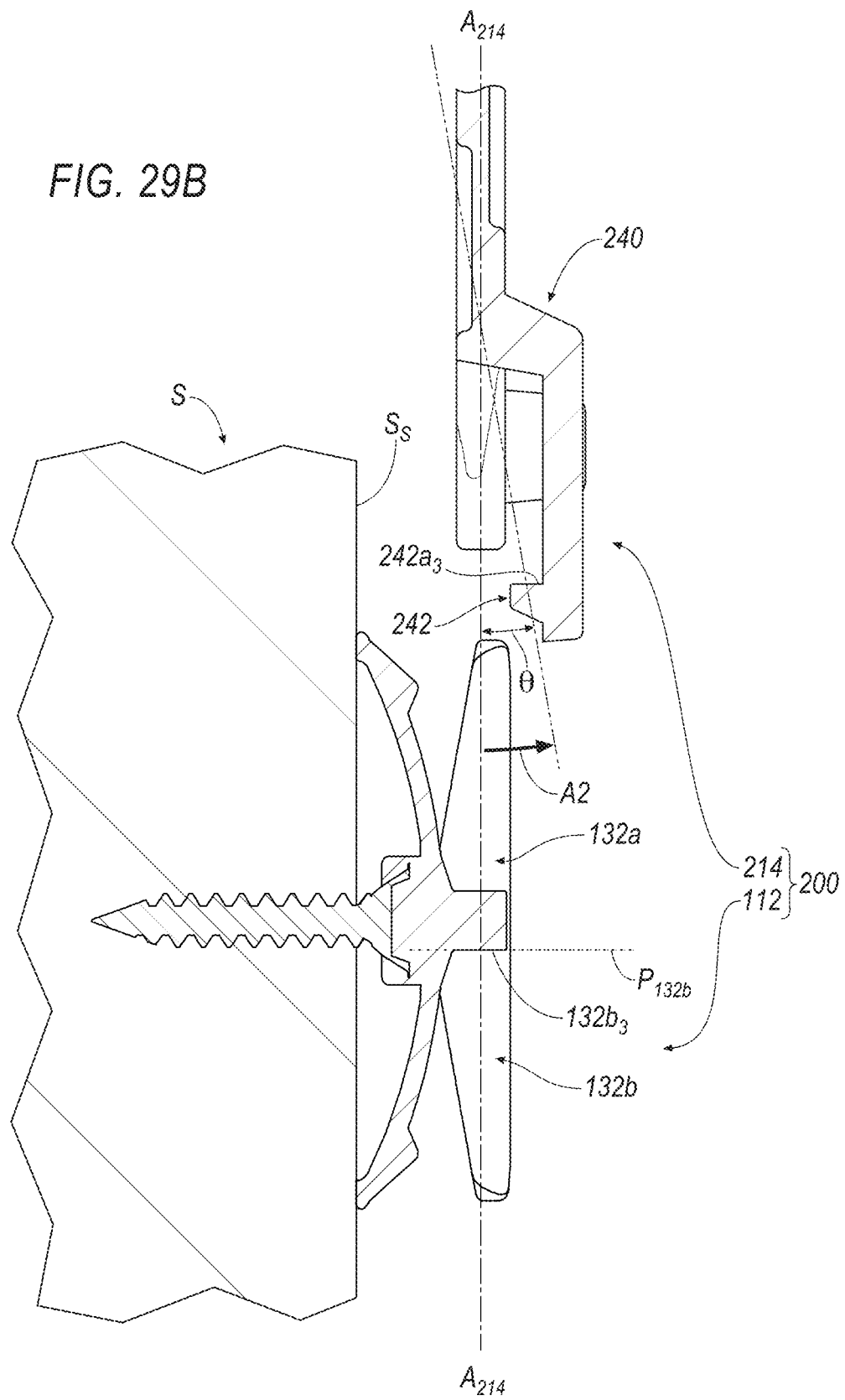

As seen in FIG. 29B, after the implement-retaining portion 214 is moved toward the mounting portion 112 in the direction of the arrow A1, the first wedging portion 240 is axially aligned with the first wedging passage 132a of the plurality of wedging passages 132 of the plurality of female portions 130. A reference axis extending along a length $L_{214}$ of the implement-retaining portion 214 is shown generally at $A_{214}$-$A_{214}$. Although not required, for purposes of establishing an exemplary frame of reference, the reference axis $A_{214}$-$A_{214}$ may be substantially parallel to the exterior surface $S_S$ of the underlying substrate S. As comparatively seen in FIGS. 29B and 29C, the implement-retaining portion 214 may then be pivoted away from the mounting portion 112 (and away from the reference axis $A_{214}$-$A_{214}$) in the direction of the arrow A2 at an angle θ.

Figure 29D:
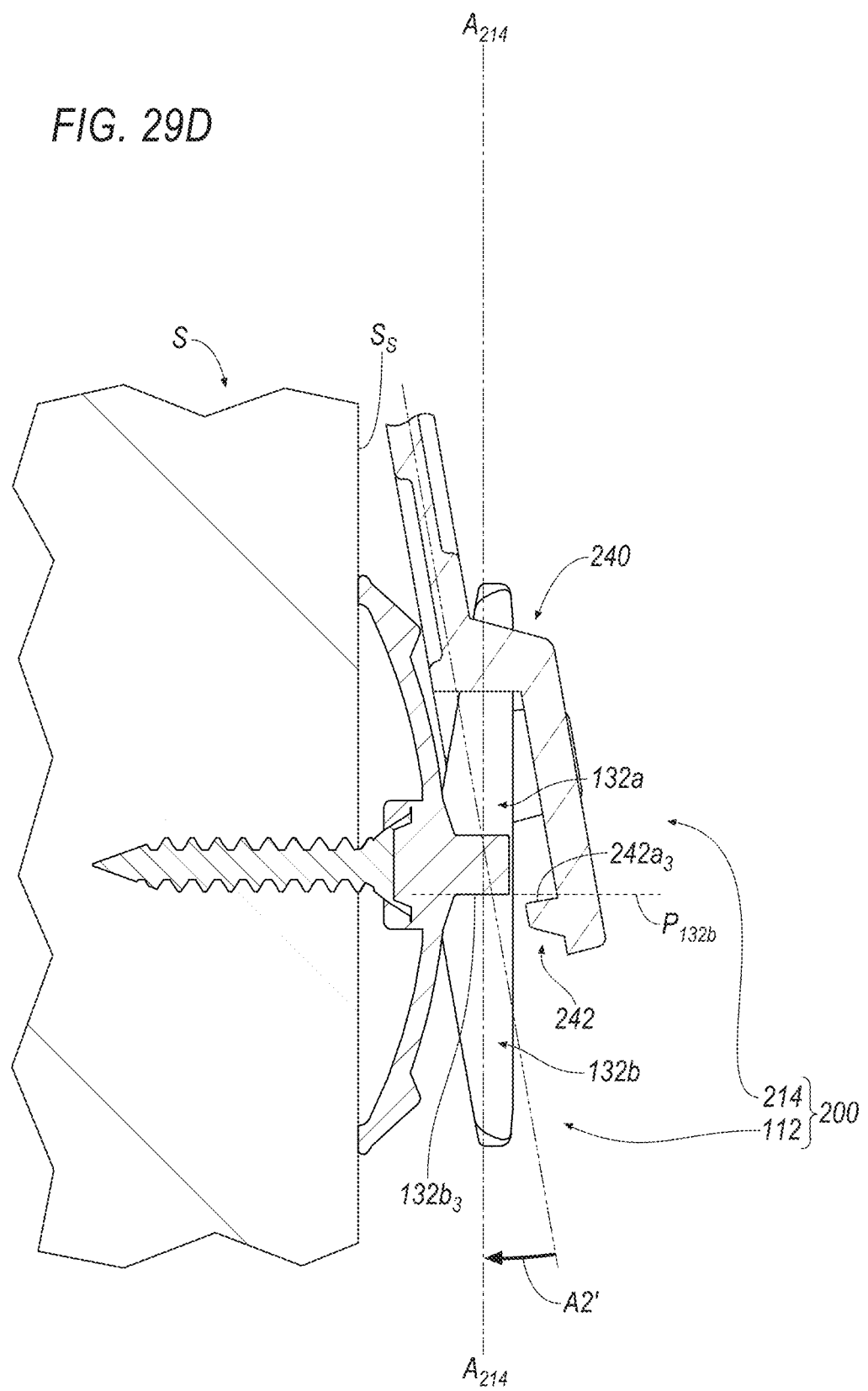

As seen in FIG. 29C, while tilted at the angle θ away from the reference axis $A_{214}$-$A_{214}$ and while the implement-retaining portion 214 is still separated from the mounting portion 112, the first wedging portion 240 is aligned with the first wedging passage 132a of the plurality of wedging passages 132 of the plurality of female portions 130. As seen in FIGS. 29C-29D, the implement-retaining portion 214 is then moved (with respect to, for example, a spatially fixed orientation of the mounting portion 112 as a result of, for example, the mounting portion 112 being removably-secured to the underlying substrate S) according to the direction of arrow A3. Movement of the implement-retaining portion 214 according to the direction of the arrow A3 results in the first wedging portion 240 of the implement-retaining portion 214 being progressively wedged within the first wedging passage 132a as a result of: (1) the first side surface $240a_1$ of the first wedging portion 240 progressively coming into contact with and being disposed adjacent the first wall surface $132a_1$ defined by the first wedging passage 132a and (2) the second side surface $240a_2$ of the first wedging portion 240 progressively coming into contact with and being disposed adjacent the second wall surface $132a_2$ defined by the first wedging passage 132a.

Furthermore, in some instances, movement of the implement-retaining portion 214 relative the mounting portion 112 in the direction of the arrow A3 (see, e.g., FIG. 29C), may also result in at least a portion of the first mounting-portion-engaging-surface $245_1$ of each of the first clamping portion $244a_1$ and the second clamping portion $244a_2$ being disposed adjacent the implement-retaining-portion-engaging surface 122 of the body portion 112a of the mounting portion 112. Yet even further, movement of the implement-retaining portion 214 relative the mounting portion 112 in the direction of the arrow A3, may also result in at least a portion of the second mounting-portion-engaging-surface $245_2$ of each of the first clamping portion $244a_1$ and the second clamping portion $244a_2$ being disposed adjacent the side surface 121 of the body portion 112a of the mounting portion 112. Arrangement of the first clamping portion $244a_1$ and the second clamping portion $244a_2$ relative the body portion 112a of the mounting portion 112 results in the first clamping portion $244a_1$ and the second clamping portion $244a_2$ laterally clamping the body portion 112a of the mounting portion 112.

As a result of the first wedging portion 240 of the implement-retaining portion 214 being progressively wedged within the first wedging passage 132a, the implement-retaining portion 214 may be said to be partially secured-to the mounting portion 112. Furthermore, as seen in FIG. 29D, at least a portion of the upper intermediate surface $242a_3$ of the second wedging portion 242 is spatially arranged below a plane $P_{132b}$ (extending across at least an upper-most portion of the intermediate wall surface $132b_3$ defined by the second wedging passage 132b; furthermore, the plane $P_{132b}$ may be substantially perpendicular with respect to the exterior surface $S_S$ of the underlying substrate S).

Figure 29E:
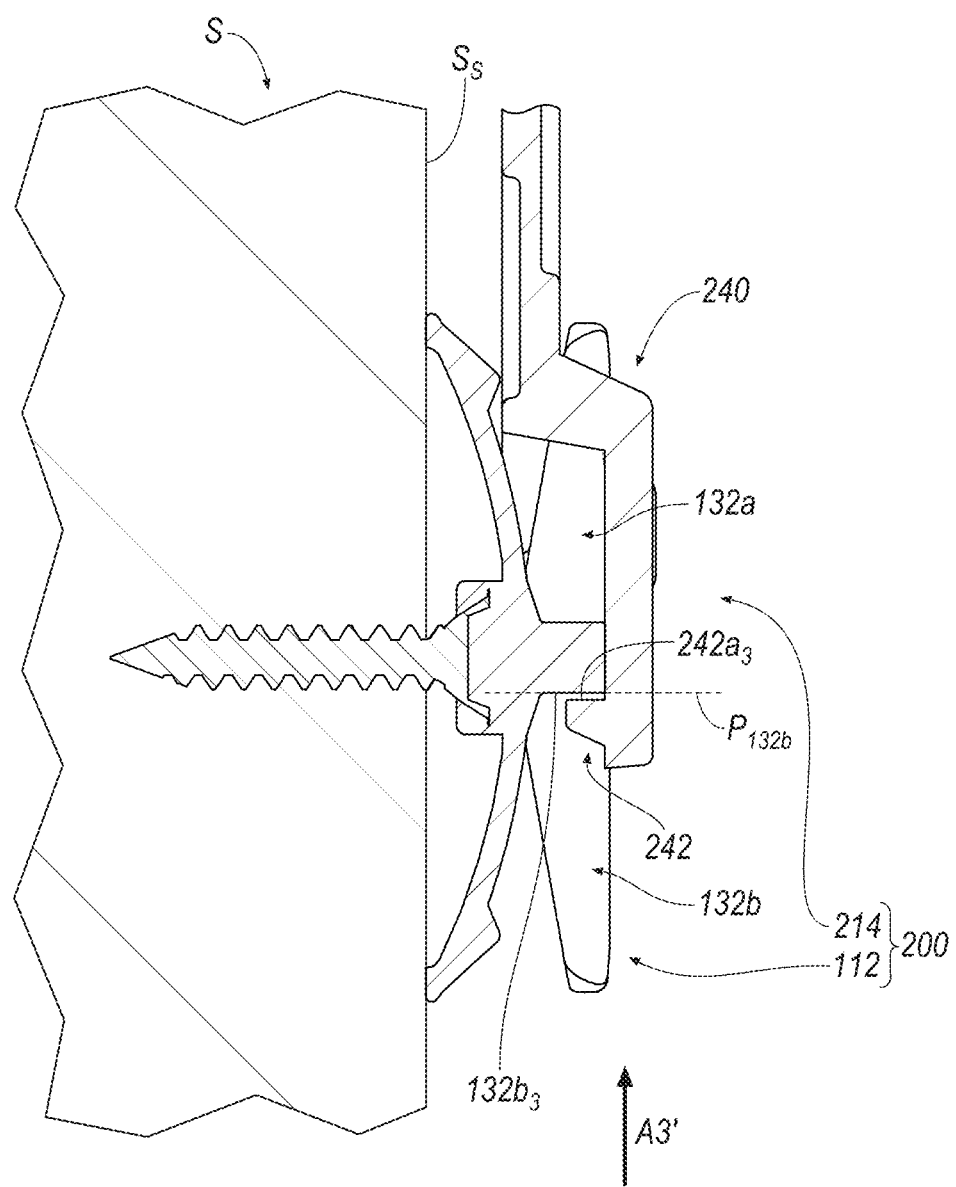

As seen in FIG. 29D, once the implement-retaining portion 214 is arranged relative the mounting portion 112 as described above, the implement-retaining portion 214 is moved toward the mounting portion 112 (and toward the reference axis $A_{214}$-$A_{214}$) in the direction of the arrow A2', which is opposite the direction of the arrow A2. As seen in FIG. 29E, movement of the implement-retaining portion 214 relative the mounting portion 112 in the direction of the arrow A2', results in at least a portion of the upper intermediate surface $242a_3$ of the second wedging portion 242 being arranged below the plane $P_{132b}$. In some examples, the portion of the upper intermediate surface $242a_3$ of the second wedging portion 242 may thereby progressively coming into contact with and being disposed adjacent at least a portion of the intermediate wall surface $132b_3$ defined by the second wedging passage 132b. Additionally, movement of the implement-retaining portion 214 relative the mounting portion 112 in the direction of the arrow A2', may also result in: the first wedging portion 140 of the implement-retaining portion 214 being further progressively wedged within the first wedging passage 132a as a result of: (1) the first side surface $240a_1$ of the first wedging portion 240 being further progressively brought into contact with and being disposed adjacent the first wall surface $132a_1$ defined by the first wedging passage 132a and (2) the second side surface $240a_2$ of the first wedging portion 240 being further progressively brought into contact with and being disposed adjacent the second wall surface $132a_2$ defined by the first wedging passage $132a$.

Figure 26:
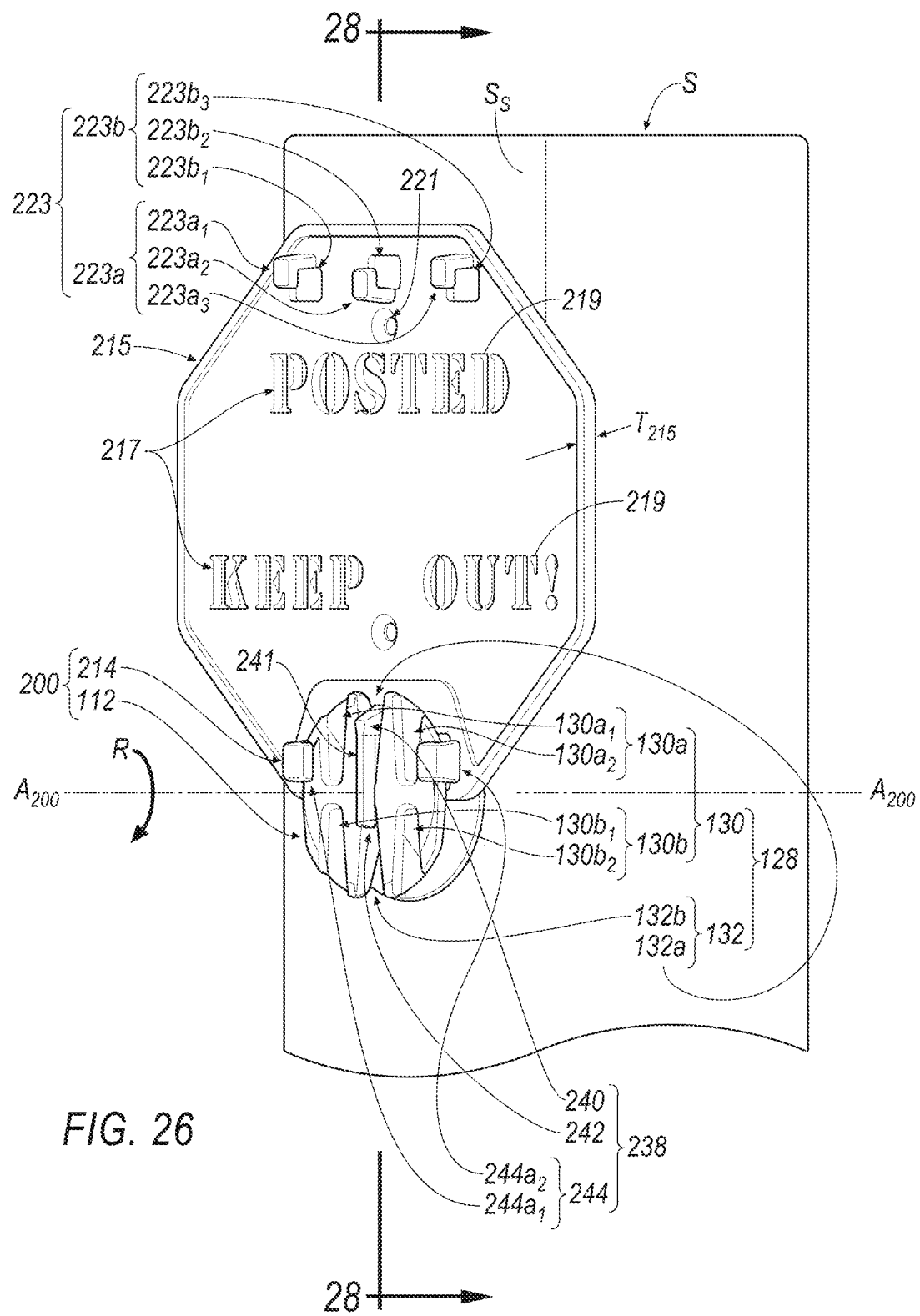
FIG. 26 is an assembled perspective view of the assembly of FIG. 25.
Figure 28:
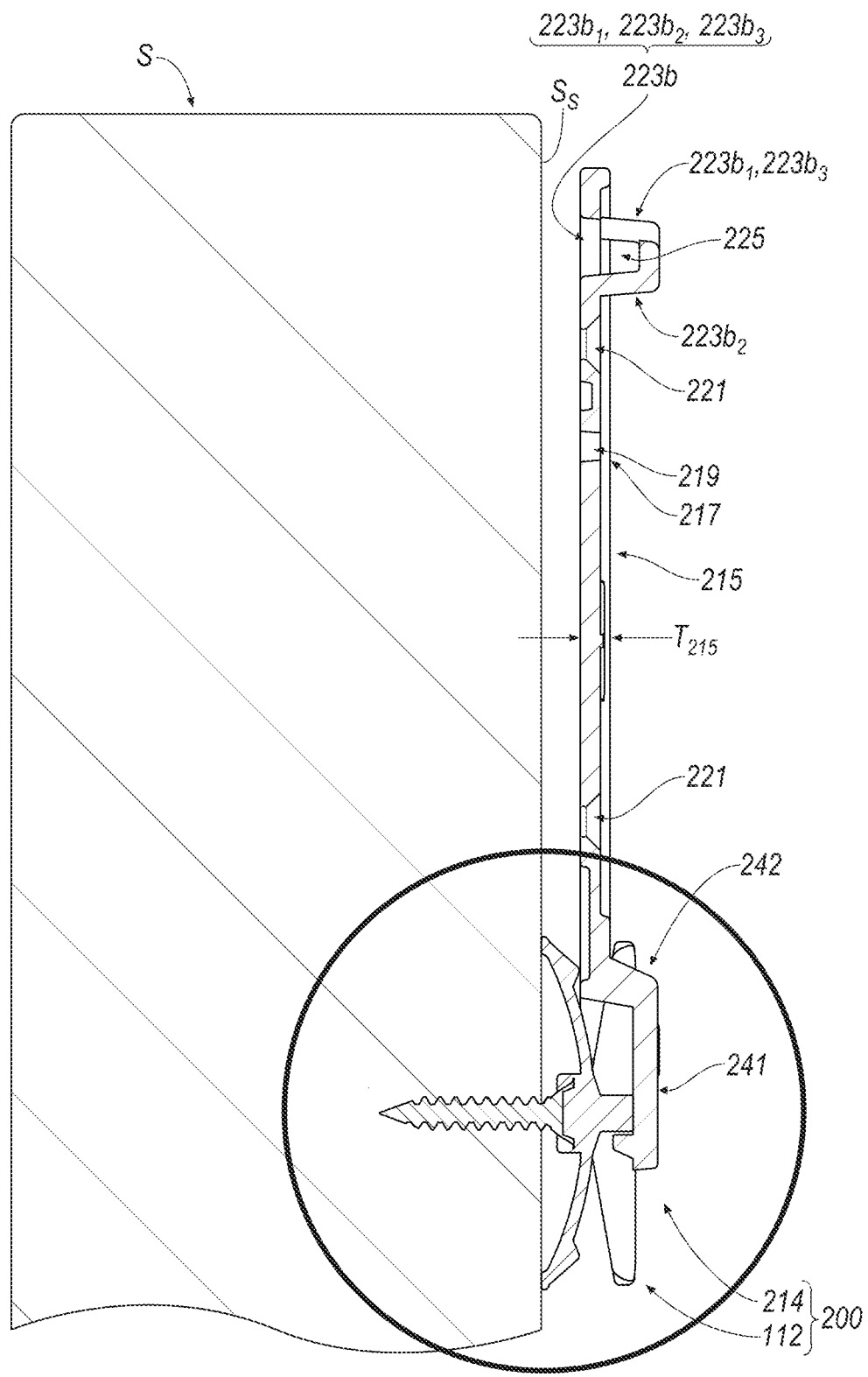
FIG. 28 is a cross-sectional view according to line 28-28 of FIG. 25.

With reference to FIG. 29E, as a result of the implement-retaining portion 214 being moved relative the mounting portion 112 in the direction of the arrow A2', the implement-retaining portion 214 is said to be connected to the mounting portion 112 for defining the assembly 200 being arranged in an assembled form as seen in, for example, FIGS. 26 and 28. In an example, the assembled assembly 200 may result from, for example, the arrangement of: (1) the first wedging portion 240 within the first wedging passage $132a$ and (2) the second wedging portion 242 within the second wedging passage $132b$. Such an arrangement of the first wedging portion 240 and the second wedging portion 242 within the first wedging passage $132a$ and the second wedging passage $132b$ results in the implement-retaining portion 214 being connected to the mounting portion 112 in a wedged, friction-fit configuration that resists the implement-retaining portion 214 from being disconnected from the mounting portion 112. In an example, as seen in FIG. 29E, if an external force in the direction of arrow A3', which is opposite the direction of the arrow A3, were to be applied to the implement-retaining portion 214, the upper intermediate surface $242a_3$ of the second wedging portion 242 would be urged toward the intermediate wall surface $132b_3$ defined by the second wedging passage $132b$ thereby preventing the implement-retaining portion 214 from disconnected from the mounting portion 112 in an upwardly direction. Yet even further, the arrangement of the first wedging portion 240 within the first wedging passage $132a$ and the second wedging portion 242 within the second wedging passage $132b$ as described above provides a two-point connection that further resists rotation R (see, e.g., FIG. 26) of the implement-retaining portion 214 about a central axis $A_{200}$-$A_{200}$ extending the mounting portion 112 that is substantially orthogonal to the exterior surface $S_S$ of the underlying substrate S.

When it may be desired to arrange the assembly 200 back to a disassembled orientation (i.e., arranging the implement-retaining portion 214 in spatially separated orientation with respect to the mounting portion 112 as seen in, for example, FIG. 29A), the implement-retaining portion 214 may then be pivoted away from the mounting portion 112 (and away from the reference axis $A_{214}$-$A_{214}$) in the direction of the arrow A2 at the angle θ. With the implement-retaining portion 214 pivoted away from the mounting portion 112, the second wedging portion 242 is removed from the second wedging passage $132b$. Thereafter, the implement-retaining portion 214 is moved away from the mounting portion 112 according to the direction of the arrow A3', which is opposite the direction of the arrow A3 for removing the first wedging portion 240 from the first wedging passage $132a$ and then subsequently arranging the implement-retaining portion 214 in a spatially separated state with respect to the mounting portion 112.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An assembly (100, 200), comprising:
   a mounting portion (112), wherein the mounting portion (112) includes
   a body portion (112a), and
   a substrate-penetrating portion (112b) that is a self-boring threaded fastener having a head portion embedded within a cavity of the body portion, wherein the body portion (112a) is defined by
   a substrate-engaging portion ($112a_1$), and
   an implement retainer interface portion ($112a_2$) connected to the substrate-engaging portion ($112a_1$) wherein the substrate-engaging portion has greater flexibility than the implement retainer interface portion; and
   an implement-retaining portion (114, 214) removably-connected to the implement retainer interface portion ($112a_2$) of the body portion (112a) of the mounting portion (112).

2. The assembly (100, 200) of claim 1, wherein the implement retainer interface portion ($112a_2$) of the body portion (112a) of the mounting portion (112) includes an implement-retaining-portion-engaging surface (122), wherein the implement-retaining-portion-engaging surface (122) defines:
   a plurality of male-receiving portions (128) defined by:
   a plurality of female portions (130) including:
      a first pair of female portions (130a) including:
         a first female portion ($130a_1$), and
         a second female portion ($130a_2$),
      a second pair of female portions (130b) including:
         a third female portion ($130b_1$), and
         a fourth female portion ($130b_2$), and
   a plurality of wedging passages (132) including:
      a first wedging passage (130a), and
      a second wedging passage (130b).

3. The assembly (100) of claim 2, wherein the first wedging passage (130a) is arranged between the first female portion ($130a_1$) of the first pair of female portions (130a) and the second female portion ($130a_2$) of the first pair of female portions (130a), wherein the second wedging passage (130b) is arranged between the third female portion ($130b_1$) of the second pair of female portions (130b) and the fourth female portion ($130b_2$) of the second pair of female portions (130a).

4. The assembly (100) of claim 3, wherein the implement retainer interface portion ($112a_2$) of the body portion (112a) of the mounting portion (112) includes:
   a first half ($112a_{2-1}$), and
   a second half ($112a_{2-2}$),
   wherein the first wedging passage (130a) and the first pair of female portions (130a) are defined by the first half ($112a_{2-1}$) of the implement retainer interface portion ($112a_2$) of the body portion (112a) of the mounting portion (112),
   wherein the second wedging passage (130b) and the second pair of female portions (130b) are defined by the second half ($112a_{2-2}$) of the implement retainer interface portion ($112a_2$) of the body portion (112a) of the mounting portion (112).

5. The assembly (100) of claim 2, wherein the implement-retaining portion (114) includes a mounting-portion-engaging surface (134), wherein the implement-retaining portion (114) includes:
   a plurality of male portions (138) extending away from the mounting-portion-engaging surface (134), wherein the plurality of male portions (138) are defined by:

a first wedging portion (140),
a second wedging portion (142), and
a pair of registration portions (144) including:
    a first registration portion (144$a_1$), and
    a second registration portion (144$a_2$).

6. The assembly (100) of claim 5, wherein the plurality of male portions (138) of the implement-retaining portion (114) are removably-interfaced with the plurality of male-receiving portions (128) of the mounting portion (112), wherein:
the pair of registration portions (144) is removably-interfaced with one of the first pair of female portions (130*a*) and the second pair of female portions (130*b*),
the first wedging portion (140) is removably-interfaced with one of the first wedging passage (130*a*) and the second wedging passage (130*b*), and
the second wedging portion (142) is removably-interfaced with the other of the first wedging passage (130*a*) and the second wedging passage (130*b*).

7. The assembly (100) of claim 5, wherein the implement retainer interface portion (112$a_2$) of the body portion (112*a*) of the mounting portion (112) is defined by:
a neck-portion-engaging surface (120) that is shaped for contacting the first wedging portion (140) of the plurality of male portions (138) of the implement-retaining portion (114), and
an implement-retaining-portion-engaging surface (122) that is shaped to contact or be arranged opposite the mounting-portion-engaging surface (134) of the implement-retaining portion (114).

8. The assembly (100) of claim 5, wherein the first wedging portion (140) is defined by:
a head portion (140*a*), and
a neck portion (140*b*), wherein the neck portion (140*b*) is connected to the head portion (140*a*), wherein the neck portion (140*b*) extends away from the mounting-portion-engaging surface (134).

9. The assembly (100) of claim 8, wherein the neck portion (140*b*) includes:
a first side surface (140$b_1$) and an opposite second side surface (140$b_2$) that are joined by an intermediate surface (140$b_3$), wherein the first side surface (140$b_1$) and the second side surface (140$b_2$) are arranged in a non-parallel, converging relationship.

10. The assembly (100) of claim 5, wherein the second wedging portion (142) includes a first side surface (142$a_1$) and an opposite second side surface (142$a_2$) that are joined by an intermediate surface (142$a_3$), wherein the first side surface (142$a_1$) and the second side surface (142$a_2$) are arranged in a non-parallel, converging relationship.

11. The assembly (200) of claim 2, wherein the implement-retaining portion (214) includes a mounting-portion-engaging surface (234), wherein the implement-retaining portion (214) includes:
a plurality of male portions (238) extending away from the mounting-portion-engaging surface (234), wherein the plurality of male portions (238) are defined by:
    a first wedging portion (240),
    a second wedging portion (242), and
    a pair of clamping portions (244) including:
        a first clamping portion (244$a_1$), and
        a second clamping portion (244$a_2$).

12. The assembly (200) of claim 11, wherein the plurality of male portions (238) of the implement-retaining portion (214) are removably-interfaced with the plurality of male-receiving portions (128) of the mounting portion (112), wherein:
the first wedging portion (240) is removably-interfaced with one of the first wedging passage (130*a*) and the second wedging passage (130*b*), and
the second wedging portion (242) is removably-interfaced with the other of the first wedging passage (130*a*) and the second wedging passage (130*b*).

13. The assembly (200) of claim 12, wherein a first mounting-portion-engaging-surface (245$_1$) of each of the first clamping portion (244$a_1$) and the second clamping portion (244$a_2$) is sized for engaging the implement-retaining-portion-engaging surface (122), wherein a second mounting-portion-engaging surface (245$_2$) of each of the first clamping portion (244$a_1$) and the second clamping portion (244$a_2$) is sized for engaging a side surface (121) of the body portion (112*a*) of the mounting portion (112) that connects the neck-portion-engaging surface (120) to the implement-retaining-portion-engaging surface (122).

14. The assembly (100) of claim 1, wherein at least the substrate-engaging portion (112$a_1$) of the body portion (112*a*) of the mounting portion (112) is bendably or flexibly connected to the implement retainer interface portion (112$a_2$) of the body portion (112*a*) of the mounting portion (112).

15. The assembly (100) of claim 1, wherein the substrate-penetrating portion (112*b*) may be formed from a rigid, non-flexible material, wherein the substrate-penetrating portion (112*b*) is threaded fastener having a shaft portion (112$b_1$) and a threaded portion (112$b_3$) extending away from the shaft portion (112$b_1$).

16. The assembly (100) of claim 1, wherein a head portion (112$b_4$) of the substrate-penetrating portion (112*b*) is arranged within a passage (115) formed by the substrate-engaging portion (112$a_1$) of the body portion (112*a*) of the mounting portion (112).

17. The assembly (100) of claim 1, wherein the substrate-engaging portion (112$a_1$) of the body portion (112*a*) of the mounting portion (112) defines:
a substrate-mounting surface (116) having a circumferential engagement lip (124) including a plurality of protuberances (126).

\* \* \* \* \*